United States Patent
Belt et al.

(10) Patent No.: US 10,436,594 B2
(45) Date of Patent: Oct. 8, 2019

(54) DEVICES, SYSTEMS, AND METHODS FOR NAVIGATION AND USAGE GUIDANCE IN A NAVIGABLE SPACE USING WIRELESS COMMUNICATION

(71) Applicant: Blind InSites, LLC, Plano, TX (US)

(72) Inventors: Darwin Wayne Belt, Plano, TX (US); Armand Edwin Fisher, Euless, TX (US)

(*) Notice: Subject to any disclaimer, the term of this patent is extended or adjusted under 35 U.S.C. 154(b) by 0 days.

(21) Appl. No.: 16/039,606

(22) Filed: Jul. 19, 2018

(65) Prior Publication Data
US 2018/0321045 A1   Nov. 8, 2018

Related U.S. Application Data

(63) Continuation-in-part of application No. 15/871,976, filed on Jan. 15, 2018, now Pat. No. 10,126,132.
(Continued)

(51) Int. Cl.
*G01C 21/20* (2006.01)
*G06F 3/044* (2006.01)
(Continued)

(52) U.S. Cl.
CPC .......... *G01C 21/206* (2013.01); *A61H 3/061* (2013.01); *G01C 21/20* (2013.01); *G01C 21/3652* (2013.01); *G06F 3/044* (2013.01)

(58) Field of Classification Search
CPC .................. G01C 21/206; A61H 3/061; A61H 2003/063; G06F 3/044; H04W 4/023; H04M 1/72572
(Continued)

(56) References Cited

U.S. PATENT DOCUMENTS 4,385,586 A * 5/1983 Schriever .................. A62B 3/00
  116/205
4,505,061 A   3/1985 Neuburger et al.
(Continued)

FOREIGN PATENT DOCUMENTS

WO   WO2013045557   4/2013
WO   WO2014137016   9/2014

OTHER PUBLICATIONS

Indoor Navigation System Kassim et al. https://thesai.org/Downloads/Volume7No2/Paper_76-Indoor_Navigation_System_based_on_Passive_RFID.pdf Retrieved Mar. 13, 2018.
(Continued)

*Primary Examiner* — Edwin C Holloway, III
(74) *Attorney, Agent, or Firm* — Caldwell Intellectual Property Law

(57) ABSTRACT

An assembly for navigation and usage guidance in a first navigable space using hybrid tactile and electronic guidance means includes a first informational object installed at a fixed location in a first navigable space, wherein the first informational object includes an obverse, a first touch-discernable feature identifying the first informational object, and a second touch-discernable feature identifying a particular location on the obverse. The assembly includes a first transmitter embedded in the first informational object at the particular location, wherein the first transmitter is configured to transmit, to a receiver, data indicating a location of at least a user feature in the first navigable space.

21 Claims, 26 Drawing Sheets

Related U.S. Application Data

(60) Provisional application No. 62/537,594, filed on Jul. 27, 2017, provisional application No. 62/446,931, filed on Jan. 17, 2017.

(51) Int. Cl.
*A61H 3/06* (2006.01)
*G01C 21/36* (2006.01)

(58) Field of Classification Search
USPC ......... 340/4.12, 4.11, 407.1; 434/72, 75, 78, 434/112, 113; 701/526; 116/285
See application file for complete search history.

(56) References Cited

U.S. PATENT DOCUMENTS

| | | | |
|---|---|---|---|
| 55,555,660 | | 9/1996 | Whitehouse et al. |
| 5,733,127 | A * | 3/1998 | Mecum ............... E04F 13/0862 40/585 |
| 5,810,597 | A * | 9/1998 | Allen, Jr. ................ G09F 25/00 40/584 |
| 6,499,421 | B1 * | 12/2002 | Honigsbaum ........... G09F 19/22 116/205 |
| 6,992,592 | B2 | 1/2006 | Gilfix |
| 8,082,872 | B2 | 12/2011 | Cook et al. |
| 8,362,883 | B2 | 1/2013 | Hale et al. |
| 2002/0121986 | A1 | 9/2002 | Krukowski et al. |
| 2004/0002305 | A1 * | 1/2004 | Byman-Kivivuori ........................ G06Q 20/353 455/41.2 |
| 2007/0057032 | A1 * | 3/2007 | Raistrick ........... G06F 17/30879 235/375 |
| 2009/0032590 | A1 * | 2/2009 | Hopkins ................ A61H 3/061 235/385 |
| 2010/0109918 | A1 * | 5/2010 | Liebermann ............ G10L 13/00 341/21 |
| 2011/0070828 | A1 * | 3/2011 | Griffin ................ H04M 1/7253 455/41.1 |
| 2011/0281804 | A1 | 12/2011 | Chan |
| 2012/0212344 | A1 * | 8/2012 | Forsberg ................. G08B 3/10 340/573.1 |
| 2015/0330787 | A1 * | 11/2015 | Cioffi ................. G06Q 30/0261 701/537 |
| 2016/0123745 | A1 | 5/2016 | Cotier et al. |
| 2016/0170508 | A1 | 6/2016 | Moore et al. |
| 2016/0180703 | A1 * | 6/2016 | Chang .................... G08G 1/005 340/944 |
| 2016/0259027 | A1 | 9/2016 | Said |
| 2017/0215032 | A1 * | 7/2017 | Horbal .................... H04W 4/02 |

OTHER PUBLICATIONS

Indoor Wayfinding RFID Apr. 2015 http://www.ijcsonline.com/IJCS/IJCS_2015_0204005.pdf Retrieved Mar. 13, 2018.

* cited by examiner

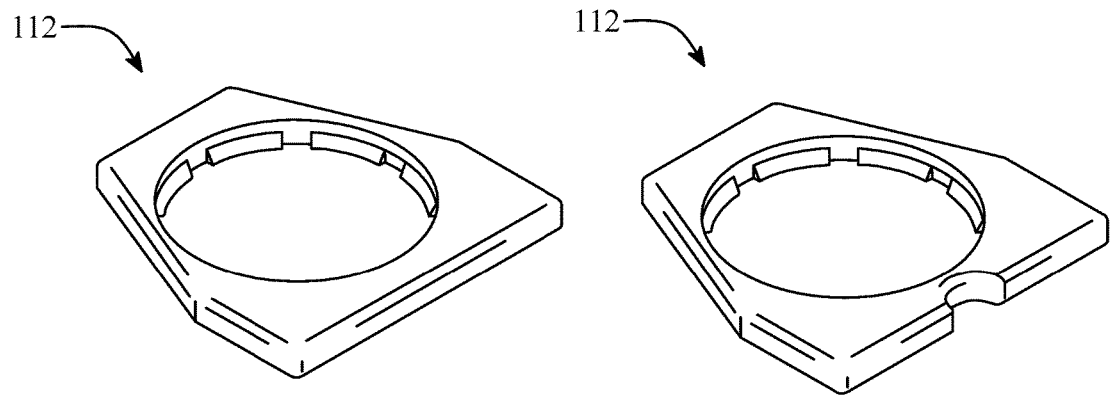
FIG. 6I  FIG. 6J
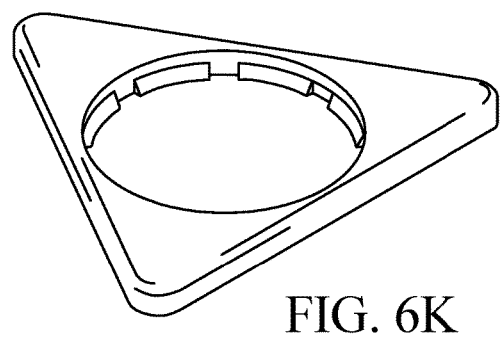 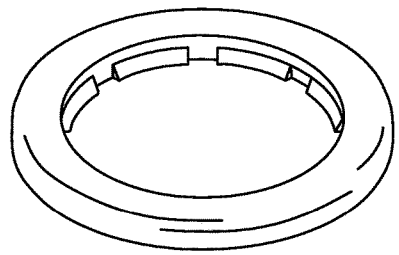
FIG. 6K  FIG. 6L
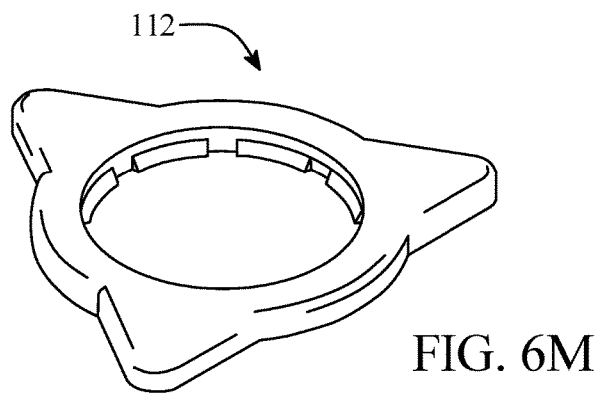
FIG. 6M

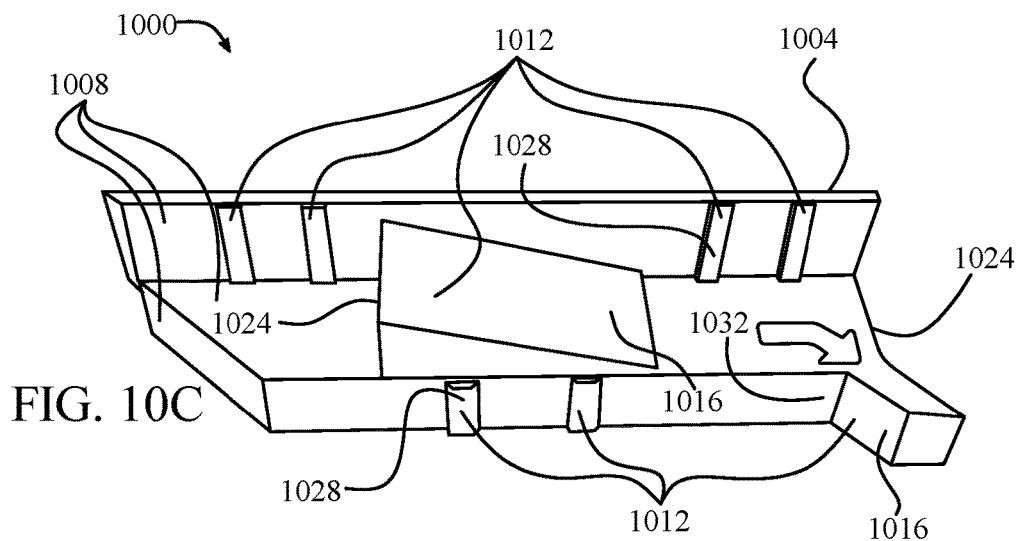
FIG. 10C
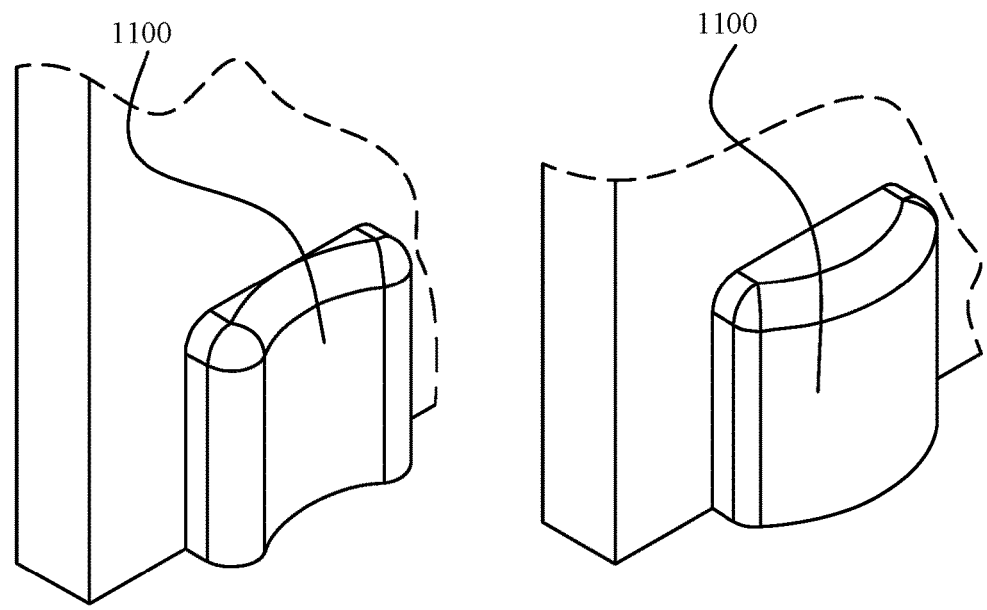
FIG. 11A
FIG. 11B

DEVICES, SYSTEMS, AND METHODS FOR NAVIGATION AND USAGE GUIDANCE IN A NAVIGABLE SPACE USING WIRELESS COMMUNICATION

RELATED APPLICATION DATA

This application is a continuation in part of U.S. Non-provisional patent application Ser. No. 15/871,976, filed on Jan. 25, 2018, and titled "DEVICES, SYSTEMS, AND METHODS FOR NAVIGATION AND USAGE GUIDANCE IN A NAVIGABLE SPACE USING WIRELESS COMMUNICATION" which claims priority to U.S. Provisional Patent Application Ser. No. 62/446,931, filed on Jan. 17, 2017, and titled "A SYSTEM AND METHOD FOR WAYFINDING AND INFORMATION GATHERING USING WIRELESS TECHNOLOGY." Each of U.S. Non-provisional patent application Ser. No. 15/871,976 and U.S. Provisional Patent Application Ser. No. 62/446,931 is incorporated herein by reference in its entirety. This application further claims the benefit of priority of U.S. Provisional Application Ser. No. 62/537,594, filed on Jul. 27, 2017, and titled "WAYFINDING SYSTEM INCORPORATING A TACTILE SIGN WITH PATH INFORMATION," the entirety of which is incorporated herein by reference.

FIELD OF THE INVENTION

The present invention generally relates to the field of localized wireless communication. In particular, the present invention is directed to devices, systems, and methods for navigation and usage guidance in a navigable space using wireless communication.

BACKGROUND

Navigation presents a perennial challenge for visually impaired persons. Without the ability to rely on sight, obstacles and goals alike are more difficult to find. The art of wayfinding, or navigating, orienting oneself in, and using physical space, requires constant learning and innovation, and has given rise to a number of techniques used in concert. On sidewalks and in other areas designed for frequent travel, such as hallways, it is often possible to feel the way by touching railings and walls, and using aids such as white canes to search the ground for guides and hazards. In familiar environs, such as the home or office, memory can serve as a primary guide, as the visually impaired person follows a mental map he or she has formed through familiarity, with aids such as the white cane serving in a supplemental role to discover unexpected obstacles. Some combination of feeling the way and memory can be used to explore most areas in time, but the existing methods often fall short in unfamiliar spaces that require more complex interaction, such as public bathrooms. It can be awkward and slow to find a sink or a bathroom stall by feel, and the layout of such spaces are not sufficiently predictable for navigation by guesswork.

SUMMARY OF THE DISCLOSURE

In an aspect, an assembly for navigation and usage guidance in a first navigable space using hybrid tactile and electronic guidance means includes a first informational object installed at a fixed location in a first navigable space. The first informational object includes an obverse. The first informational object includes a first touch-discernable feature identifying the first informational object. The first informational object includes a second touch-discernable feature identifying a particular location on the obverse. The assembly includes a first transmitter embedded in the first informational object at the particular location, wherein the first transmitter is configured to transmit, to a receiver, data indicating a location of at least a user feature in the first navigable space.

In another aspect, a method of installing an assembly for navigation and usage guidance in a first navigable space using hybrid tactile and electronic guidance means includes providing a first transmitter having a unique identifier, wherein the first transmitter is configured to transmit the unique identifier wirelessly. The method includes providing a first informational object located at a first location in the first navigable space, wherein the first information object further comprises an obverse and a first touch-discernable feature identifying the first informational object. The method includes installing the first transmitter at a particular location on the obverse. The method includes installing a second touch-discernable feature identifying a particular location on the obverse.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 6A-M illustrate some exemplary at least a feature symbol in an embodiment;

FIGS. 10A-C illustrate exemplary probe guides in an embodiment;

FIGS. 11A-C illustrate exemplary probe guides in an embodiment;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to devices, systems, and methods that utilize localized wireless communication to provide a visually impaired person with information he or she can use to utilize a user feature, such as an ATM or bathroom stall, or to navigate an unfamiliar space, efficiently, and with dignity. Information indicating location of items of interest or obstacles within the environment is conveyed to the user in an accessible way, giving the user an effective map of an otherwise unfamiliar space. Instructions concerning the use of features aid the user to avoid trial and error when engaging with the features, and information indicating whether features are currently in use permits the user to select unoccupied features without resorting to inquiries. Sighted users may also use some embodiments to aid in wayfinding as well, for instance for finding items or information about items in a retail store, or for understanding or translating information on a sign written in a foreign language.

Figure 1:
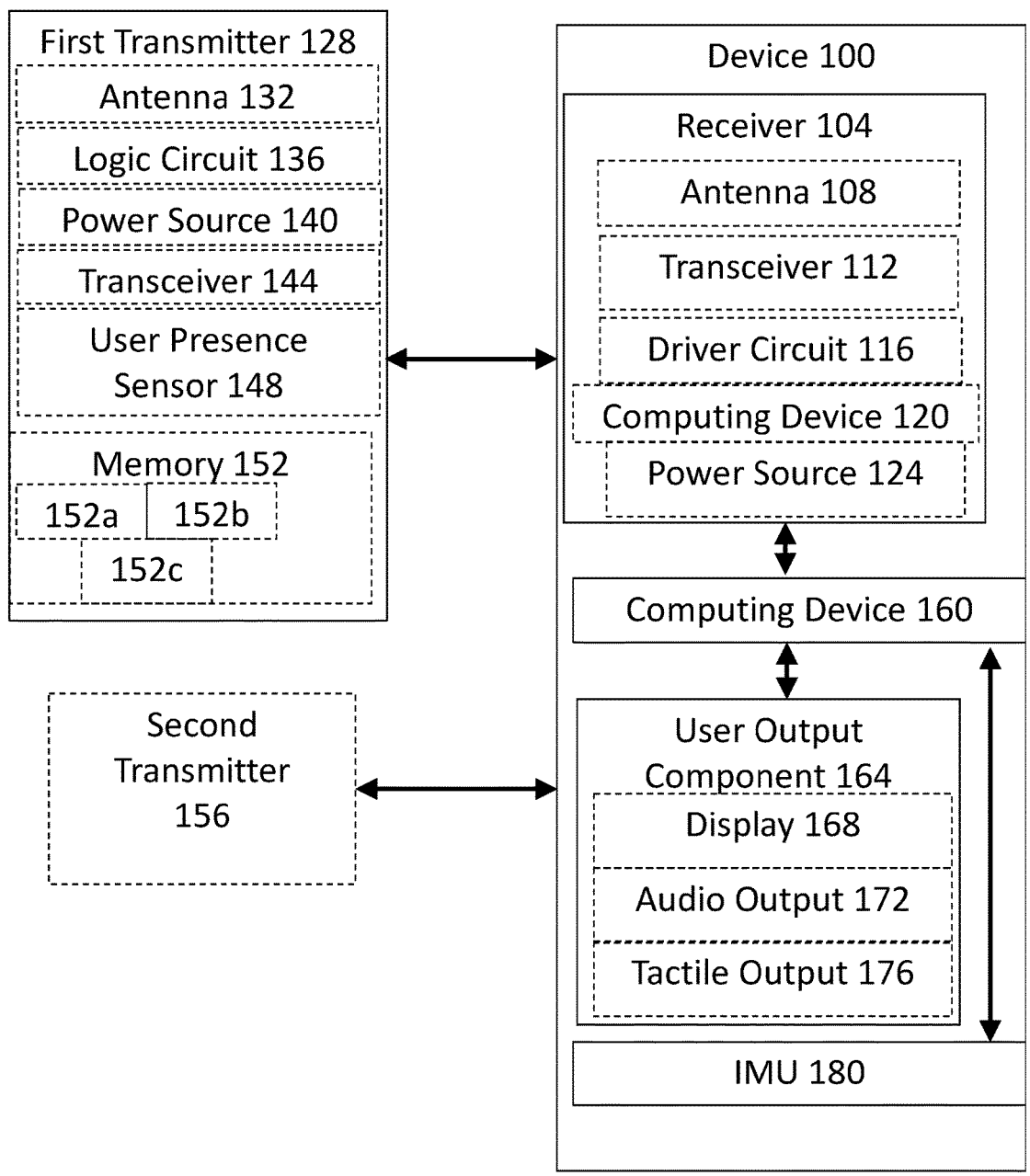
FIG. 1 is a block diagram illustrating an exemplary system in an embodiment.

Referring now to FIG. 1, a block diagram of an exemplary embodiment of a device 100 for navigation and usage guidance in a navigable space using wireless communication is illustrated. Device 100 is on the person of the user. In some embodiments, device 100 is on the person of the user if the user is carrying the receiver with the user. For example, and without limitation, device 100 may be on the person of the user if device 100 is in a pocket of the user's clothing, in a pocket or compartment of a portable container such as a backpack, satchel, briefcase, pocketbook, or the like, in a holster, in a harness, in a money belt, in a belt clip, or incorporated in a wayfinding aid, for instance as set forth in further detail below.

Continuing to refer to FIG. 1, device 100 includes a wireless receiver 104. Wireless receiver 104 may have an antenna 108. Wireless receiver 104 may include a wireless interrogator; in other words, the antenna 108 may be capable of inducing a current in an antenna of a passive transmitter through magnetic coupling, capacitive coupling, or other means. Wireless receiver 104 may be able to receive the signal transmitted by at least one first transmitter 128 using the antenna 108. In some embodiments, the wireless receiver 104 can transmit as well as receive signals. Wireless receiver 104 may include a transceiver 112, which both sends and receives signals; the transceiver 112 may be a system on a chip, including processing, memory, or any other functions together in a single integrated circuit. Transceiver 112 may exchange signals according to existing protocols, such as the BLUETOOTH protocol promulgated by Bluetooth SIG, Inc. of Kirkland, Wash. Transceiver 112 may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna 108 may include a plurality of antennas; for example, and without limitation, antenna 108 may include a first antenna that transmits interrogation signal, and a second antenna that receives return signal. Antenna 108 may include multiple antennas that receive and/or transmit signals; for instance, antenna 108 may include antennas facing in various directions for transmitting interrogation signals and receiving return signals to and from various directions simultaneously. Similarly, wireless receiver 104 may include both an antenna 108 for receiving from and/or transmitting signals to a transmitter and a transceiver 112 that may be used for communicating with a mobile computing device, for instance as described below.

Still referring to FIG. 1, wireless receiver 104 includes a driver circuit driver circuit 112. Driver circuit 112 is an electric circuit, electrically coupled to antenna 108, that processes electric signals induced in antenna 112 by wireless signals, and processes the electric signals. In other words, driver circuit 112 may be any electrical circuit configured to wirelessly receive a signal from a transmitter, as described in further detail below, via antenna 108. Where wireless receiver 104 includes a wireless interrogator, driver circuit 112 may further be configured to wirelessly transmit an interrogation signal via the antenna to a passive transponder; the interrogation signal may provide electrical power to the passive transponder. Driver circuit 112 may further be configured to wirelessly receive a return signal from the transponder via the antenna.

With continued reference to FIG. 1, driver circuit 112 may include analog components, digital components, or both. For instance, driver circuit 112 may include one or more filters (not shown), such as a Butterworth filter, a Chebyshev filter, a band filter, or the like, to filter out noise or selectively receive particular frequencies or ranges of frequencies. Driver circuit 112 may include one or more amplifiers. Driver circuit 112 may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like. Logic circuit may include memory, which may be any memory as described below in reference to FIG. 18. Logic circuit may include a computing device as described below in reference to FIG. 18. In some embodiments, the wireless receiver 104 includes a computing device 120; the computing device 120 may be any computing device as described below in reference to FIG. 18. As a non-limiting example, the wireless receiver 104 may be a mobile computing device such as a mobile phone, "smartphone," or tablet; wireless receiver 104 may be incorporated in a mobile computing device. Wireless receiver 104 may be incorporated in a special-purpose device, such as handheld device or device mounted on a finding aid that, as a non-limiting example, is wirelessly or otherwise coupled to a mobile or portable computing device. Computing device 120 may be a microcontroller.

Still referring to FIG. 1, wireless receiver 104 may include a power source 124. Power source 124 may include a power storage device; the power storage device may include a battery. Power storage device may include a capacitor; for instance, the power storage device may include an ultra-capacitor. Power storage device may include a magnetic power storage device, such as a device that incorporates an inductor. In some embodiments, power source 124 includes a photovoltaic device; the photovoltaic device may be any device that converts light to electric power. Power source 124 may include power provided by an electrical network, for example including electric power accessed via a wall-plug; the electrical power may be alternating current "mains" power, or power generated by solar panels, wind turbines. Wireless receiver 104 may charge wirelessly; for instance, the wireless receiver 104 may charge inductively. Wireless receiver 104 may include an inertial power source that generates mechanical or electrical power from movement of wireless receiver 104, including without limitation an inertial power source that generates power from walking or swinging a cane on which inertial power source is mounted.

With continued reference to FIG. 1, wireless receiver 104 is configured to receive a signal from at least one first transmitter 128. In some embodiments, where at least one first transmitter 128 includes a passive transmitter as described in further detail below, wireless receiver 104 may receive the signal by producing an interrogation signal using an interrogator, and receiving the signal generated by the passive transmitter in return. In other embodiments, where at least one first transmitter 128 includes an active transmitter as set forth in further detail below, wireless receiver 104 listens for the transmission frequency of at least one first transmitter 128 and inputs the signal upon receiving the signal output by at least one first transmitter 128. Wireless receiver 104 may exchange signals with at least one first transmitter 128; for instance, wireless receiver 104 may transmit a query to at least one first transmitter 128 and receive data in response to the query. Wireless receiver 104 may similarly receive a signal from a second transmitter or from additional transmitters situated in a navigable space, as described in further detail below. Wireless receiver 104 may be configured to receive content data from at least one first transmitter 128 or a second transmitter. Wireless receiver 104 may be configured to receive product data from at least one first transmitter 128 or a second transmitter.

Alternatively, or additionally, and still referring to FIG. 1, wireless receiver 104 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 104 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 104 receives a return signal including a unique identifier and processes that return signal, wireless receiver 104 may similarly obtain the unique identifier by way of a code reader, and process the unique identifier in a like manner.

With continued reference to FIG. 1, at least one first transmitter 128 may be any device that outputs a signal using electromagnetic radiation; the signal may be sent using any frequency usable in communication, including without limitation radio waves, micro waves, infrared waves, and visible light. At least one first transmitter 128 may include an antenna 132. At least one first transmitter 128 may include a passive transmitter, such as those used for passive radio frequency identification ("RFID") or near field communication ("NFC") tags. In some embodiments, passive transmitter includes an antenna 132 in which electric current is induced by magnetic coupling from an antenna, such as antenna 108 of wireless receiver 104; the induced electric current may power the passive transmitter, which may use additional circuitry such as a logic circuit 136 to analyze the signal and generate a response signal. Logic circuit 136 may be any logic circuit as described above regarding driver circuit 116.

Still referring to FIG. 1, response signal may be output by the same antenna 132. The response signal may be output by an additional antenna; in other words, as described above for wireless transmitter 104, antenna 132 may include multiple antennas. In some embodiments, the passive transmitter has a plurality of antennas to enable the transmitter to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, at least a transmitter 128 may include an active transmitter. Active transmitter may be a transmitter having a power source 140 other than an interrogation signal; power source 140 may be any power source 124 as described above. Active transmitter may use the antenna 132 to broadcast a signal periodically. Active transmitter may use the antenna 132 to listen for incoming signals, and transmit in response to a detected signal. Active transmitter may perform both actions; for instance, active transmitter may periodically transmit a first signal, and also transmit one or more second signals in response to signals at least a transmitter 128 receives. At least a transmitter 128 may include a transceiver 144, which may be any transceiver 112 as described above. At least a transmitter 128 may include a beacon using any beacon protocol as described above.

With continued reference to FIG. 1, at least a transmitter 128 may include one or more sensors; for instance, at least a transmitter 128 may include a user presence sensor 148, which may be a sensor that detects when a user is in a particular location, such as within a navigable space, within a particular portion of a navigable space, at a user feature, or using a user feature, for instance as described in further detail below. User presence sensor 148 may be a motion sensor that detects the movement of a person in a particular location. User presence sensor 148 may be heat sensor that detects the body heat of a person in a particular location. User presence sensor 148 may be a field-interruption sensor that combines an emitter of radiation such as infra-red radiation with a sensor capable of detecting the emitted information; as a result, when a person is in a particular location, the emitted radiation may be blocked, causing the sensor to detect a change or cessation in detected radiation, indicating that a person is present. The user presence sensor 148 may function similarly to the user presence sensor used in automatically flushing toilets or urinals, in automatic faucets, and the like.

Still referring to FIG. 1, at least a transmitter 128 may include a memory 152. Memory 152 may be any memory as described below in reference to FIG. 18. In some embodiments, memory 152 is read-only. In other embodiments, memory 152 may be writable. The writable memory may require authentication; for instance, the writable memory may be writable only given a password, identifier, key, or other data indicating that the device that will be modifying the memory is authorized. Memory 152 may include any combination of the above; for instance, memory 152 may include a read-only section 152a. Memory 152 may include a writable section 152b with limited access. Memory 152 may include a writable section 152c with general access, to which any user may be able to write data. Memory 152 may include the read-only 152a section and the generally writable section 152c, or the limited access writable section 152b and the generally writable section 152c, or the read-only section 152a and the limited access section 152b. The limited access section may be limited to users of the system 100, or in other words may be generally writable, but only to users of the system 100, who may have the requisite access codes as a result of joining the system 100 as users; the users may alternatively be granted the access codes by the system 100 to update information on at least a transmitter 128 only when authorized by the system, and otherwise be unable to update the memory; in this way, the system 100 may be able to update information on at least a transmitter 128 memory 152 efficiently by way of the receiver while maintaining security against misuse of the memory. In some embodiments, preventing users from being able to write over memory 152 enables the memory to be free from intentional or unintentional corruption or inaccuracy, and enables the system 100 to ensure that certain information is always available to users of at least a transmitter 128. In some embodiments, writable sections 152b-c enable the system 100 itself or users of the system 100 to correct, augment, or update information as described in further detail below.

Figure 2:
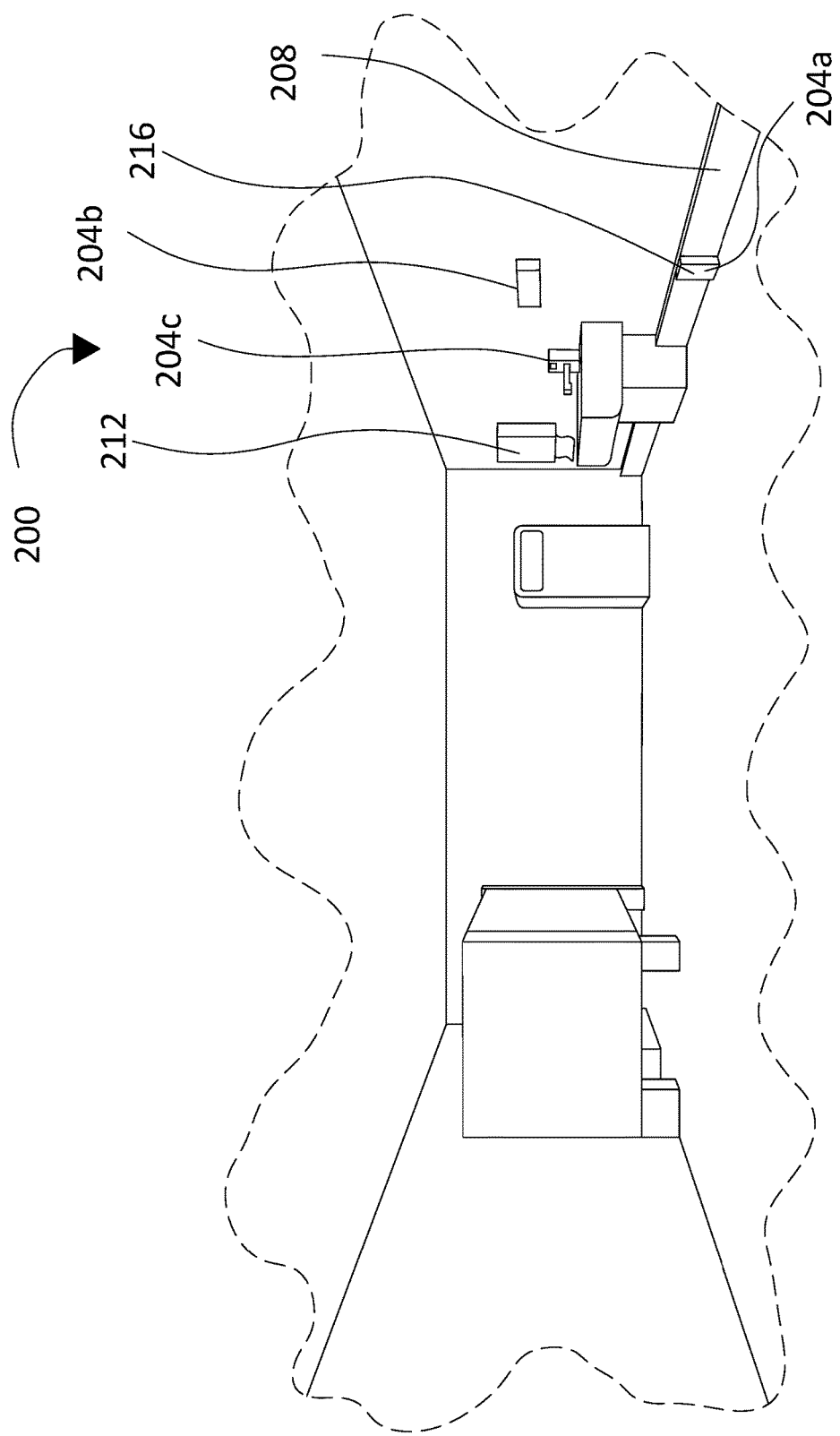
FIG. 2 is a schematic diagram illustrating an exemplary navigable space.

Referring now to FIG. 2, an exemplary embodiment of a navigable space 200 illustrated. At least one first transmitter 128 may be located at a location 204a-c in a navigable space 200. Navigable space 200 may be any space a user may wish to negotiate, including any outdoor or indoor space. Navigable space 200 may include without limitation a corridor, a room, an interior or exterior retail space, a restaurant dining area, a restroom, a trail, a parking lot, a road, a sidewalk, a park, or a vehicle such as a bus, train, aircraft, boat, ship, space vehicle, or space station. A navigable space 200 may contain other navigable spaces; as a non-limiting example, first navigable space may be a restaurant, within which a bathroom may be a second navigable space and a dining area may be a third navigable space. Further continuing the example, a toilet stall within the bathroom may be a fourth navigable space.

Continuing to refer to FIG. 2, navigable space 200 may contain architectural features 208, which may be features of the construction of navigable space 200 that serve purposes not directly related to user interaction, such as baseboards, walls, ceilings, molding, floors, floor tiles, and the like. Navigable space 200 may contain at least a user feature 212, which may be at least an object located in navigable space 200 for the purpose of user interaction; for instance, user features 212 may include without limitation sinks, toilets, toilet stalls, urinals, paper towel dispensers, hand driers, trash cans, automatic teller dispensers, doors, elevators, vending machines, fountain drink dispensers, ticket taking/dispensing devices, salad bars, or any other items a user would expect to interact with when using navigable space 200. A user feature 212 may include a free-standing device; examples of free-standing devices include without limitation condiment containers, recycling containers, and trash receptacles. Additional features in navigable space 200 may include features added at or near floor-level, such as features added at baseboards; such features may be detected by probes such as white canes and the like, and may include probe guides as described in further detail below.

Still referring to FIG. 2, location 204a-c may include a location in or on an architectural feature 208 of navigable space 200; for instance, at least one first transmitter 128 may have a location 204A in a baseboard within a room, for instance as shown in FIG. 2. At least one first transmitter 128 may have a location 204A within molding. At least one first transmitter 128 may have a location within a wall, or within a recess in the surface of a wall. At least one first transmitter 128 may have a location mounted on a wall; for instance, location 204a-c may be a wall-mounting 204B, such as a wall-mounted box or sign (e.g., a building directory or an Americans with Disabilities Act ("ADA") sign), for instance as described in further detail below. Location 204a-c may be adjacent to a user feature 212. For instance, location 204B may be located adjacent to a sink. In some embodiments, location near to a user feature 212 allows the user or the system 100 to determine location of the user feature 212. In some embodiments, location 204a-c is a location 204C at a user feature 212 of navigable space 200; for instance, at least one first transmitter 128 may be attached to the user feature 212. At least one first transmitter 128 may be incorporated in the user feature 212.

With continued reference to FIG. 2, location 204a-c may be fixed. A location may be fixed if it does not change position during typical use of navigable space 200. For instance, if location is within a fixture in navigable space 200, location may be unlikely to change position. Likewise, if location 204a-c is incorporated or attached to a trash can, although the trash can may be moveable, it may be likely to remain in more or less the same part of a room during typical use; for instance, the trash can in some bathrooms is more or less invariably located beneath or beside a paper-towel dispenser. Further examples of fixed locations include, without limitation, a baseboard at a wall corner such as a corner at intersecting corridors, the front or bottom edge of a countertop such as the front or bottom edge of a countertop in front of a user feature, on a wall at the end of a countertop, on the face of or underneath a countertop at a sink, at the back of a stall at door or eye level, at the back of a stall door away from the toilet, and the bottom corner of a door (for instance at the strike or handle side); the door used for location 204a-c may be an entrance or exit door. In some embodiments, where location 204a-c is fixed, the position of the fixed location 204a-c within navigable space 200 may be used to determine the position, orientation, or both of the user within navigable space 200, as set forth in further detail below.

Still referring to FIG. 2, at least one first transmitter 128 may alternatively or additionally be located in a non-fixed location. The non-fixed location may be a location that is not necessarily predictable or affixed to a feature of navigable space 200; the non-fixed location may nevertheless be likely to be within navigable space 200. For instance, the non-fixed location may be in a trash can, a recycled paper or aluminum container, on a menu, or on a mop or other piece of equipment intended for use in navigable space 200.

Continuing to refer to FIG. 2, at least a transmitter 128 may communicate with at least a user feature 212. For instance, at least a transmitter 128 may be wired to a circuit in the user feature 212, such as a circuit containing a user presence sensor 148; as a non-limiting example, at least a transmitter 128 may be connected to a user presence sensor 148 incorporated in an automatically flushing toilet or urinal, and may receive a signal when the user presence sensor 148 detects a user is using the toilet or urinal. In other embodiments, at least one first transmitter 128 communicates wirelessly with a circuit in the user feature 215; for instance, at least one first transmitter 128 may receive a signal via the antenna 132 from the user feature. Further examples of interaction between at least a transmitter and at least a user feature are described below.

In some embodiments, the system 100 includes a surface feature 216 indicating location 204A of at least one first transmitter 128. The surface feature 216 may be a projection such as a "bump". The surface feature 216 may be an indentation. The surface feature 216 may include a sign such as an ADA (Americans with Disabilities Act) sign or building directory. The surface feature 216 may be a region of the surface having a different texture from the surrounding surface. As a non-limiting example, where the at least one at least a transmitter 128 is located in a baseboard, the surface feature 216 may be a projection or indentation that a user is able to detect with the tip of a white cane as described in further detail below; in some embodiments, where wireless receiver 104 is only able to detect at least one first transmitter 128 at short range, the user may locate the surface feature to place the receiver in communication with at least one first transmitter 128.

In other embodiments, a surface feature 216 may be positioned or formed to be readily located using a user's hand. For instance, the surface feature 216 may be located on a countertop, sign, or other item located within the reach of a user during navigation or use of navigable space 200. The surface feature 216 may have a specific shape, such as a raised 3-dimensional product logo or the like to identify location of the transmitter and distinguish it from other random "bumps". The surface feature 216 may also have a form recognizable to the user, such as a message in braille or a "bump dot" such as those often used by visually impaired persons to mark locations of important items.

Location 204a-c may alternatively be located at a consistent or predictable spot within navigable space 200, such as at a corner, at a doorjamb on a particular side of a door, or on a sign; location 204a-c may be at a consistent location within a sign such as the top center or the right end of a line of braille. Thus, a user utilizing the system 100 may locate at least a transmitter 128 by searching for either a surface feature 216 or for a known or predictable location within navigable space 200. This may aid the user or the system 100 or both in finding location and orientation of the user within navigable space 200.

Figure 3A:
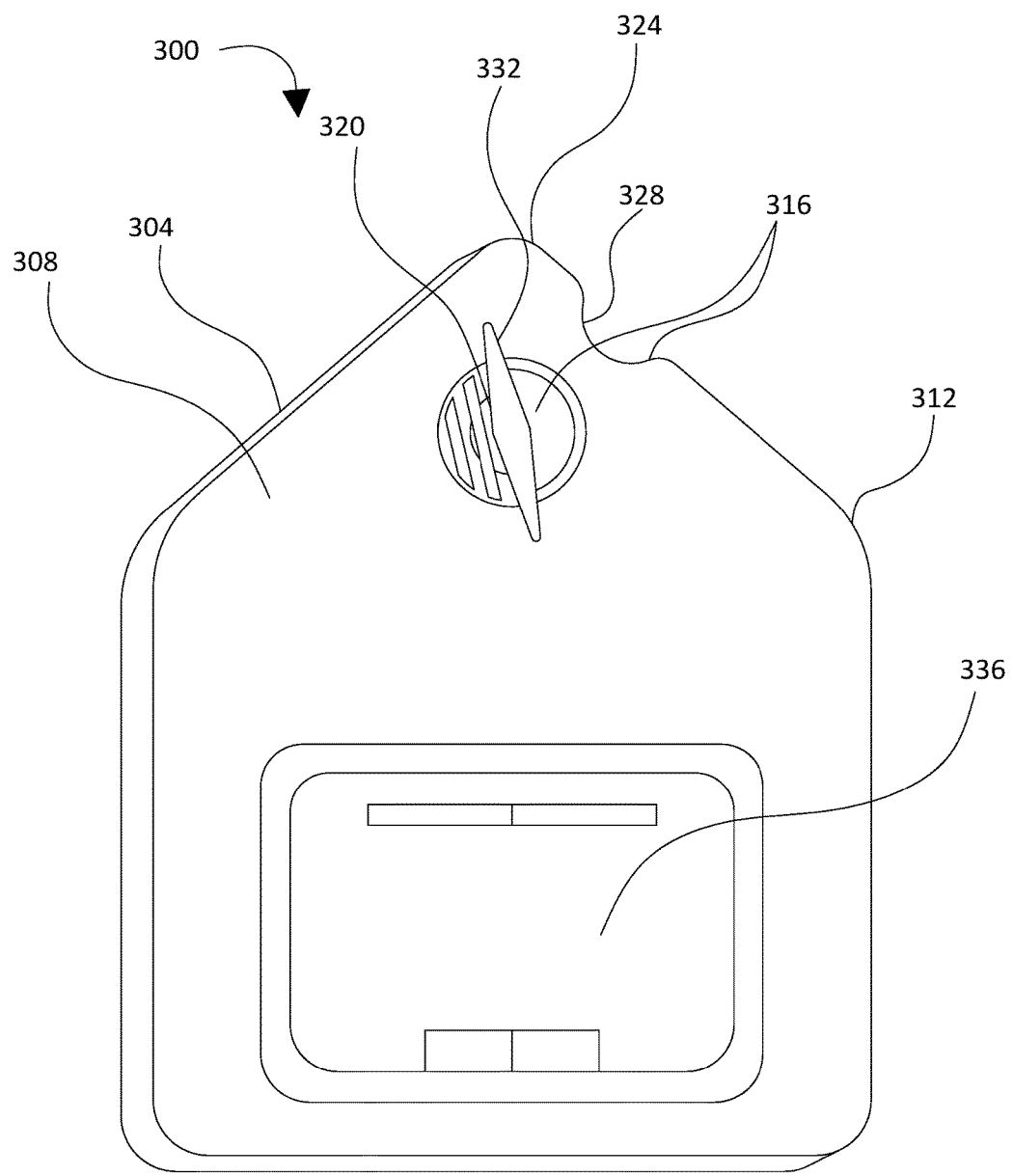
FIGS. 3A-B are schematic diagrams illustrating an exemplary embodiment of an assembly for combined tactile and wireless guidance.
Figure 3B:
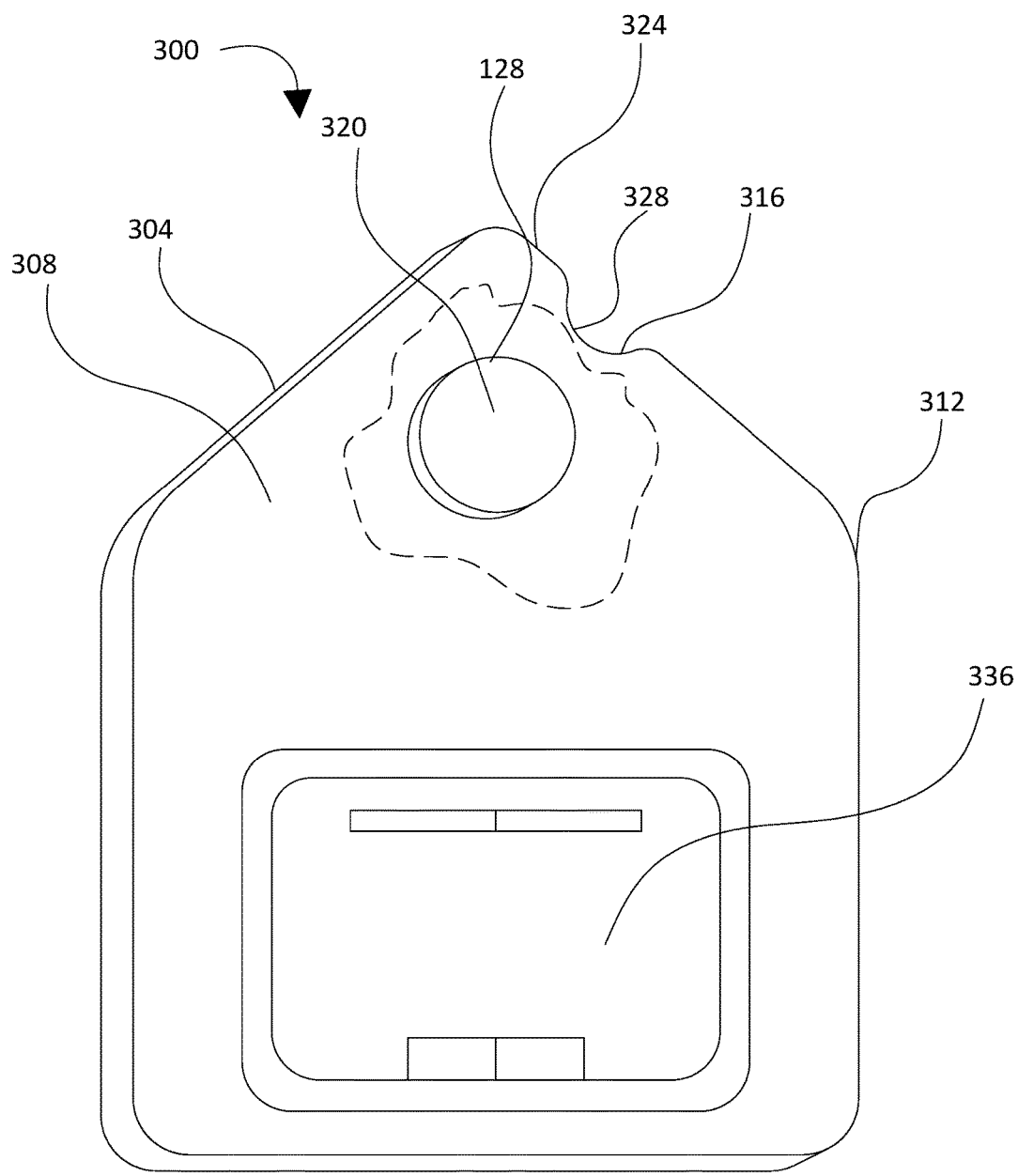

Referring now to FIGS. 3A-B, at least a first transmitter 128 may be incorporated in an assembly 300 for navigation and usage guidance in a navigable space using hybrid tactile and electronic guidance means. Assembly 300 may include a first informational object 304 installed at a fixed location in navigable space 200. First informational object 304 may include a sign, which may be an ADA sign. First informational object 304 may have any other three-dimensional form conducive to its use as described below, including a box, a pole, a projection from a wall, a door, or another architectural feature, or a portion of an architectural feature. First informational object 304 may be mounted to a vertical surface of an architectural feature; for instance, the first informational object 304 may be mounted on a wall or door. First informational object 304 may alternatively or additionally be mounted to a horizontal surface of an architectural feature, such as a countertop. As a further non-limiting example, first informational object may be mounted to or at a user station. For instance, first informational object 304 may be mounted to a band board just below a front edge of a counter; band board may be recessed. First informational object may be placed at or mounted to band board. First informational object may include an obverse 308. Obverse 308 may include one or more surfaces accessible to the user; as a non-limiting example, where first informational object 304 includes a sign, obverse 308 may include a surface of the sign that bears indicia such as writing, braille, or tactile elements.

Still referring to FIGS. 3A-B, first informational object 304 may include a first touch-discernable feature 312 identifying the first informational object. Where first informational object 304 has an exterior edge, first touch-discernable feature 312 may include a touch-discernable feature of the exterior edge. A touch-discernable feature, as defined herein, may include any feature distinguishable from a surrounding substrate. A touch-discernable feature may include a texture that distinguishes the symbols from a surrounding substrate, such as a ridged, knurled, or otherwise rough texture on a smooth substrate, or a smooth texture on an otherwise rough substrate. A touch-discernable feature may have a different coefficient of static friction from the surrounding substrate. A touch-discernable feature may have a different coefficient of dynamic friction from the surrounding substrate. A touch-discernable feature may have different thermal properties from the surrounding substrate; for instance, either symbol or both symbols may conduct heat more or less readily than the substrate, allowing a user to detect the boundaries of the symbol by detecting apparently contrasting temperatures. A touch-discernable feature may have different electrical properties from the surrounding substrate. A touch-discernable feature may include a three-dimensional form, such as a relief, textured, or recessed form, or any combination thereof. First touch-discernable feature 312 may be an outer perimeter of a sign, from which it is possible to determine that the sign is a sign; outer perimeter may have a distinctive shape, or include one or more distinctive shapes, indicating to a user that it is a sign and/or that it is first informational object 308. First touch-discernable feature 312 may include a touch-discernable feature located on the obverse 304; for instance, first touch-discernable feature 312 may include a three-dimensional form located on the obverse. First touch-discernable feature 312 may include braille.

Continuing to refer to FIGS. 3A-B, assembly 300 may include a second touch-discernable feature 316 identifying a particular location 320. In an embodiment, second touch-discernable feature 316 is included in or on first informational object 304; particular location 320 may be a location on the obverse. Alternatively, first touch-discernable feature 312 may be located near to second touch-discernable feature 316 in a manner permitting detection of the former to aid in locating the latter; for instance, first touch-discernable feature 312 may be a baseboard marker and/or probe-redirection feature such as a probe guide as described below, with second touch-discernable feature located, for instance, vertically above baseboard marker at a height convenient for manual discovery. For instance, and without limitation, the second touch-discernable feature is located within ambulatory reach range. As used herein, ambulatory reach range is a height range in which a typical person who is navigating within navigable space 200, for instance by walking or operating a wheelchair, can conveniently reach; ambulatory reach range may be a height range suitable for placements of sinks, doorknobs, elevator controls and signs, ADA signs, and the like. Ambulatory reach range may, as a non-limiting example, include a reach range established for vertically mounted objects by regulations pursuant to the ADA. Ambulatory reach range may be between 15 inches and 48 inches above a surface on which a user travels in navigable space 200, where distance is measured at or adjacent to location of first informational object. Ambulatory reach range may be between 16 inches and 44 inches above surface on which a user travels in navigable space 200. Ambulatory reach range may be between 18 inches and 40 inches above surface on which a user travels in navigable space 200. Ambulatory reach range may be between 15 inches and 36 inches above surface on which a user travels in navigable space 200. Ambulatory reach range may include a reach height required for ADA signs; for instance, ambulatory reach range may place second touch-discernable feature a minimum of 48 inches above surface on which a user travels in navigable space 200. Ambulatory reach range may include a range of heights at which a white cane handles are positioned when held vertically with cane tips on the ground and handles disposed substantially directly over cane tips; for instance, ambulatory reach range may be at approximately chin or nose height on a person of average height. As a nonlimiting example, ambulatory reach range may be about 48 inches above the floor for unobstructed placements on vertical objects.

Still viewing FIG. 3, alternatively or additionally, second touch-discernable feature 312 may be located in a particular location relative to an architectural feature such as a doorway, doorjamb, countertop, or the like. Second touch-discernable feature 316 may include any touch discernable feature suitable for use as first touch-discernable feature 312; in an embodiment, second touch-discernable feature may be distinct from first touch-discernable feature 312. First touch-discernable feature 316 may include a touch-discernable feature 324 adjacent to particular location 320. For instance, particular location 320 may be adjacent to a particular point 328 along an exterior edge of first informational object 304; second touch-discernable feature 316 may include a touch-discernable feature 324 of the exterior edge at the particular point 324 along the exterior edge. Alternatively or additionally, second touch-discernable feature 316 may include a touch-discernable feature 332 at the particular location; for instance, second touch-discernable feature may include a three-dimensional form 332 attached to the obverse at the particular location.

With continued reference to FIGS. 3A-B, and as shown in the partial cutaway in FIG. 3B, at least a first transmitter 128 may be embedded in the first informational object 304 at the particular location 320. Where at least a first transmitter 128 is a passive transmitter as described above, it may be possible to interrogate at least a first transmitter 128 only with an interrogator in close proximity to at least a first transmitter 128; the presence of second touch-discernable feature 316 may therefore enable a user, even a user who is blind or visually impaired, to locate at least a first transmitter 128 on first informational object 304, and interrogate first transmitter 128. This in turn may have the advantage of saving on power and maintenance: at least a first transmitter 128, being passive, may consume no power ordinarily, and may function for years without any maintenance whatsoever, while interrogators, such as wireless receiver 104, may require little power to induce current and produce return signal, owing to their use in close proximity with at least a first transmitter 128.

With continued reference to FIGS. 3A-B, in an embodiment, first informational object 304 may omit one or more of the above-described features. For instance, in an embodiment, first informational object may include only a single touch-discernable feature identifying, attached to, or incorporating at least a first transmitter 128. First transmitter, may, as a non-limiting example, be incorporated in a housing having, attached to, or incorporating a form usable as second touch-discernable feature. Housing may, without limitation, have a means to attach housing to an architectural feature, user feature, or other element within navigational space; means may include adhesive backing, holes through which fasteners such as screws, nails, or tacks are passed, adhesive applied to housing and/or a surface to which housing is mounted, a hook-and-loop fastener, or the like.

Still referring to FIGS. 3A-B, first informational object may include a at least a third touch-discernable feature 336. At least a third touch-discernable feature 336 may have any form suitable for use as first touch-discernable feature 312 or second touch-discernable feature 316. At least a third touch-discernable feature 316 may identify navigable space 200; for instance, at least a third touch-discernable feature 336 may include a symbol or set of symbols identifying the navigable space 200. At least a third touch-discernable feature 336 may identify at least a user feature within navigable space 200. At least a third touch-discernable feature 336 may include a tactile map of navigable space 200; tactile map may identify architectural and/or user features. Tactile map may identify locations of other assemblies, as described herein for assembly 300, within navigable space 200. Tactile map may identify locations of other transmitters within navigable space 200, which may have any form suitable for at least a first transmitter 128, and may be incorporated in navigable space 200 in any manner suitable for incorporation therein of at least a first transmitter 128.

Figure 4A:
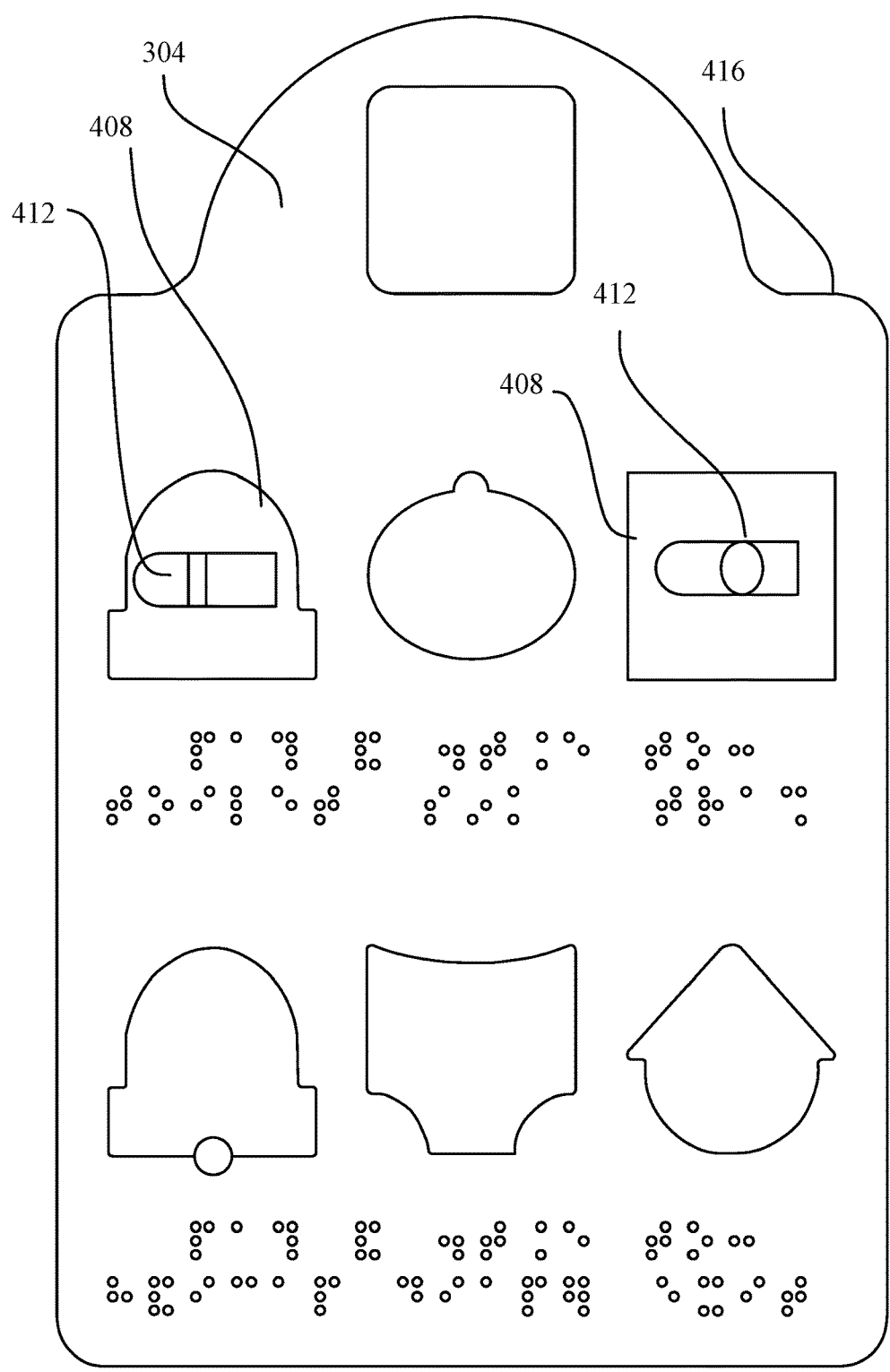
FIG. 4A is an illustration of an exemplary first informational object in an embodiment.

In an embodiment, and as illustrated for exemplary purposes in FIG. 4A, assembly 300 includes a first informational object 304 located at navigable space 200. First informational object may include at least a third touch-discernable feature. At least a third touch-discernable feature may include a shape identifying the at least a user feature; in other words, third-touch-discernable feature may include at least a touch-discernable feature symbol 408. At least a third touch-discernable feature may include a directional indicator indicating a direction in which to travel to find user feature; for instance, and without limitation, at least a third touch-discernable feature may include at least a three-dimensional path information symbol 412 that indicates how to navigate to a feature represented by at least a touch-discernable feature symbol 408. At least a third touch-discernable feature may include a touch-discernable feature that identifies first navigable space as described in further detail below. At least a third-touch discernable feature may further include a distance indicator indicating a distance for a user to travel to find user feature. Distance indicator may, as a non-limiting example, be implemented according to any means or method used for path information symbols as described in further detail below.

Still referring to FIG. 4A, first informational object 304 may be formed from any suitable material or combination of materials, including plastic or other polymer material, metal, wood, ceramic, composite fiber materials such as fiberglass or carbon fiber material, or any other artificial or natural materials. First informational object 304 may have any suitable exterior shape, including any combination of polygonal and/or curved forms. In an embodiment, first informational object 304 has an exterior perimeter 416 formed to indicate information such as a category of sign to which the first informational object 304 belongs; for example, and as further elucidated in examples illustrated and described below, the exterior perimeter 416 of the first informational object 304 may indicate that the first informational object 304 is a sign in a men's restroom, while a differing exterior perimeter 416 may indicate a sign that is in a women's restroom. In an embodiment, exterior perimeter 416 may indicate further information about first informational object 304, navigable space 200, at least a second informational object as described in further detail below, or other information useful for wayfinding.

Figure 4B:
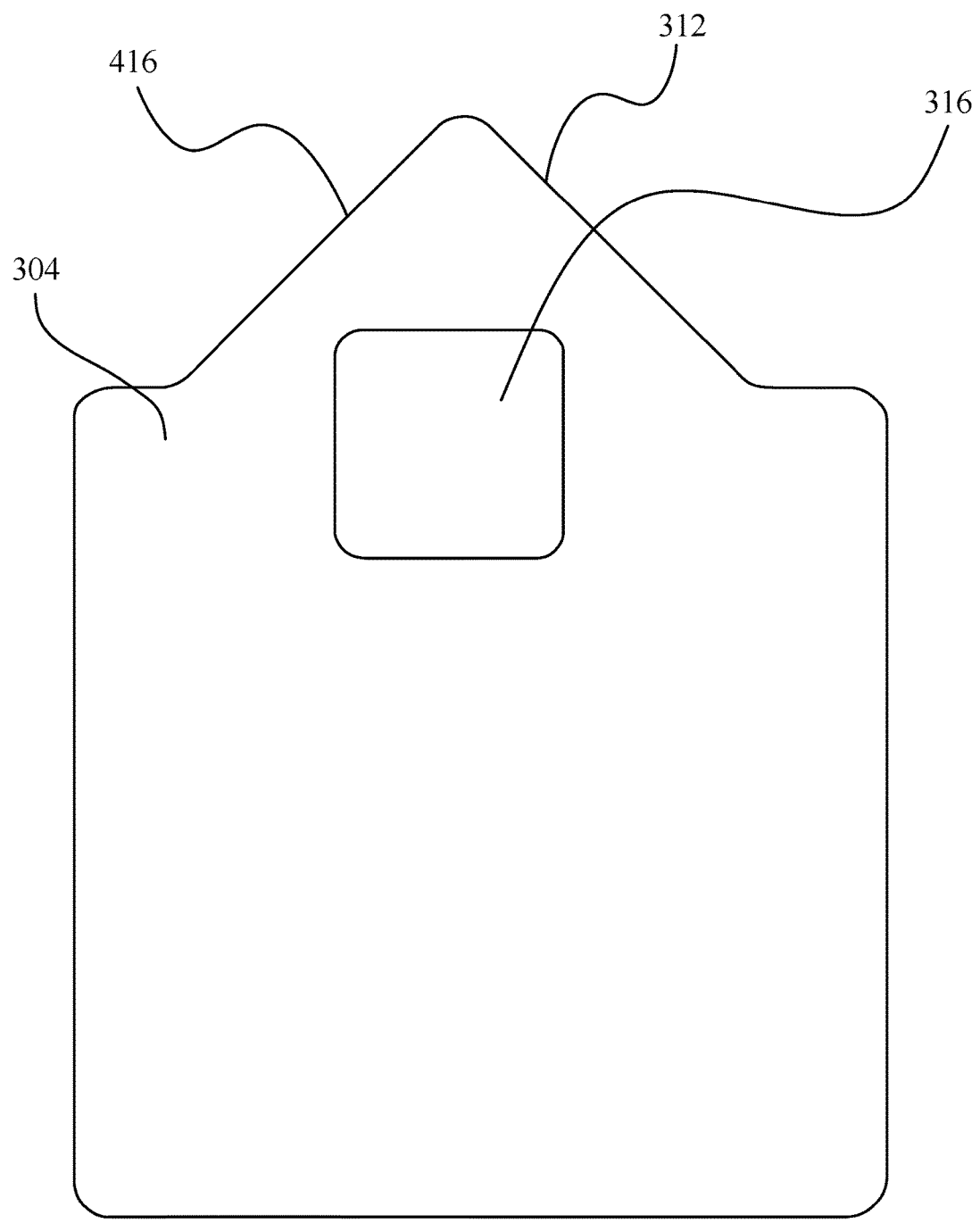
FIG. 4B is an illustration of an exemplary informational object in an embodiment.
Figure 4C:
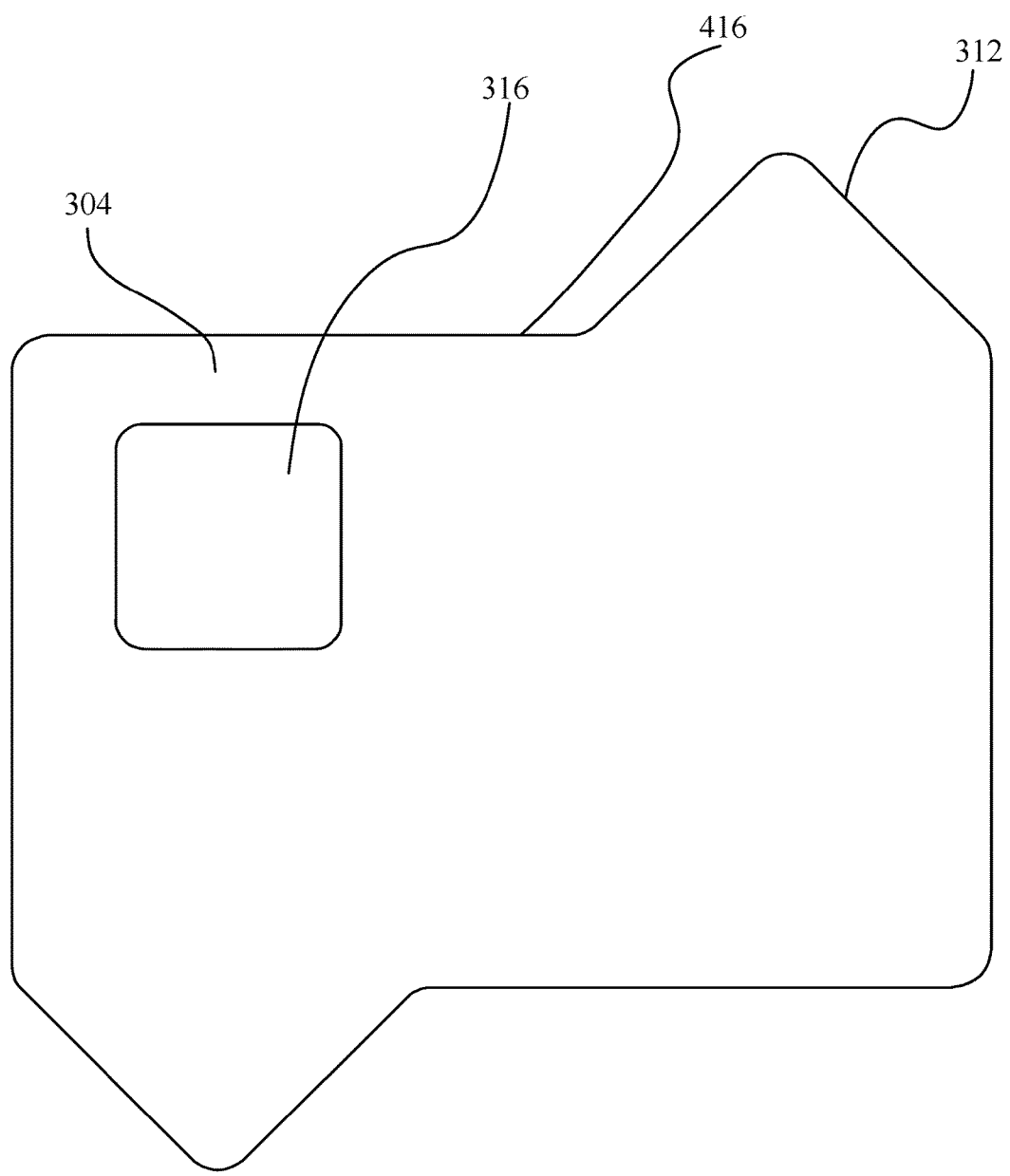
FIG. 4C is an illustration of an exemplary informational object in an embodiment.

With continued reference to FIG. 4A, at least a third touch-discernable feature may include exterior perimeter 416, or a portion thereof. As a non-limiting example, exterior perimeter 416 may have a form indicating to a user that the user is at an entrance to a navigable space 200. At least a third touch-discernable feature and/or exterior perimeter may indicate, as a non-limiting example, a category of navigable space; i.e., the form indicating the user is at an entrance may not inform the user what sort of navigable space 200 the user is about to enter; other portions of first informational object 304, including without limitation at least a touch-discernable feature symbol 408 and/or at least a three-dimensional path symbol 412, may inform a user about the contents or nature of the navigable space 200 at the entrance to which the user is located. Exterior perimeter 416 may have a form indicating what sort of navigable space 200 a user is currently occupying. For example, exterior perimeter 416 one first informational object 304 may have a first shape that indicates a space containing the first informational object 304 is a men's restroom, while exterior perimeter 416 of a second informational object may have a second shape that indicates a space containing the second informational object is a woman's bathroom. Similarly, other shapes of exterior perimeters may indicate the user is in an elevator lobby, plaza, and the like, and may contain feature symbols such as at least a touch-discernable feature symbol 408 with paths, including paths indicated by at least a three-dimensional path information symbol 412, communicating how to get to various components in or connected to that space. This may enable a user to determine what navigable space 200 the user is currently occupying solely by feeling the exterior perimeter of a sign, providing an ease of access to that information not available in existing wayfinding systems or signs. As a further example, exterior perimeter of first informational object 304 may indicate a first category of navigable space, while a second or third informational object may indicate a second or third category of navigable space; second or third category may differ from first category. For instance, and without limitation, assembly 300 may include a second informational object located in a second navigable space, the second informational object including a fourth touch-discernable feature identifying the second informational object and a fifth touch-discernable feature identifying the second navigable space. To illustrate, and without limitation, FIG. 4A depicts an embodiment of an informational object having a first exterior perimeter 416 with a first form; first form may correspond, without limitation, to a women's bathroom. Continuing the example, FIG. 4B depicts an informational object having different exterior perimeter of a different form, which may, without limitation, refer to a men's bathroom. FIG. 4C, still continuing the example, depicts a third embodiment of an informational object having a third exterior perimeter 416 form, which correspond to a third category, such as without limitation a staircase or elevator. As illustrated in FIG. 4C, exterior perimeter 416 may, in some embodiments, include path information as described in further detail herein; for instance, exterior perimeter 416 may form one or more directional arrows indicating up, down, or sideways directions of travel relative to informational object.

Referring again to FIG. 4A, first informational object 304 may include at least a touch-discernable feature symbol 408. At least a third touch-discernable feature may, for instance, include a shape identifying the at least a user feature, which may include at least a touch-discernable feature symbol 408. At least a touch-discernable feature symbol 408 may be constructed of any material or combination of materials suitable for the construction of first informational object 304. In an embodiment, at least a touch-discernable feature symbol 408 may have a shape that enables a user to identify the at least a touch-discernable feature symbol 408 by tactile means. At least a touch-discernable feature symbol 408 may be defined by negative space, such as a depression or recess into first informational object 304 or a component attached thereto; for instance, the at least a touch-discernable feature symbol 408 may include a recess having an outline that enables a user to distinguish at least a touch-discernable feature symbol 408 from other symbols. At least a touch-discernable feature symbol 408 may include a relief feature, which may be a feature that projects beyond a surface of first informational object 304. Relief feature may have any suitable three-dimensional form, including a curved or manifold form or a substantially plateaued form; the relief feature may define a clear outline or exterior perimeter shape that a user can identify as pertaining to a particular meaning of at least a touch-discernable feature symbol 408.

Continuing to refer to FIG. 4A, at least a touch-discernable feature symbol 408 may represent a feature at or within navigable space 200. In an embodiment, at least a touch-discernable feature symbol 408 may represent at least a user feature; for instance, a first three-dimensional feature symbol of the at least a touch-discernable feature symbol 408 may have a first three-dimensional shape representing a first user feature 212, such as a toilet, and a second three-dimensional symbol of the at least a touch-discernable feature symbol 408 may have a second three-dimensional shape representing a second user feature 212 such as a sink or paper towel station. Assembly 300 may include various three-dimensional shapes of at least a touch-discernable feature symbol 408 representing various features, as further set forth in exemplary embodiments described below. At least a touch-discernable feature symbol 408 may include a three-dimensional feature symbol that represents an architectural feature 208. At least a touch-discernable feature symbol 408 may include a three-dimensional feature symbol that represents at least a second informational object. At least a touch-discernable feature symbol 408 may include a three-dimensional feature symbol that represents an exit from or entrance to navigable space 200. At least a touch-discernable feature symbol 408 may include a three-dimensional feature symbol that represents a tactile map as disclosed below. At least a touch-discernable feature symbol 408 may include a three-dimensional feature symbol that represents a probe-redirecting navigational aid as described below. In an embodiment, at least a touch-discernable feature symbol 408 has a textured surface; for instance, the at least a touch-discernable feature symbol 408 may have a textured grid. At least a three-dimensional symbol 408 may also represent another navigable space located some distance away from the current navigable space 200. For example, at least a three-dimensional symbol 408, solely or in combination with at least a three-dimensional path information symbol 412, may indicate how to get to a front desk from an elevator lobby or to an exit of a building. At least a three-dimensional symbol 408 may also represent other features or spaces connected to current navigable space 200. For example, a plaza sign may have three-dimensional symbols 408 indicating store locations, elevator lobbies, or stairwells connected to a plaza in which the plaza sign is located. At least a touch-discernable feature symbol 408 may represent navigable spaces, such as navigable spaces within or adjacent to a current navigable space 200.

Still referring to FIG. 4A, at least a touch-discernable feature symbol 408 may be attached to first informational object 304 in any suitable way. At least a touch-discernable feature symbol 408 may form a monolithic whole with first informational object 304; for example, at least a touch-discernable feature symbol 408 and first informational object 304 may be formed together in a single manufacturing process, such as without limitation a molding process, an additive manufacturing process, a subtractive manufacturing process, or any combination of such processes. At least a touch-discernable feature symbol 408 may be attached to first informational object 304 using a fastener, which may include without limitation a screw, bolt, latch, or staple. At least a touch-discernable feature symbol 408 may be adhered to first informational object 304; for example, first informational object 304 may have one or more adhesive pads, sheets, or other elements to which at least a touch-discernable feature symbol 408 may be attached. At least a touch-discernable feature symbol 408 may have adhesive backing or be otherwise attached with adhesive. Adhesive may be any suitable adhesive, including press-adhesives, glues, and the like. Adhesive may include a reusable adhesive. At least a touch-discernable feature symbol 408 may be attached to first informational object 304 by a press-fastener, such as a hook-and loop fastener. First informational object 304 may include an engagement feature to which at least a touch-discernable feature symbol 408 attaches; the engagement feature may include threading that engages projections or corresponding threading of the at least a touch-discernable feature symbol 408. Engagement feature may include one or more tabs or grooves into which a portion of at least a touch-discernable feature symbol 408 may be inserted. Engagement feature may include a recess in first informational object 304 into which at least a touch-discernable feature symbol 408 may be fitted; the at least a touch-discernable feature symbol 408 may snap into the recess, for instance aided by one or more tabs as set forth in further detail in examples described below. At least a touch-discernable feature symbol 408 may attach to an intermediate feature that attaches to first informational object 304.

Continuing to refer to FIG. 4A, in some embodiments, presence on first informational object 304 of a three-dimensional feature symbol of at least a touch-discernable feature symbol 408 that corresponds to a particular user feature 212 indicates presence of that user feature 212 at or within navigable space 200. Alternatively, first informational object 304 may be a sign that corresponds to a particular category of navigable space 200, and include a three-dimensional feature symbol of at least a touch-discernable feature symbol 408 that corresponds to a particular user feature 212 whether or not that particular user feature 212 is present; first informational object 304 may include other elements that indicate whether the particular user feature 212 is present, such as the presence of a path information symbol of at least a three-dimensional path information symbol 412 corresponding to the feature symbol and particular user feature 212.

Still referring to FIG. 4A, first informational object 304 may include at least a three-dimensional path information symbol 412. For instance, and without limitation, at least a third touch-discernable feature may include a directional indicator indicating a direction in which to travel to find user feature; directional indicator may be any at least a three-dimensional path information symbol 412 as described in further detail below. In an embodiment, at least a three-dimensional path information symbol 412 is a symbol that displays tactile indicia informing a user of path information to follow to arrive at a feature indicated by the at least a touch-discernable feature symbol 408. Path information may include one or more distances to travel; one or more distances may include distances to travel in one or more substantially straight lines. One or more distances may include distances to travel along curved paths, such as following a curved corridor. Path information may include turn information. Turn information may include the degrees by which a user should turn to follow the path; for instance, at least a three-dimensional path information symbol 412 may have indicia that indicate a user should make a 90-degree turn or a 270-degree turn. Path information may include sequence information, indicating an order in which distance and turn information are to be followed. As a non-limiting example, path information may indicate that a user should travel about 20 feet in an initial direction, turn 90 degrees, and travel approximately another 10 feet to arrive at a feature.

Continuing to refer to FIG. 4A, at least a three-dimensional path information symbol 412 may be made of any material or combination of materials suitable for the construction of first informational object 304 as described above. At least a three-dimensional path information symbol 412 may be attached to first informational object 304 by any means suitable for attachment of at least a three-dimensional feature symbol, as described above. At least a three-dimensional path information symbol 412 may be a relief, textured, or recessed form, or may include any combination thereof, similarly to at least a touch-discernable feature symbol 408. At least a three-dimensional path information symbol 412 indicates how to navigate to a feature represented by at least a touch-discernable feature symbol 408. In an embodiment, relative placement on first informational object 304 of at least a three-dimensional path information symbol 412 and at least a touch-discernable feature symbol 408 indicates which three-dimensional feature symbol of at least a touch-discernable feature symbol 408 a particular three-dimensional path information symbol of at least a three-dimensional path information symbol 412 corresponds to. As a non-limiting example, at least a three-dimensional path information symbol 412 may be located adjacent on first informational object 304 to at least a touch-discernable feature symbol 408; where the at least a touch-discernable feature symbol 408 includes a plurality of three-dimensional feature symbols, for instance arranged in a grid, one or more of at least a three-dimensional path information symbol 412 may be placed in cells of the grid containing related three-dimensional feature symbols 408.

Still referring to FIG. 4A, a three-dimensional path information symbol of at least a three-dimensional path information symbol 412 may be attached to a three-dimensional feature symbol of at least a touch-discernable feature symbol 408 to which the at least a three-dimensional path information symbol of at least a three-dimensional path information symbol 412 corresponds. Three-dimensional path information symbol 412 may be attached to the corresponding three-dimensional feature information symbol 408 using any means suitable for the attachment of the at least a touch-discernable feature symbol 408 to the first informational object 304 as described above. As a non-limiting example, at least a touch-discernable feature symbol 408 may include a recess into which a corresponding feature of at least a three-dimensional path information symbol 412 may be inserted or snapped. In some embodiments, at least a three-dimensional path information symbol 412 attaches to an intermediate feature that snaps into the recess; at least a three-dimensional path information symbol 412 may attach to the intermediate feature using any means for attaching at least a touch-discernable feature symbol 408 to first informational object 304. Similarly, as noted above, at least a touch-discernable feature symbol 408 may attach to or snap into an intermediate feature (not shown), which may be formed similarly to intermediate feature, and which may attach to first informational object 304.

Figure 5A:
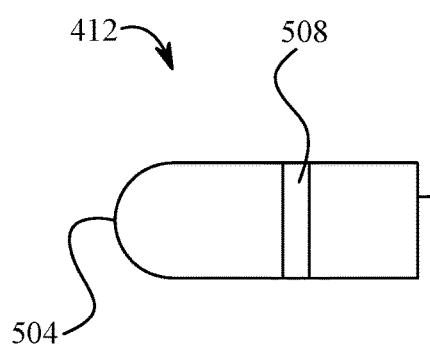
FIGS. 5A-N are illustrations of exemplary at least a three-dimensional path information symbol in an embodiment.
Figure 5B:
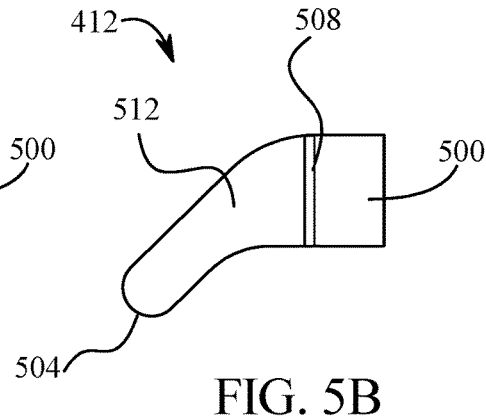
Figure 5C:
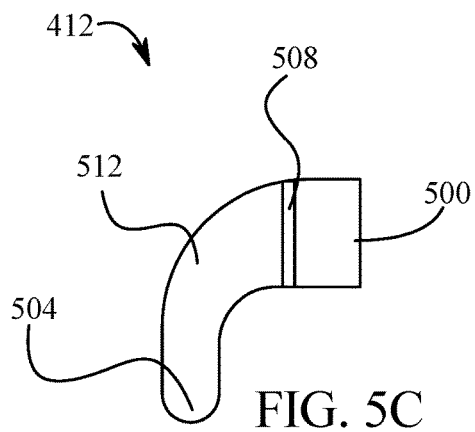
Figure 5D:
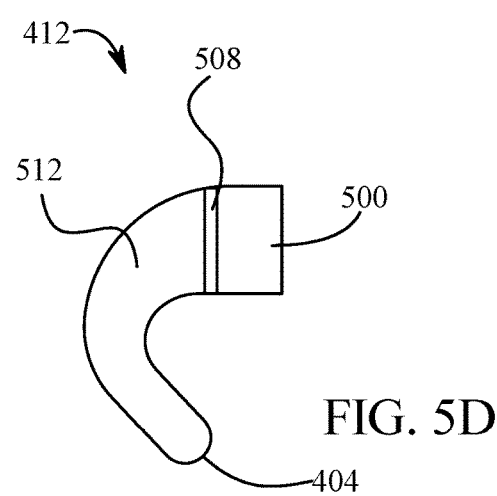
Figure 5E:
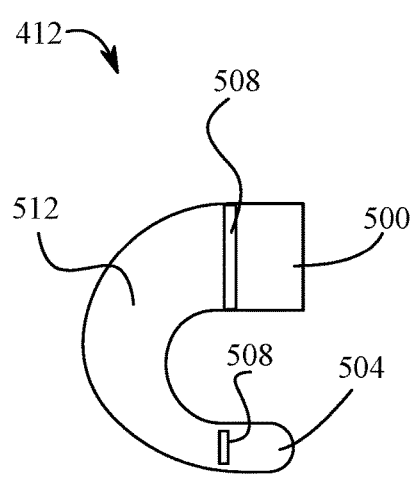
Figure 5F:
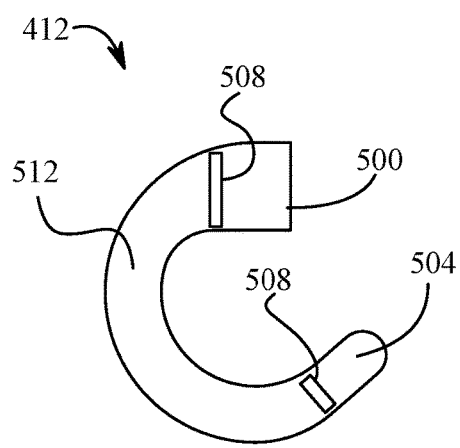
Figure 5G:
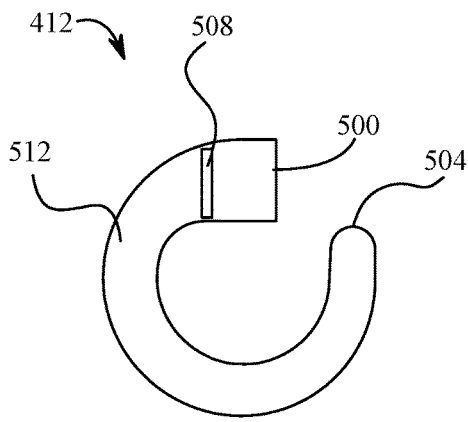
Figure 5H:
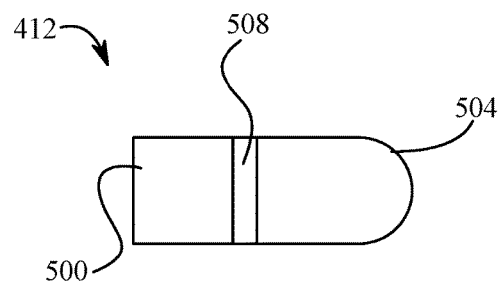
Figure 5I:
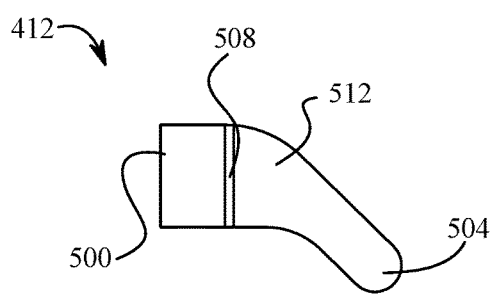
Figure 5J:
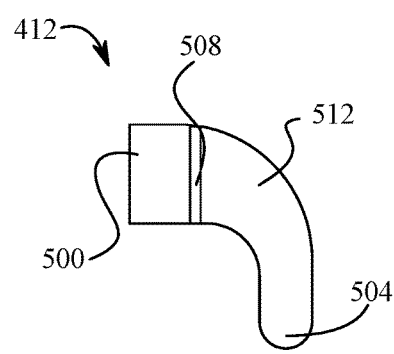
Figure 5K:
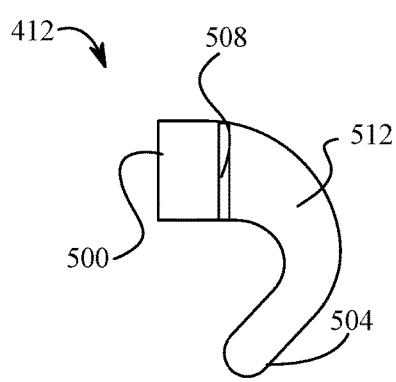
Figure 5L:
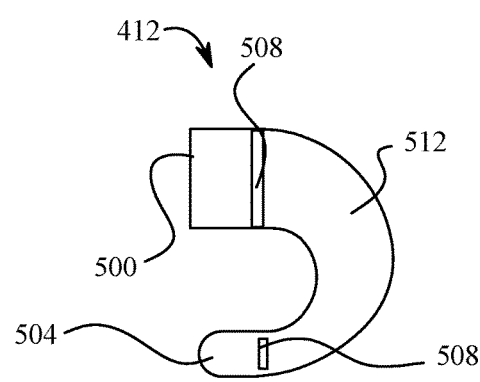
Figures 5M, 5N:
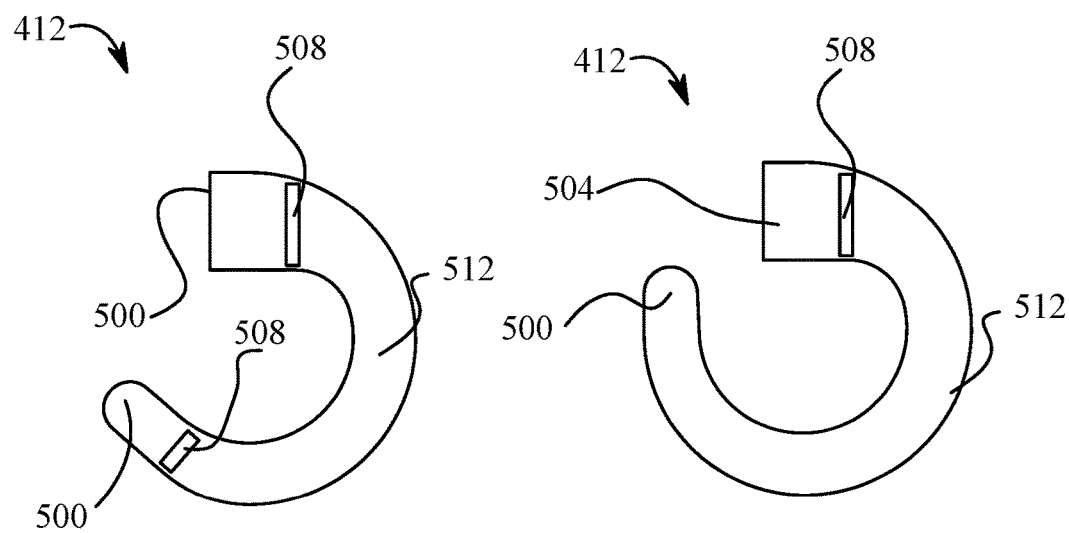

Referring now to FIGS. 5A-N, certain exemplary embodiments of at least a three-dimensional path information symbol 412 are illustrated. At least a three-dimensional path information symbol 412 may include an initial end 500; in an embodiment, initial end 500 is an end of at least a three-dimensional path information symbol 412 at which a user begins feeling along at least a three-dimensional path information symbol 412 to detect the sequence of movements required to follow directions in at least a three-dimensional path information symbol 412. Initial end 500 of at least a three-dimensional path information symbol 412 may have at least a signature tactile form to make initial end 500 easy to identify for a user; for instance, initial end 500 may have a straight edge with two 90-degree corners. At least a three-dimensional path information symbol 412 may include a terminal end 504, which may indicate the end of the sequence of instructions displayed by at least a three-dimensional path information symbol 412; terminal end 504 may be at an opposite end from initial end 500. Terminal end 504 may include a signature tactile form to identify terminal end 504 to a user. Signature tactile form of terminal end 504 may contrast with signature tactile form of initial end 500; in an embodiment, this may enable a user more readily to tell the initial end 500 from the terminal end 504 and to follow the path information displayed by at least a three-dimensional path information symbol 412 correctly. As a non-limiting example, terminal end 504 may be round or approximately semicircular. As a further non-limiting example, initial end 500 of at least a three-dimensional path information symbol 412 may be wider than terminal end 504. Multiple distinguishing forms may be combined to further differentiate the initial 500 and terminal 504 ends, as well as other locations along at least a three-dimensional path information symbol 412. There may be a plurality of terminal ends pointing in different directions; for instance, there may be two or more equally suitable paths navigable to arrive at the feature described by the at least a touch-discernable feature symbol 408, and at least a three-dimensional path information symbol 412 may branch, indicating two or more potential paths, and terminate at two or more terminal ends. Alternatively, each alternative path may be indicated by a separate three-dimensional path information symbol 412. An example of two equally suitable paths that may be illustrated as described above may be at two intersecting corridors, where there are exits at the end of each corridor.

Still referring to FIGS. 5A-N, at least a three-dimensional path information symbol 412 may include a plurality of segments. The at least a three-dimensional path information symbol 412 may include a first segment at the initial end 500 having a first width and one or more subsequent segments at a second width. Plurality of segments may be attached together, manufactured together, or separately attached to first informational object 304 or at least a touch-discernable feature symbol 408. Each segment of the plurality of segments may transition smoothly from a previous segment or to a subsequent segment.

Continuing to refer to FIGS. 5A-N, at least a three-dimensional path information symbol 412 may include one or more distance symbols 508. A distance symbol 508 on a segment of plurality of segments may indicate the distance for a user to travel in a direction indicated by that segment. In an embodiment, different distance symbols 508 indicate different distances to travel along the segment. As a non-limiting example, a single raised line segment may indicate a first incremental distance of travel, such as a ten-foot distance of travel, a set of two parallel line segments may indicate a second incremental distance of travel which may be twice the first incremental distance of travel, such as 20 feet, four contiguous line segments making a rectangle may indicate a third differing distance for the segment, such as a distance 50 feet, a rectangle filled in to make a solid rectangle may indicate a fourth distance, such as a distance of greater than 75 feet, and a dome-shaped marker may indicate a fifth distance, such as a distance of greater than 100 feet. The foregoing example is only intended to indicate one possible implementation for encoding various distances in at least a three-dimensional path information symbol 412 for illustrative purposes; any set of tactile symbols, raised or indented, may be used to indicate the distance to travel along a particular segment of at least a three-dimensional path information symbol 412.

Continuing to refer to FIGS. 5A-N, initial end 500 may indicate the current location of the user, for instance at first informational object 304. There may be an initial direction of travel, such as a direction of travel perpendicular to plane of first informational object 304. In other embodiments, at least a three-dimensional path information symbol 412 may indicate other initial directions of travel. For instance, as shown in FIGS. 4A-G, initial end 500 may be to the right of subsequent segments in at least a three-dimensional path information symbol 412, which may indicate initial travel is to the left of a user facing first informational object 304; as shown in FIGS. 4H-N, where the initial end 500 is to the left of subsequent segments in at least a three-dimensional path information symbol 412, an initial travel direction to the right of a user facing the first informational object 304 may be indicated. At least a three-dimensional path information symbol 412 may indicate initial direction of travel generally to the right or left, or may indicate the initial direction of travel as an angle away from the current orientation of the user. As a non-limiting example, an initial section of at least a three-dimensional path information symbol 412 may be attachable to first informational object 304 at rotational increments of 45 degrees within the plane defined by the face of the first informational object 304, for instance at multiples of 45 degrees from a substantially vertical position; the rotational positions of the at least a three-dimensional path information symbol 412 may correspond to directions of travel of the user in the horizontal plane as defined by angles from a position facing the first informational object 304. Thus, continuing the example, a first section at an angle of 45 degrees counterclockwise from the vertical line on first informational object 304 may indicate that the user should proceed at an angle of 45 degrees to the left from a position facing the sign, an angle of 90 degrees counterclockwise from the vertical line may indicate that the user should begin in an initial direction of travel of 90 degrees to the left from the position facing the first informational object 304, an angle of 135 degrees counterclockwise from the vertical line on first informational object 304 may indicate that the user should proceed at an angle of 135 degrees to the left from a position facing the sign, and angle of 180 degrees counterclockwise from the vertical line on first informational object 304 may indicate that the user should proceed at an angle of 180 degrees to the left from a position facing the sign. Similarly, and further continuing the example, a first section at an angle of 45 degrees clockwise from the vertical line on first informational object 304 may indicate that the user should proceed at an angle of 45 degrees to the right from a position facing the sign, an angle of 90 degrees clockwise from the vertical line may indicate that the user should begin in an initial direction of travel of 90 degrees to the right from the position facing the first informational object 304, an angle of 135 degrees clockwise from the vertical line on first informational object 304 may indicate that the user should proceed at an angle of 135 degrees to the right from a position facing the sign, and angle of 180 degrees clockwise from the vertical line on first informational object 304 may indicate that the user should proceed at an angle of 180 degrees to the right from a position facing the sign. This example is provided for illustrative purposes only; persons skilled in the art, upon reading the entirety of this disclosure, will be aware that angular increments other than 45 degrees may be used, and that the mapping of counterclockwise angles to user angles of movement to the left, for instance, is only one of various conventions that may be followed.

Still referring to FIGS. 5A-N, at least a three-dimensional path information symbol 412 may include one or more turn instructions 512, which may indicate that a user must turn to follow the path information; one or more turn instructions 512 may further indicate the degree to which the user must turn. As a non-limiting example, one or more turn instructions 512 may describe the degree of the turn by containing a curve that sweeps through the number of degrees in which the user must turn. By way of illustration only, and without limitation, FIG. 5A depicts an exemplary embodiment of a path information symbol of the at least a three-dimensional path information symbol 412 that indicates that a corresponding feature is directly to the left of a user facing at first informational object 304. FIG. 5B depicts an exemplary embodiment of a path information symbol of the at least a three-dimensional path information symbol 412 that indicates that a user facing at first informational object 304 should proceed left, then turn left at a 45-degree angle. FIG. 5C depicts an exemplary embodiment of a path information symbol of the at least a three-dimensional path information symbol 412 that indicates that a user facing at first informational object 304 should proceed left, then make a 90-degree turn to the left. FIG. 5D depicts an exemplary embodiment of a path information symbol of the at least a three-dimensional path information symbol 412 that indicates that a user facing at first informational object 304 should proceed left, then make a 135-degree turn to the left. FIG. 5E depicts an exemplary embodiment of a path information symbol of the at least a three-dimensional path information symbol 412 that indicates that a user facing at first informational object 304 should proceed left, then make a 180-degree turn to the left. FIG. 5F depicts an exemplary embodiment of a path information symbol of the at least a three-dimensional path information symbol 412 that indicates that a user facing at first informational object 304 should proceed left, then make a 225-degree turn to the left. FIG. 5G depicts an exemplary embodiment of a path information symbol of the at least a three-dimensional path information symbol 412 that indicates that a user facing at first informational object 304 should proceed left, then make a 270-degree turn to the left. Similarly to initial directional indicators, turn directions may be limited to varying between particular angular increments, such as increments of 45 degrees.

Continuing the exemplary illustrations, FIG. 5H depicts an exemplary embodiment of a path information symbol of the at least a three-dimensional path information symbol 412 that indicates that a corresponding feature is directly to the right of a user facing at first informational object 304. FIG. 5I depicts an exemplary embodiment of a path information symbol of the at least a three-dimensional path information symbol 412 that indicates that a user facing at first informational object 304 should proceed right, then turn right at a 45-degree angle. FIG. 5J depicts an exemplary embodiment of a path information symbol of the at least a three-dimensional path information symbol 412 that indicates that a user facing at first informational object 304 should proceed right, then make a 90-degree turn to the right. FIG. 5K depicts an exemplary embodiment of a path information symbol of the at least a three-dimensional path information symbol 412 that indicates that a user facing at first informational object 304 should proceed right, then make a 135-degree turn to the right. FIG. 5L depicts an exemplary embodiment of a path information symbol of the at least a three-dimensional path information symbol 412 that indicates that a user facing at first informational object 304 should proceed right, then make a 180-degree turn to the right. FIG. 5M depicts an exemplary embodiment of a path information symbol of the at least a three-dimensional path information symbol 412 that indicates that a user facing at first informational object 304 should proceed right, then make a 225-degree turn to the right. FIG. 5N depicts an exemplary embodiment of a path information symbol of the at least a three-dimensional path information symbol 412 that indicates that a user facing at first informational object 304 should proceed right, then make a 270-degree turn to the right. At least a three-dimensional path information symbol 412 may include other features, such as a raised edge on one side; the raised edge may instruct a user to follow the wall to that side of the path such as around a corner or corridor into a space.

Figure 6A:
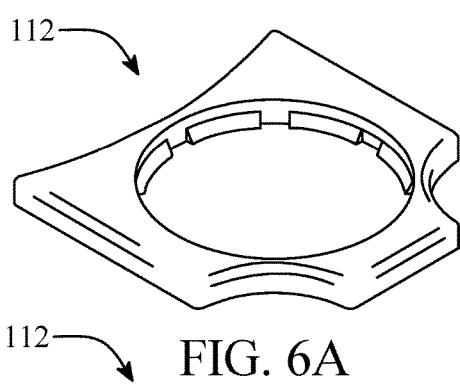

FIGS. 6A-N illustrate some exemplary embodiments of at least a feature symbol 408.

Figure 6B:
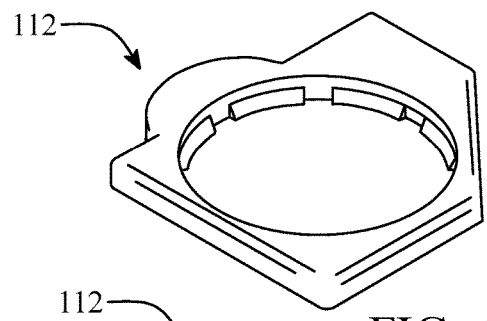
Figure 6C:
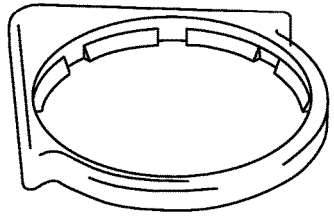
Figure 6D:
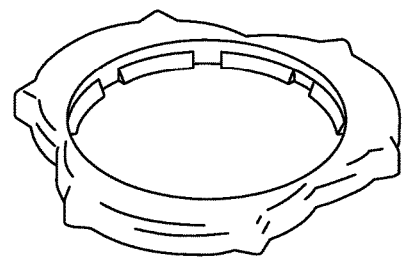
Figure 6E:
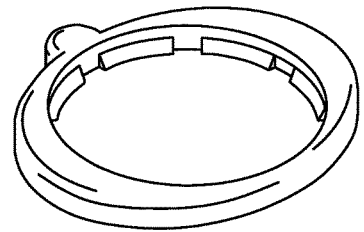
Figure 6F:
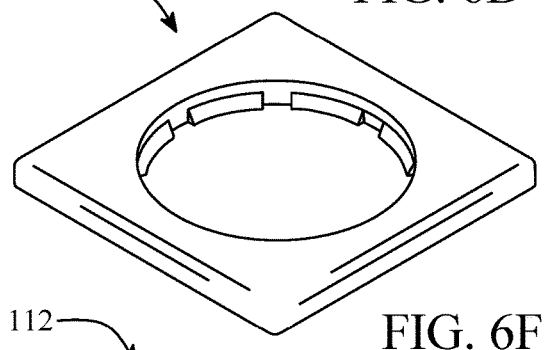
Figure 6G:
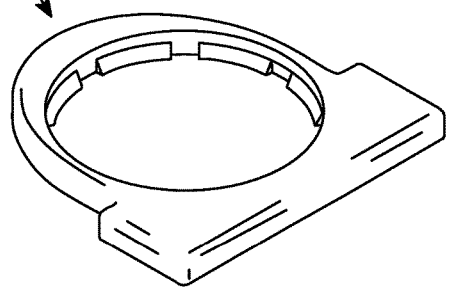
Figure 6H:
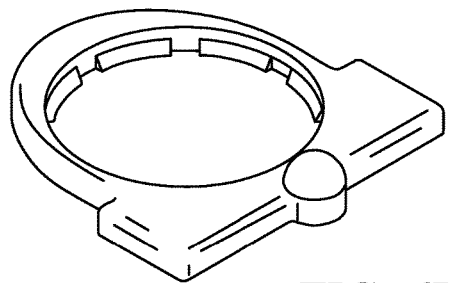

FIG. 6A illustrates an exemplary feature symbol for a diaper station. FIG. 6B illustrates an exemplary feature symbol for a water fountain. FIG. 6C illustrates an exemplary feature symbol for an exit. FIG. 6D illustrates an exemplary feature symbol for a sharps container. FIG. 6E illustrates an exemplary feature symbol for a sink. FIG. 6F illustrates an exemplary feature symbol for a trash receptacle. FIG. 6G illustrates an exemplary feature symbol for a toilet. FIG. 6H illustrates an exemplary feature symbol for a handicap toilet. FIG. 6I illustrates an exemplary feature symbol for a urinal. FIG. 6J illustrates an exemplary feature symbol for a handicap urinal. FIG. 6K illustrates an exemplary feature symbol for a men's restroom. FIG. 6L illustrates an exemplary feature symbol for a women's restroom.

FIG. 6M illustrates an exemplary feature symbol for a unisex restroom. FIG. 6N illustrates an exemplary feature symbol 408 for an entry or "way in"; this symbol may include an indicator 600 illustrating which way a door in the corresponding entry or way in opens. Indicator 600 may resemble a door handle or other item. As a non-limiting example, placement of indicator 600 at an edge of way in feature symbol 408 may indicate that a door in the way in is opened from a corresponding edge of the door, or pivots about an edge opposite the corresponding edge. Indicator 600 may also indicate whether a door opens inward or outward. Feature symbol for an entry or way in may have one or more recesses along a perimeter of feature symbol; the one or more recesses may be unique to an entry or way in feature symbol to distinguish the entry or way in feature symbol from feature symbols corresponding to other features. The foregoing examples are provided for illustrative purposes only, and are not intended to limit the scope of this disclosure. A person skilled in the art, upon reading the entirety of this disclosure, will be aware of further potential embodiments within the scope of this disclosure, including a virtually limitless variety of specific shapes that may be chosen to represent specific features. FIGS. 6A-N illustrate embodiments of at least a feature symbol 408 having recesses or holes to receive at least a three-dimensional path information symbol 412 or an intermediate feature; in other embodiments such recesses or holes may have a different form or may not be present.

The type, quantity, and layout of three-dimensional feature symbols 408 may be consistent per venue type; for instance, all men's restroom directory signs may have the same three-dimensional feature symbols, with absent three-dimensional path information symbols indicating that a particular feature is not found in a particular restroom. Some symbols may be located in predictable portions of directory signs. For example, exit information may be found in the bottom right corner of directory signs for all venues. As a further example, handicap stations may always be listed directly below the same type of station that is not a handicap station (e.g., a handicap toilet symbol may be located directly below a symbol for a non-handicap toilet).

First informational object 304 may include a plurality of recesses for inserting at least a touch-discernable feature symbol 408. Some recesses may be shaped to accept a particular three-dimensional feature symbol only, such as an exit symbol; this may be the case where the particular three-dimensional feature symbol represents a feature found in all navigable spaces, such as an exit, where locating the three-dimensional feature symbol rapidly may warrant a predictable location of the three-dimensional feature symbol on first informational object 304. Some recesses may be shaped to accept various three-dimensional symbols; for instance, a typical three-dimensional symbol may be mounted on a substantially square base that fits a substantially square recess. In an embodiment, at least a three-dimensional path information symbol 412 may be attached to at least a touch-discernable feature symbol 408. In an embodiment, at least a three-dimensional path information symbol 412 is attached to first informational object 304. It should be noted that in an embodiment, there is no feature symbol, and first informational object 304 includes at least a three-dimensional path information symbol 412 combined with some other element enabling a user to determine where at least a three-dimensional path information symbol 412 is directing the user, including without limitation braille, electronic or audio information, or a predictable location on first informational object 304; for instance, for a feature found in all or nearly all navigable spaces, such as an exit, at least a three-dimensional path information symbol 412 may be located in a predictable location of the first informational object 304, permitting a user familiar with operation to identify the at least a three-dimensional path information symbol 412 as providing direction to an exit without necessitating a three-dimensional feature symbol for the exit. In an embodiment, each of at least a touch-discernable feature symbol 408 has a corresponding at least a three-dimensional path information symbol 412 inserted into its front face and braille wording below it.

At least a three-dimensional path information symbol 412 may insert into a face of at least a touch-discernable feature symbol 408 and lock into the at least a touch-discernable feature symbol 408; the attachment of at least a three-dimensional path information symbol 412 to at least a touch-discernable feature symbol 408 may be implemented according to any process described above for attaching a three-dimensional path information symbol 412 to a touch-discernable feature symbol 408. Therefore, at least a three-dimensional path information symbol 412 inserts into at least a touch-discernable feature symbol 408 in any one of multiple orientations, which all depict different yet precise pathways and distances.

First informational object 304 may include a tactile map, as described in further detail below. First informational object 304 including a tactile map may be installed at a feature, such as a sink or toilet, to aid in navigation to other features of navigable space 200. In some embodiments, at least a touch-discernable feature symbol 408 includes an entry symbol. Entry symbol may explain the location of either a door or corridor, and also explain how to get to at least a second informational object, which may be a directory, a sign at a feature, or other tactile sign as described above. Entry symbol may have a particular form; for instance, the entry symbol may be a square with rounded edges; as another non-limiting example, entry symbol may have recesses on one or more edges.

Although the at least a touch-discernable feature symbol 408 and at least a three-dimensional feature symbol 412 have been described above as a three-dimensional symbol, either may alternatively be a symbol that is tactilely detectable by other means. For instance, either or both symbols may include a texture that distinguishes the symbols from a surrounding substrate, such as a ridged, knurled, or otherwise rough texture on a smooth substrate, or a smooth texture on an otherwise rough substrate. Either symbol or both symbols may have a different coefficient of static friction from the surrounding substrate. Either symbol or both symbols may have a different coefficient of dynamic friction from the surrounding substrate. Either symbol or both symbols may have different thermal properties from the surrounding substrate; for instance, either symbol or both symbols may conduct heat more or less readily than the substrate, allowing a user to detect the boundaries of the symbol by detecting apparently contrasting temperatures. Either symbol or both symbols may have different electrical properties from the surrounding substrate.

Figure 7:
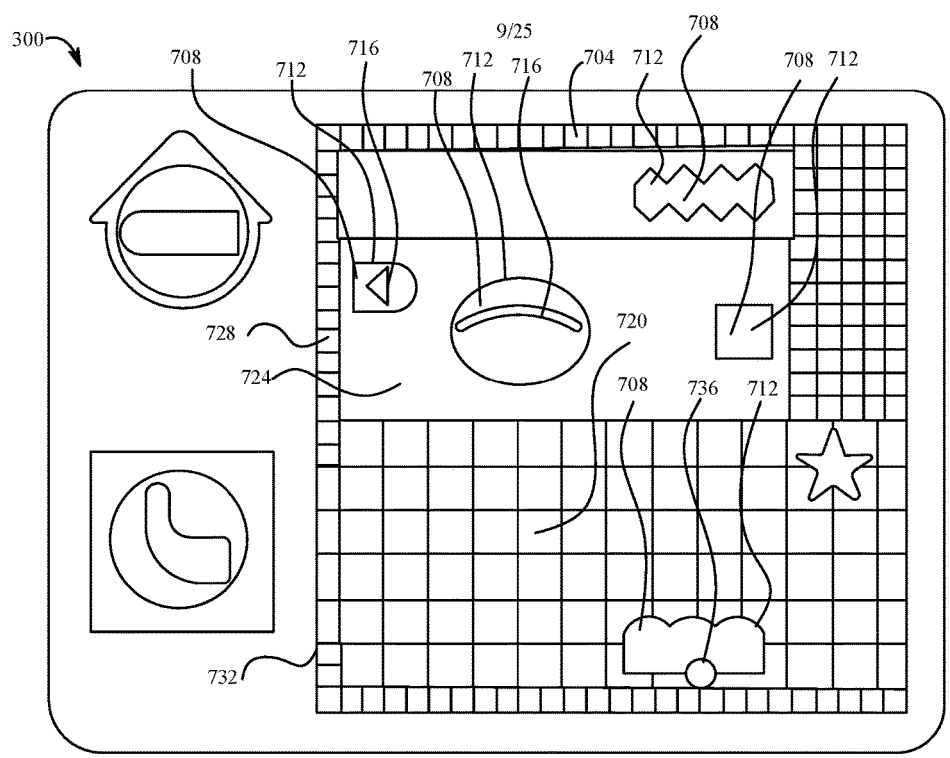
FIG. 7 illustrates an exemplary tactile map in an embodiment.

Referring now to FIG. 7, a further illustrative embodiment of assembly 300 is described illustrated. Assembly 300 may include a tactile map 704 representing a navigable space. Assembly 300 includes at least a feature indicator 708 located on the tactile map 704. The at least a feature indicator 708 includes three-dimensional form 712 identifying a feature located in the navigable space. The at least a feature indicator 708 may include a touch-discernable operation symbol 716 representing usage data for the feature located in the navigable space. Tactile map 704 may or may not be to scale; for instance, tactile map 704 may depict the relative orientation and nature of features, as described in further detail below, without necessarily revealing features' sizes or the distance between features in any exact way. As illustrated in FIG. 7, tactile map 704 may be included in a tactile sign such as first informational object 304; tactile map 704 and features of tactile sign may have any locations on tactile sign relative to one another. For instance, feature and path symbols on tactile sign may be located above, below, or on either side of tactile map 704.

Referring to FIG. 7 in further detail, assembly 300 includes a tactile map 704 representing a navigable space. Navigable space may be any navigable space 200 as described above in reference to FIG. 2. Tactile map 704 may contain various textures and symbols at differing heights that collectively represent the layout and operation of a navigable space, a specific station within the navigable space, or both. If located near to a feature, for instance if placed on a tactile sign near to a feature, tactile map 704 may represent a small vignette of the station by depicting the layout, the features within the station, each feature's orientation, height, operation, and the relative location to other features. Different textures, heights, and/or symbols of tactile map 704 may represent and differentiate the floor, countertops, shelves, walls, features, feature operation, and overall layout. Tactile map 704 may utilize contrasting colors, heights, and textures to depict layout and features of navigable space. In general, any means described above for rendering at least a touch-discernable feature symbol 408 or at least a three-dimensional path information symbol 412 may be used to distinguish features of tactile map 704.

Continuing to refer to FIG. 7, in an embodiment, the limits of navigable space may be depicted by textures to indicate different architectural features. Textures may include without limitation a floor texture 720, a countertop texture 724, or a wall texture 728. As a non-exclusive example, wall texture 728, which may represent walls, columns, partitions, or other features that extend from floor to ceiling may be a texture utilizing raised squares in a tight grid pattern. In some cases, the raised texture may protrude into the map. As another non-limiting example, floor texture 720 may be textured with small ridges in a grid pattern. Area of tactile map 704 containing floor texture 720 may abut raised wall textures 728, or it may abut the surface of a sign, such as first informational object 304, containing tactile map 704. A door 732 may be indicated by a section of floor texture 720 abutting a boundary of tactile map 704 with pieces of wall texture 728 on either side. Door 732 may also be depicted using a symbol, which may include without limitation any symbol suitable for use as a "way in" symbol as described above in reference to FIG. 6N, or any other symbol. Door symbol may have an indicator such as a handle on top of the symbol near one end of the symbol to depict which side of the door swings; alternatively, another symbol such as a triangle may indicate which way the door swings. A large section of the floor texture 720 that abuts an edge of tactile map 704 may indicate that the floor continues on but is not represented by the tactile map 704; for instance, navigable space represented by tactile map 704 may be contained within a larger navigable space not shown in its entirety on tactile map 704. As a further non-limiting example, countertop texture 724 may include a smooth raised surface; countertop texture 724 may be used to represent countertops or shelves. Limits of tactile map 704 may indicate presence of walls without wall texture 728; wall texture 728 may be used only to depict walls that protrude into the depicted space.

Still referring to FIG. 7, textured pieces of varying sizes for the floor, countertop, shelf, and features may snap into tactile map 704, allowing for a highly customizable map layout; the textured pieces may alternatively be attached in any manner suitable for attachment of at least a three-dimensional feature sign 408 to first informational object 304. Textured pieces may be permanently affixed to intermediate pieces, to tactile map 704, or to a sign such as first informational object 304 that includes the tactile map 704. Textured pieces may be attached to intermediate pieces, which in turn may attach to tactile map 704 or to a sign to which the tactile map 704 is attached in any way suitable for the attachment of at least a three-dimensional feature symbol to first informational object 304. Textured pieces, intermediate pieces, or items may be attached to tactile map 704 using a hole punch as described in further detail below.

If a navigable space is remodeled or if features are changed, the business owning, possessing, or responsible for the navigable space may reconfigure the tactile map 704 according to the new layout simply by snapping in new pieces in the correct configuration. Pieces of any texture described above may come in substantially rectangular forms, and may be placed together in any configuration of the types of pieces, allowing for customizable configurations of the representations of features. Abutting textures, such as abutting countertop texture pieces may have a seamless transition so that a user feels only a smooth countertop surface.

Continuing to refer to FIG. 7, tactile map 704 may be oriented so that the top represents the area immediately in front of a user facing the tactile map, the bottom represents what is behind, and the left and right sides of the map represent what is currently on the left and right.

Still referring to FIG. 7, tactile map 704 may be attached to a wall, door, doorframe, partition or other feature of a navigable space. Tactile map 704 may be incorporated in a sign, such as first informational object 304 described above. Tactile map 704 may snap into a map portion of first informational object 304, allowing easily customized signage. Snap functionality may secure the tactile map 704 inside the larger sign and prevent accidental extraction by ensuring that the tactile map 704 is able to be removed only by pushing of the tactile map 704 from the back of the sign, which may prevent its removal without first removing the sign from the surface to which it is attached. Alternatively, tactile map 704 may be removable only from the front of the sign. In an embodiment, tactile map 704 may only be removed from the sign if the sign is first removed from the wall. The tactile map 704 may be substantially square or otherwise have quadrilateral symmetry allowing it to be attached at any 90-degree rotation relative to the sign. Any manner of attachment suitable for attachment of at least a touch-discernable feature symbol 408 or at least a three-dimensional path information symbol 412 may be used to attach tactile map 704 to sign.

Tactile map 704 may be customized through snap functionality from the base up. Each sign may have a recess, such as a square hole, where a customized tactile map 704 may be placed. On the back of the sign there may be a recess running along the perimeter of this recess; the perimeter on the top face of a base of tactile map 704 may have a thin lip that snaps into the back of the recess, resulting in tactile map 704 that can only be removed by pushing from the front of the sign. Therefore, once tactile map 704 is added to a sign and mounted on a wall, the tactile map 704 may be impossible to remove without removing the sign from the wall. In some embodiments, a standardized recess shape allows any tactile map 704 to snap into any sign having the standardized recess. Further, the standardization may allow for tactile maps 704 to be conveniently swapped if reconstruction produces a new layout of features being described. Where tactile map 704 is located on a first tactile sign 704 located at a feature, tactile map 704 may depict a small portion of the space in the immediate vicinity of the feature location and include symbols representing items associated with the primary task at that location.

Continuing to refer to FIG. 7, assembly 300 includes at least a feature indicator 708 located on the tactile map 704. At least a feature indicator 708 may be located at point within tactile map corresponding to the relative location in navigable space of the feature. For example, if at least a feature indicator 708 includes a feature indicator representing a sink in a countertop, the at least a feature indicator 708 may be located on or within a portion of tactile map 704 representing the countertop, such as a section made of countertop texture 724. At least a feature indicator 708 may include a plurality of feature indicators 708 representing a plurality of features of the navigable space. Available features may be indicated by at least a feature indicator 708 placed on tactile map 704 according to the appropriate size and location of the available features. Plurality of feature indicators may indicate relative positions of features corresponding to feature indicators; as noted above, tactile map 704 may not be to scale, but may indicate relative locations of features in the depicted navigable space.

Still referring to FIG. 7, at least a feature indicator 708 includes three-dimensional form 712 identifying a feature located in the navigable space. Three-dimensional form 712 may be any shape suitable for use as the form of the at least a touch-discernable feature symbol 408 described above; three-dimensional form 712 may be the same for a given feature as the form of the at least a touch-discernable feature symbol 408 as described above for that feature. For example, a sink may be indicated by an oval shape and a trash can may be indicated by a square. Additional Symbols may represent features specific to a particular navigable space or portion thereof, such as a soap dispenser, paper towels, or hand drying. Features that are affixed to a wall may be represented by at least a feature indicator 708 having a flat edge running parallel to the representation of the wall, or to the edge of tactile map 704 where the edge of tactile map 704 is used to indicate the potential presence of a wall. At least a feature indicator 708 may be represented by a recessed form into tactile map 704; at least a feature indicator 708 may be represented by a relief.

Continuing to refer to FIG. 7, at least a feature indicator 708 may be attached to tactile map 704 by any suitable means usable for attaching at least a touch-discernable feature symbol 408 to first informational object 304 as described above.

Still referring to FIG. 7, at least a third touch-discernable feature may include a tactile usage instruction. As a non-limiting example, at least a feature indicator 708 may include a touch-discernable operation symbol 716 representing usage data for the feature located in the navigable space. Touch-discernable operation symbol 716 may include a recess in feature indicator 708. Touch-discernable operation symbol 716 may include a relief on at least a feature indicator 708. As a non-limiting example, and for illustrative purposes only, there may be a plurality of operational symbols 716 that indicate whether the feature's operation is initiated manually or by a motion sensor, as well as where the operation mechanism is located on the feature; the plurality may include (1) a circle, indicating operation is manually initiated by pushing a button; (2) a triangle, indicating that operation is initiated via a lever or grasping the item wanted, where a single triangle pointed toward the front may indicate to pull on the lever, two triangles pointed toward the front may indicate to pull with two hands, and a single triangle pointed toward the back of the back of the at least a feature indicator 708 may indicate to push the lever; (3) a bar protruding from a circle, indicating manual operation by activating a flush valve; (4) a bar protruding from a rectangle, indicating manual operation by turning a handle; (5) a thin arc, indicating that operation is initiated by a motion sensor located on the front of the feature; (6) a wishbone, indicating that operation is initiated by a motion sensor located below the feature; and (7) an hourglass, indicating that operation is initiated by a motion sensor located inside the feature. Any of these symbols may be recessed, in relief, or otherwise represented in a way that enables their shape to be discovered by a textural contrast from the surrounding surface.

Continuing to refer to FIG. 7, the location of the touch-discernable operation symbol 716 on a top face of at least a feature indicator 708 may also indicate where the operation mechanism is located on the feature itself. For example, a circle on the right side of an at least a feature indicator 708 representing a hand-dryer may indicate the button for operation is located on the right side of the dryer. Similarly, two triangles pointing forward on both the right and left sides of an at least a feature indicator 708 representing a paper towel dispenser may indicate that you must use both hands to pull down on the paper towel at both the left and right sides of the paper towel.

Still referring to FIG. 7, in an embodiment, free standing items that are not operated but are simply available for use (soap, paper towels, etc.) may not have a touch-discernable operation symbol 716. To indicate the item is free standing, the distinguishing shape may be mirrored on the opposite side. For example, a feature indicator 708 representing a paper towel dispenser may have four pointed ridges on one side, and a feature indicator 708 representing a free-standing paper towel dispenser may have pointed ridges both on the front and back edges of the feature indicator 708.

Figure 8:
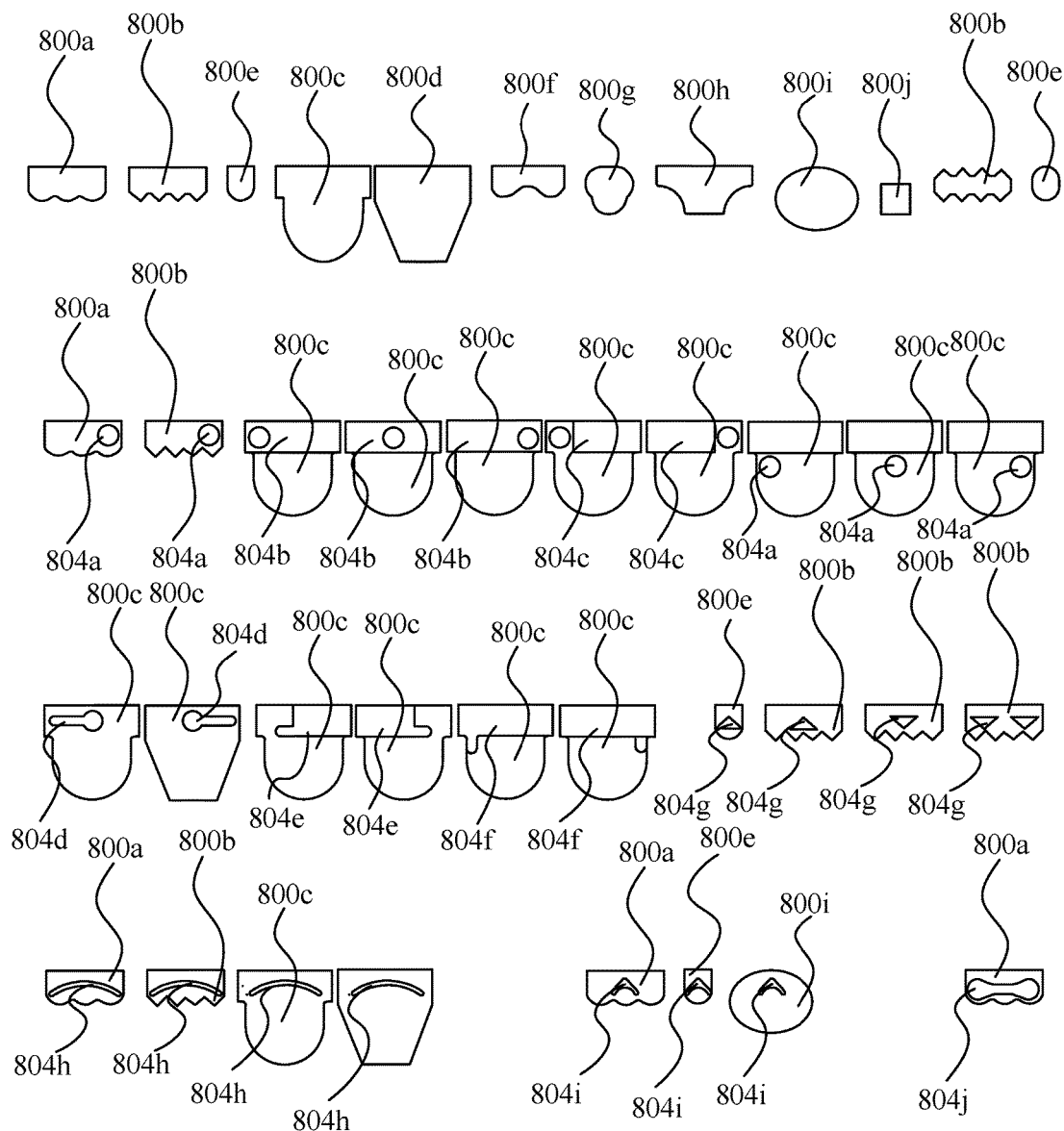
FIG. 8 illustrates exemplary feature indicators and a three-dimensional operation symbols in an embodiment.

FIG. 8 represents various exemplary forms for at least a feature indicator 708. Various exemplary forms of touch-discernable operation symbol 716 are also shown on the various exemplary forms for at least a feature indicator 708. For the purposes of illustration only, various exemplary embodiments of touch-discernable user feature symbols are depicted, including an exemplary symbol for an air dryer 800*a*, a paper towel dispenser 800*b*, a toilet 800*c*, a urinal 800*d*, a soap dispenser 800*e*, a toilet seat cover 800*f*, a sharps container 800*g*, a baby changing table 800*h*, a sink 800*i*, and a trash receptacle 800*j*. Similarly, and as a non-limiting example, various symbols may be used to depict tactile usage instructions 804*a-j*, including without limitation a symbol 804*a* for a push button on a front face of user feature, depicted for exemplary purposes as a circle not in a rectangle, a symbol 804*b* for a push button on top of user feature, depicted for exemplary purposes circle in rectangle, a symbol 804*c* for a push button on the side of a user feature, depicted for exemplary purposes as a circle on side of rectangle, a symbol for a flush valve 804*d*, depicted for exemplary purposes as a circle with a protruding bar, a symbol for a flush handle on one side of a toilet 804*e*, depicted for exemplary purposes as a bar protruding to one side from rectangle, a symbol for a flush handle/lever on front of a toilet 804*f*, depicted for exemplary purposes as bar protruding downward from a rectangle, a symbol for a push lever 804*g* on user device, as in for paper towel dispensers, depicted for exemplary purposes as a triangle, a symbol for a motion sensor 804*h* located on front of user device, depicted for exemplary purposes as a thin arc, a symbol for a motion sensor 804*i* located below user device, depicted for exemplary purposes as a wishbone-shaped symbol, and/or a symbol 804*j* for a hands-in motion sensor, depicted for exemplary purposes as an hourglass. In an embodiment, lateral or left/right orientation on touch-discernable feature symbol may indicate lateral or left/right orientation on user feature. Additional information describing user feature may also be produced in tactilely discernable form, including without limitation spatial orientation details of user feature such as whether it is against a wall or free-standing, a category of user feature, such as toilet, urinal, ATM, or the like, operational data including without limitation tactile usage instructions as described above, or the like. It is to be noted that these various forms are provided for illustrative purpose only; a person skilled in the art, upon reading the entirety of this disclosure, will be aware of an almost unlimited number of shapes for the three-dimensional form 712 and touch-discernable operation symbol 716 that are consistent with the above description, each of which is considered to be within the scope of this disclosure.

Referring again to FIG. 7, at least a feature indicator 708 may include a height indicator 736 indicating a height of a represented feature; height indicator 736 may describe the height of the represented feature by comparison to a typical feature of a similar type. As a non-limiting example, a height indicator 736 in the form of a dome that protrudes from the at least a feature indicator 708 may indicate a higher-than-standard fixture, while a semicircle that is recessed along a straight edge of the at least a feature indicator 708 may indicate a lower-than-standard fixture; in an embodiment, where height indicator 736 is absent, that may indicate that the feature is of a typical height for a feature of its kind.

Still referring to FIG. 7, although at least a feature indicator 708 has been described above as having a three-dimensional form, at least a feature indicator 708 or any element thereof may be represented by other tactilely detectable means. For instance, any element of at least a feature indicator 708 may include a texture that distinguishes the symbols from a surrounding substrate, such as a ridged, knurled, or otherwise rough texture on a smooth substrate, or a smooth texture on an otherwise rough substrate. Any element of at least a feature indicator 708 may have a different coefficient of static friction from the surrounding substrate. Any element of at least a feature indicator 708 may have a different coefficient of dynamic friction from the surrounding substrate. Any element of at least a feature indicator 708 may have different thermal properties from the surrounding substrate; for instance, any element of at least a feature indicator 708 may conduct heat more or less readily than the substrate, allowing a user to detect the boundaries of the symbol by detecting apparently contrasting temperatures. Any element of at least a feature indicator 708 may have different electrical properties from the surrounding substrate.

Figure 9:
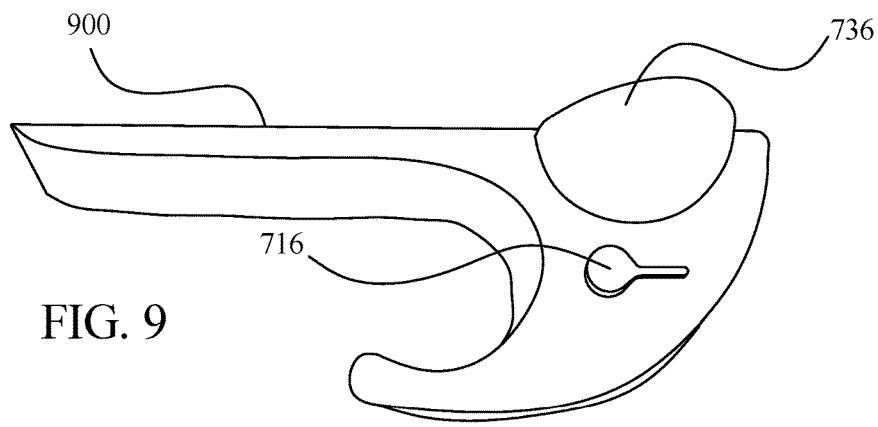
FIG. 9 illustrates an exemplary cane holder in an embodiment.

Continuing to refer to FIG. 7, in an embodiment, touch-discernable operation symbol 716 and/or height indicator 736 may be mounted in navigable space on something other than at least a feature indicator 708. Touch-discernable operation symbol 716 and/or height indicator 736 may be mounted on a surface of an architectural feature of navigable space. Touch-discernable operation symbol 716 and/or height indicator 736 may be mounted on a surface of a user feature of navigable space. As another non-limiting example, and as illustrated for instance in FIG. 9A, touch-discernable operation symbol 716 and/or height indicator 736 may be mounted on a surface of another component, such as a cane holder 900. Cane holder 900 may be located next to a feature, and may be discoverable using a baseboard guide as described below; a user may place a white cane in cane holder 900, and feel a surface of cane holder 900 for touch-discernable operation symbol 716 and/or height indicator 736 to learn about a feature adjacent to cane holder. A user may use a touch-discernable operation symbol 716 and/or height indicator 736 on a user feature or a nearby architectural feature similarly.

Although the above description introduces certain aspects of a tactile map 704, other elements described herein may possess similar features. For instance, at least a touch-discernable feature symbol 408 as described above may include usage data 716 or indicial to indicate usage data, whether or not tactile map 704 is present. Height indicators may also be used on at least a touch-discernable feature symbol 408 or other element of first tactile map 404; for instance, at least a three-dimensional symbol 408 may include a height indicator on an edge or a face of the at least a three-dimensional symbol 408. It should also be noted that any element to be distinguished from its surroundings by tactile means may be so distinguished using features of the element besides three-dimensional shape. For instance, the element may have a different coefficient of dynamic friction from the surrounding substrate. An element may have different thermal properties from the surrounding substrate; for instance, the element may conduct heat more or less readily than the substrate, allowing a user to detect the boundaries of the element by detecting apparently contrasting temperatures. Any element may have different electrical properties from the surrounding substrate.

Figure 10A:
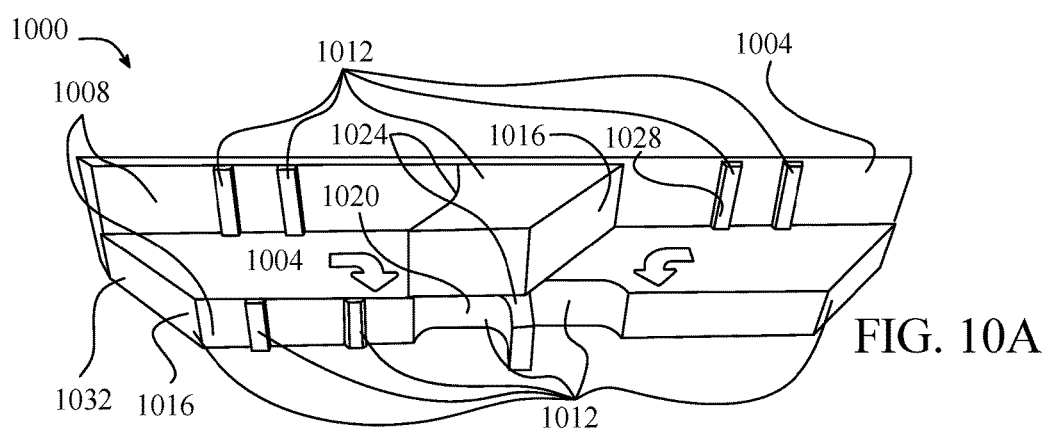
Figure 10B:
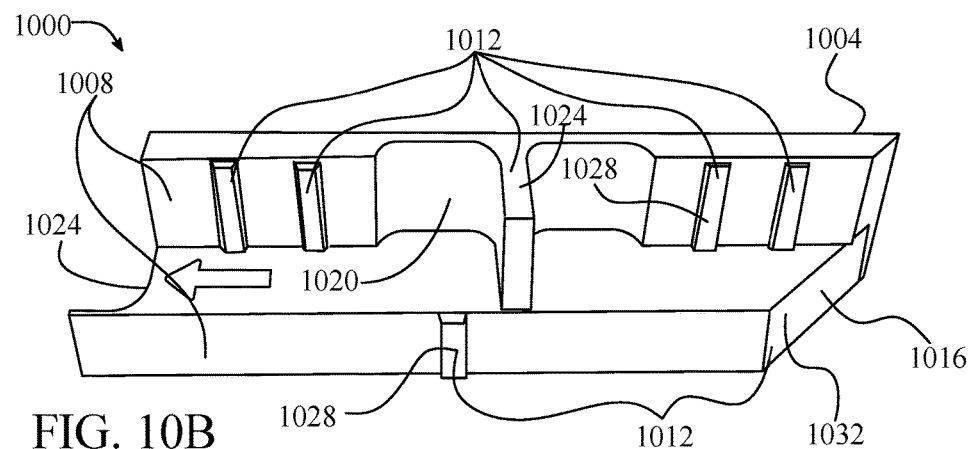

Turning now to FIGS. 10A-C, an exemplary embodiment of a wayfinding system 1000 for the visually impaired is illustrated. Wayfinding system 1000 includes a probe guide 1004. Probe guide 1004 includes at least an active surface 1008. Probe guide 1004 includes at least a redirection feature 1012 on the at least an active surface 1008. The at least a redirection feature is configured to convey navigation information to a user by redirecting the probe.

Still referring to FIGS. 10A-C, wayfinding system 1000 includes a probe guide 1004. Probe guide 1004 may be constructed out of any material or combination of material suitable for the construction of first informational object 304. Probe guide 1004 may be installed in a navigable space 200. In an embodiment, probe guide 1004 is affixed to a feature of navigable space 200. Probe guide 1004 may be affixed to an architectural feature of navigable space 200; for example, probe guide 1004 may be attached to a baseboard or installed against a wall at or near floor level, for instance as a feature attached within a navigable space 200 as described above.

Continuing to refer to FIGS. 10A-C, probe guide 1004 includes at least an active surface 1008. At least an active surface may be a surface along which a probe slides. A probe may be any device used to feel out a route ahead of a person, such as a visually impaired person, in a navigable space. Probe may include without limitation any kind of white cane or "blind cane" used by visually impaired persons. In some embodiments, a user finds probe guide 1004 by feeling along a baseboard or a junction of a wall and floor in a navigable space using a probe. At least an active surface 1008 may include a vertical surface against which a probe can slide. At least an active surface 1008 may include a horizontal surface on top of which a probe can slide, for instance as shown in FIG. 10B. At least an active surface may include two or more active surfaces; a user may select one of the two or more active surfaces to slide the probe against to determine one of two different sets of navigation information. There may be only one active surface 1008 in an embodiment.

Still referring to FIGS. 10A-C, probe guide 1004 includes at least a redirection feature 1012 on the at least an active surface 1008. The at least a redirection feature is configured to convey navigation information to a user by redirecting the probe. Redirecting the probe may involve displacing the probe away from its initial direction of travel along at least an active surface 1008. As a non-limiting example, at least a redirection feature 1012 may include a ramp 1016, which may act to displace a probe in a manner analogous to a wedge cam; ramp 1016 may redirect the probe in any direction, including vertically or horizontally. At least a redirection feature 1012 may include a recess 1020 into which probe is diverted by user pressure or gravity. At least a redirection feature 1012 may include a wall 1024 that stops the forward movement of a probe. At least a redirection feature 1012 may include a bump 1028 or recess that momentarily displaces a probe from the at least an active surface 1008; temporary displacement may create vibration or noise noticeable to a user.

Still referring to FIGS. 10A-C, in some exemplary embodiments, at least a redirection feature 1012 includes one or more features that guide a user to an exit. For instance, and without limitation, at least a redirection feature 1012 may inform how to find the exit according to a logical flow by using three components, which can be felt and read with a probe: (1) an end 1032 angled from the wall may indicate that the user is walking towards an exit, while a perpendicular wall 1024 may indicate the user is walking away from the exit. In some embodiments, the active surface 1008 closest to the floor indicates to the user how to proceed to the exit. Probe guide 1004 may have one slanted end and one wall end, or two slanted ends to indicate the direction of travel and the logical flow to the nearest exit. The slanted end may slant out from the wall at a 45-degree angle, making a smooth transition from the wall to the probe guide 1004; this may indicate that the user is travelling toward the exit. Probe guide 1004 may have two slanted ends when an exit can be reached from either direction. An end that protrudes from the wall at a 90-degree angle may indicate that the user needs to travel in another direction to arrive at the nearest exit; for instance, the end protruding from the wall may indicate that the user should reverse direction. A recess or protrusion that adjoins the projecting end may provide additional information regarding the direction to the nearest exit. For example, recesses and protrusions may signal a user to turn away from the wall where the probe guide 1004 is affixed; a recess with a perpendicular protrusion may indicate a 90-degree turn, and a protrusion at a 45-degree angle may indicate a 45-degree turn. Recesses and protrusions may be placed on any part of at least an active surface 1008.

Still referring to FIGS. 10A-C, at least an active surface 1008 may run parallel to the wall and perpendicular to the floor. At least an active surface 1008 may be smooth— indicating to follow the given path, which may include a corner. At least an active surface 1008 may include one or more distance markers; one or more distance markers may indicate the minimum distance to the exit in increments, such as ten-foot increments. Distance markers may be bumps 1028.

Still referring to FIGS. 10A-C, the presence and configuration of these components may depend on the specific location of the probe guide 1004 within the venue. Probe guide 1004 may be bidirectional, enabling the user to approach and obtain the same information from either end. The distance between probe guides 1004 may be no greater than 25 feet, so in some cases multiple probe guides 1008 may be used along a path.

Still referring to FIGS. 10A-C, in some embodiments, ramps 1016, recesses 1020, and protrusions/walls 1024 located on the top surface of the probe guide 1004 direct to the nearest first informational object 304. These indicators may span the width of the top surface of probe guide 1004; the outermost edge may be flush with the outer edge of probe guide 1004. As a non-limiting example, a ramp slope may indicate that the nearest first informational object 304 is located ahead of this probe guide 1004 if approaching from the right side of the probe guide. A ramp upwards may direct a user straight ahead to locate first informational object 304. If the user is travelling away from the nearest first informational object 304, user may encounter a wall 1024, which is the vertical surface on the highest end of the ramp. Recesses and protrusions may indicate that a change of direction is necessary to locate the nearest first informational object 304. Distance markers 1028 indicating the minimum distance to the nearest first informational object 304 may be located on the upper back surface, parallel to the wall. Corner pieces may work according to the standards already stated.

In an embodiment, probe guide 1004 is assembled using information gathered about navigable space 200; assembly may occur on site. For instance, an active surface 1008 may be selected from a set of partially prefabricated active surfaces 1008 to reflect locations of elements such as exits, entrances, and features within navigable space 200. Additional features may be attached to selected active surface 1008; for instance, distance markers 1028, wedges or ramps 1016, protrusions/walls 1024 and the like may be attached to the active surface 1008 by any suitable means including without limitation bolting, latching, adhering, and the like. In some embodiments, a plurality of active surfaces 1008 are assembled independently and then connected together; for instance, a lower surface and separate surface may be independently assembled, after which the upper surfaced may be attached atop the lower surface. Some elements of probe guide 1004 may be reversible; for instance, bases, active surfaces 1008, or redirecting features may be rotated and reattached in reverse to capture a changed or new navigable space. Probe guides 1004 may be affixed to straight or curved walls, or at intersections of walls at any angle. Probe guides 1004 may have embedded programmed data tags or transmitters; for instance, where probe is equipped with a reader or receiver for obtaining data from a programmed data tag or transmitter, contacting probe guide 1004 may also cause the receiver or reader to receive data from a programmed data tag or transmitter embedded in probe guide 1004. Programmable data tag or transmitter may be located at a predictable location on probe guide 1004, or at a location where probe is likely to stop, including without limitation a wall, angle, or recess.

FIGS. 11A-B illustrate exemplary embodiments of a probe guide 1004 which may be incorporated in wayfinding system 1000. Probe guide 1004 may be used, as a non-limiting example, to confirm that a user is at a particular location of interest on a floor or other walking surface or along a wall. Probe guide 1004 may identify a spot along a base of a wall or other structure above which user may encounter an informational object such as first informational object 304. Probe guide 1004 may confirm user is at a door for either a public entrance or an exit, or for other passage between or within navigable spaces. Probe guide 1004 may have a shape indicating whether the door leads to an entrance or an exit; in an embodiment, a probe guide 1004 that projects out, for instance as illustrated in FIG. 11B may indicate an exit, while a probe guide 1004 with an inward recess, for instance as shown in FIG. 11A, may indicate an entrance. Any other set of indications may be used to differentiate entrances, exits, and the like. In an embodiment, probe guides 1004 may always be placed on the strike side of the door, permitting a user to know that the door marker and door handle are located on the same side of the door. Doors with no markings may indicate the space is not a public space to be entered and is also not an exit; indicators with another design with a unique shape or texture or sound may alternatively indicate that a space communicating with the door is not public or that the door should not be passed. An NFC tag or other transmitter may also be installed in, at, or near probe guide 1104, including in or near informational objects such as first informational object 304 as described above.

Figure 11C:
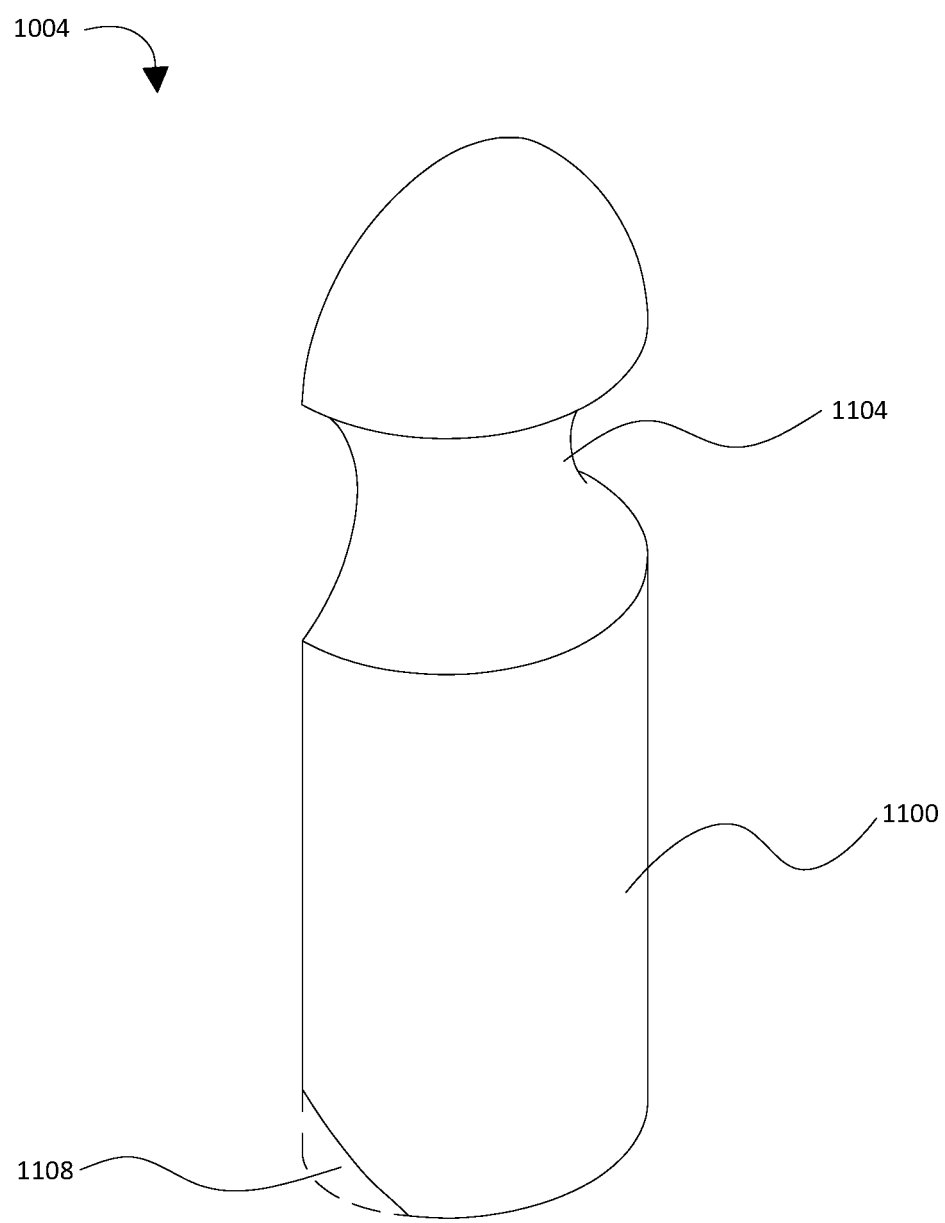

As illustrated for exemplary purposes in FIG. 11C, probe guide 1004 may have an initial surface 1100 that affects movement of a probe to indicate its presence, and a confirmatory tactile element 1104 that indicates to a user that probe guide 1004 is a probe guide 1004 and not another object such as a door hinge, electrical outlet, doorstopper, edge of a doorframe, seam in a baseboard, or the like. Confirmatory tactile element 1104 may include any tactile element of a probe guide 1004, including without limitation protrusions, walls, ramps, recesses, and the like, as described above in reference to FIGS. 10A-C. In an embodiment, tactile element 1104 may include, as a non-limiting example, a notch; passage of a white cane tip or other portion of a probe over notch may generate audible or tactile feedback, such as a "clicking" noise or sensation, indicating presence of the notch to a user of the probe. Probe guide 1004 may, as a non-limiting example, include a substantially vertical shaft; substantially vertical shaft may have a substantially smooth surface, against which probe may engage when sliding along a baseboard or wall-floor juncture.

Substantially vertical shaft may have a lower end located at or near floor, and an upper end. Notch may be located near to upper end; a user may move a tip or other portion of probe up shaft upon encountering shaft, causing interaction with notch to provide feedback identifying probe guide 1004. In an embodiment, probe guide 1004 may have a substantially curved surface at upper end; substantially curved surface may, as a non-limiting example, have a hemispheroidal form, a form identified by a paraboloid of rotation or other shape definable by rotating a curve about an axis, or any other curved end. Shaft may, as a non-limiting example, have a cylindrical or partially cylindrical form; for instance, shaft may include cylinder cut away on one side, for instance by a vertical plane, to fit against a wall. Upper end may also be cut to fit against a wall. In an embodiment, probe guide 1004 may include a cut 1108 or other surface alteration to accommodate a protrusion or recess of wall or floor; for instance, cut 1108 may be angled to accommodate an angled flange or slope connecting baseboard to floor. It is to be noted that "floor" as used herein may indicate any walking surface as defined above and may be used interchangeably therewith.

Assembly 300 may be combined with assembly 300 and/or wayfinding system 1000. For instance, probe guide 1004 may be incorporated in the same navigable space as first informational object 304; probe guide 1004 may direct a user to first informational object 304 using navigation information provided by probe guide 1004. Detection of probe guide 1004 by a user may signal the user to seek out first informational object 304, which may be in a predictable place relative to probe guide 1004 or to an identifiable feature of navigable space. First navigable sign 404 may similarly direct a user to probe guide 1004 or to tactile map 704. Tactile map 704 may be incorporated in first navigable sign 404 or at least a second navigable sign. Persons skilled in the art, upon reading the entirety of this disclosure, will be aware that other ways of combining elements of wayfinding systems described above.

Any of probe guide 1004, first informational object 304, or tactile map 704 may include one or more transmitters that convey wayfinding data to a user electronically. Transmitters may include without limitation active or passive RFID transmitters, beacons, Bluetooth devices, or other devices. Transmitters and use of transmitters may be implemented as described in provisional application No. 62/446,931, filed on Jan. 17, 2017, the entirety of which is incorporated herein by reference.

Figure 12:
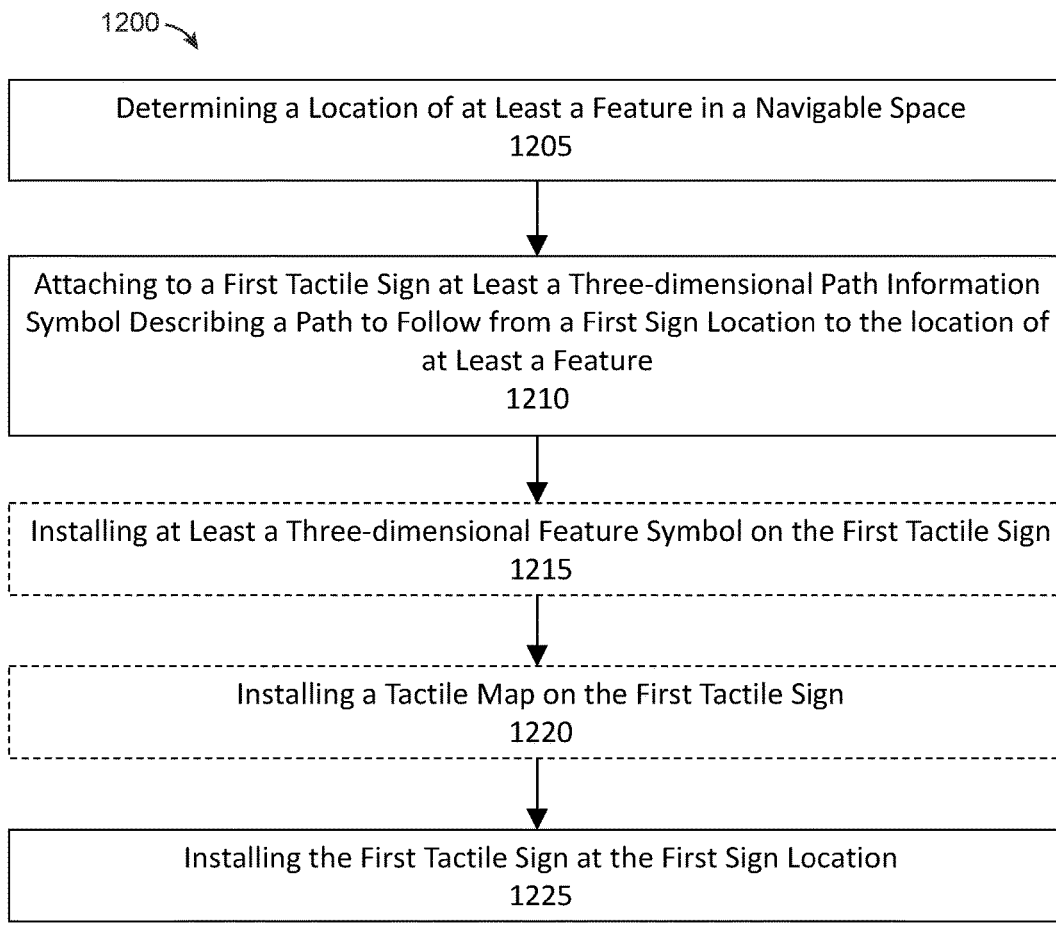
FIG. 12 is a flow diagram illustrating an exemplary method for assembling a wayfinding system in an embodiment

FIG. 12 illustrates an embodiment of a method 1200 for assembling a wayfinding system. At step 1205, method 1200 includes determining the location of at least a feature. This may be implemented by any suitable means. For example, in an embodiment, a user may measure a distance from the first sign location to the at least a feature. A user may work out a sequence of turns and distances to travel to arrive at the location of at least a feature, for instance by walking from the first sign location to the at least a feature. First sign location may be selected by any suitable means, including choosing a location by an entrance, at or adjacent to any architectural feature or user feature, or other location.

Still referring to FIG. 12, at step 1210, method includes attaching to a first tactile sign at least a three-dimensional path information symbol 412 describing a path to follow from a first sign location to location of at least a feature. User may select first tactile sign to have an exterior perimeter 416 based on choice of sign placement or type of sign, as described above in reference to FIGS. 1A-11B. User may assemble at least a three-dimensional path information symbol 412 according to any design described above in reference to FIGS. 1A-11B. At optional step 1215, method0 may include installing at least a three-dimensional feature symbol 412 on first informational object 304. At optional step 1220, method0 may include installing a tactile map 704 on first informational object 304; this may be implemented as described above in reference to FIG. 7. At step 1225, method includes installing first informational object 304 at first sign location.

Still referring to FIG. 12, additional embodiments of method 1200 may include installing at least a probe guide 1004, which may be implemented as described above in reference to FIGS. 10A-C. If a station is remodeled or if features are changed, a user may reconfigure the first informational object 304, map 704, or probe guide 1004 according to the new layout simply by snapping in new pieces in the correct configuration.

Referring again to FIG. 1, at least one first transmitter 128 is configured to transmit a signal. Signal may be a return signal in response to a prompt by another wireless communication device, including without limitation wireless receiver 104. Signal may be a return signal in response to interrogation by an interrogator included in another wireless communication device, including without limitation wireless receiver 104. Signal may be any wirelessly transmitted signal, including without limitation any signal transmitted through electromagnetic radiation, magnetic coupling, capacitive or other electronic coupling, or any other wireless means. Signal may include a unique identifier; unique identifier may identifier at least a first transmitter 128, a feature, including without limitation a user feature as defined below, adjacent to or attached to at least a first transmitter 128, or a feature, including without limitation a user feature, otherwise associated with at least a first transmitter 128. As a non-limiting example, at least a first transmitter 128 may include a set of transmitters adjacent to or attached to a user feature, defining a path to a user feature through a navigable space 200 as defined in further detail below, or the like, and all sharing the same unique identifier that is unique to the user feature; alternatively, each transmitter of at least a first transmitter 128 may have a unique identifier of its own. Unique identifier may take the form of any identifier that uniquely corresponds to at least one first transmitter 128 for the purposes of the system 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate.

With continued reference to FIG. 1, signal may include other data in addition to unique identifier. For instance, and without limitation, at least one first transmitter 128 may be configured to transmit one or more elements of wayfinding data. In some embodiments, wayfinding data is any data that can be used by a user to navigate or use navigable space 200 as defined in further detail below, or to navigate between navigable spaces. Wayfinding data may include any data that aids a user in the use, identification, or understanding of items within navigable space 200. Wayfinding data may include any information needed to navigate through navigable space 200. For instance, wayfinding data may identify landmarks that a visually impaired person is able identify, and provide information about location of those landmarks. Wayfinding data may include tactile architectural features, sounds, or smells that may aid a user in orienting or locating him or herself within navigable space 200 or between navigable spaces. Wayfinding data may include points along paths the user may be following to arrive at an intended spot; the data may include vectors or other information indicating to the user which direction to move in for a given purpose along a path at the path point.

Still viewing FIG. 1, wayfinding data may include feature data. Feature data may be data describing a feature, such as an architectural feature or a user feature as defined in further detail below. Feature data may include the height location of features; in other words, wayfinding data may indicate the vertical position of features or portions thereof. Wayfinding data may include the orientation of features. Feature data may include user feature data. User feature data is defined herein as any data describing user feature 212 or portions or contents thereof. User feature data may include operational data, defined herein as information required to complete operation of a user feature 212. Operational data may include location relative to the user or to a point in navigable space 200 at which the operation may be instigated or performed; for instance, wayfinding data may indicate to the user where to stand when using a sink, and where to reach to activate the sink's faucet. Operational data may indicate the orientation of a feature; for example, the wayfinding data may indicate which way the user interface of an ATM is facing. Operational data may include information about particular components of a user feature 212, such as the buttons on an ATM or the faucet and soap dispensers on a sink. Operational data may provide information concerning how to operate an item such as a vending machine. Operational data may include information needed to instigate the operation of a user feature, such as a method to follow to instigate operation; for instance, the operational data may indicate how to turn on a sink faucet so the water will flow. Thus, for example, where the user feature 212 is a sink, the wayfinding information may describe the device that controls the faucet, and how to operate that device; thus, for instance, a user may arrive at the sink knowing that water flows automatically if the user's hand is in front of it, or knowing that the user must twist, press, or pull a control to open the faucet. Use information may describe location of a soap dispenser, and the mechanism that causes the soap to dispense soap. Likewise, the use information may describe how to flush a toilet or urinal, and location of toilet paper relative to location of a toilet.

With continued reference to FIG. 1, user feature data may include a feature type; for instance, the user feature data may indicate whether a particular feature is a urinal, toilet, vending machine, elevator, or the like. User feature data may indicate the number of user features of a given type. User feature data may include state information concerning at least one feature of the navigable space. State information may be information that describes the current state of a user feature 212. The state information may describe whether the feature is occupied, for instance as detected by a user presence sensor 148. State information may indicate whether the user feature 212 is functioning. State information may indicate whether the user feature 212 is off or on; for instance, state information may indicate if water is flowing from a faucet, or a toilet has just been flushed. User feature data may include safety information, which may be any information related to the feature concerning matters that could affect user safety or security. As a non-limiting example, safety information may include information indicating that a microwave or stove is in use, that the floor is or may be wet, that a surface is slippery or presents a tripping hazard, that there is high voltage at or near the user feature 212, that there are currently moving vehicles nearby, or that a travel location for moving vehicles is nearby, and the like. Safety information may indicate the orientation relative to user feature 212 of hazards. Safety information may include instructions for avoiding hazards while using user feature 212. Safety information may overlap with state information; for example, whether a walk light is on or whether a stove or microwave oven is currently operational may be both state information and safety information. User feature data may include content data. Content data may be information indicating contents or components of user feature 212, such as ingredients of edible contents of a container or dispenser of food or drink, money contained in an ATM, and the like.

Continuing to refer to FIG. 1, wayfinding data may include the space type of navigable space 200; in other words, wayfinding data may indicate whether navigable space 200 is a restroom, elevator lobby, or other type of space. Wayfinding data may include space entry or exit locations, numbers and types; types may include, for instance, whether the exit or entrance is handicap accessible, whether it is a front door, and the like. Wayfinding data may indicate whether the transmitter is on a fixed or non-fixed item. Wayfinding data may indicate special navigational data concerning a particular item, such as whether an elevator is an express elevator that only goes to upper floors, or whether an escalator is currently running upward or downward. Wayfinding data may include information about the numbering or order of rooms or other spaces or features; for instance, wayfinding information may indicate whether to the left of the room in which the user is currently located are higher or lower number rooms. Wayfinding data may provide information concerning occupants and room numbers as presented in an office directory in a building lobby.

With continued reference to FIG. 1, at least a transmitter 128 may include other data in addition to wayfinding data. For instance, at least a transmitter 128 may include content data, which may be data indicating the contents of an item located at or near a feature. In some instances, as an example, the content data may indicate which sodas are dispensed by which specific soda dispensers at a fountain drink station. Content data may likewise identify item locations of containers at a condiment, salad bar or flatware station. Content data may identify the contents of fixed or non-fixed containers such as ketchup, mustard, mayo, or sauce dispensers or salt or pepper shakers. Similarly, content data may include data describing the contents of medicine bottles, rotating fork, spoon, knife dispensers, soap or hand sanitizer whether fixed or non-fixed), and any other item whose contents are not readily ascertainable from its outward appearance or shape.

Still referring to FIG. 1, other data that at least a transmitter 128 may include besides wayfinding data may be product data. Product data may include the identification of one or more products. Product data may include location of one or more products; for instance product data may include planogram data indicating the layout of products in a store or the like. Product information may also include ingredients of a product, including allergens and nutritional information. As a non-limiting example, product data may be UPC or SKU data.

Continuing to refer to FIG. 1, or instance, where navigable space 200 is a public restroom, wayfinding data may include information allowing the user to walk through the restroom. Wayfinding data may include information allowing the user to locate sinks, toilet or urinal stalls, paper towels or hand driers, or trashcans. Wayfinding data may include information allowing the user to use toilets, urinals, sinks, soap dispensers, paper towel dispensers, hand driers, or trash cans. The wayfinding data may include the identity of at least one first transmitter 128. The wayfinding data may include location 204a-c. The wayfinding data may include a location of at least one feature of navigable space 200; the feature may include an architectural feature 208. The feature may include a user feature 212. As a non-limiting example, the feature may include an obstacle that the user must navigate around. The feature may include an item the user could use while in navigable space 200, such as a sink or toilet. The feature may include both an obstacle and a feature the user might use; for instance location of a trash can that is between the user and a sink. In some embodiments, location of the feature includes a distance from the transmitter to the feature. In some embodiments, location of the feature includes an angle from a reference point, such as the wall, corresponding to the direction in which the feature may include located. In other embodiments, location of the feature is a location on a virtual map of navigable space 200 as described in further detail below in reference to FIGS. 5A-B.

Still referring to FIG. 1, wayfinding data may be organized according to one or more data structures; a data structure for this purpose is a standardized ordering of data according to particular categories. This ordering of data may be accomplished by any suitable means, including by organization within relational databases, organization using object oriented programming, organization into particular files, tables, or other data stores, and the like. For instance, wayfinding data used by the system 100 may include the identification of particular navigable spaces; the wayfinding data corresponding to each navigable space may be organized together so that accessing the identity of a particular navigable space enables the system 100 to retrieve information about the contents, layout, and use of navigable space 200. As a non-limiting example, each navigable space may correspond to an object or structure within object oriented programming, with the object contents organized according to different elements of navigable space 200; thus, architectural features included in navigable space 200 may be included in an element of the object corresponding to navigable space 200, and may be organized according to any suitable organization style, including in hierarchical or non-hierarchical data structures. Architectural features may be further organized into categories, such as walls, doors, toilet stalls, tables, and corridors. Continuing the example, user features included in navigable space 200 may be similarly included in elements of the object corresponding to navigable space 200. Navigable spaces within navigable space 200 may have corresponding elements within the object pertaining to navigable space 200. Navigable spaces may, as a non-limiting example, be stored in a tree structure so that physical navigation of the spaces or plotting of paths traversing navigable spaces to nearby or included navigable spaces corresponds to the traversal of the tree structure. Further discussion of data structures and virtual maps that may be used with device 100 may be found below.

With continued reference to FIG. 1, data to be transmitted by at least a first transmitter 128 may be stored on at least a first transmitter 128 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a first transmitter 128 and/or device 100.

Continuing to refer to FIG. 1, there may be a second transmitter 156. Second transmitter 156 may be any transmitter suitable for use as at least a first transmitter 128. Second transmitter 156 may be in a location; location may be any location suitable for use as a location 204a-c as described above. In some embodiments, the wayfinding data includes location of second transmitter; location may be recorded as described above in reference to location of a feature. Second transmitter 156 may be attached to a moveable item; for instance, second transmitter 156 may be attached to a container, such as a salt or pepper shaker or a condiment container; second transmitter 156 may be configured to transmit content data concerning the contents of the container, such as whether a shaker contains pepper or salt, or what condiment is inside of a condiment dispenser. Second transmitter 156 may be a product identifying tag; that is, second transmitter may be attached to, adjacent to, or otherwise physically linked to a product. Second transmitter 156 may be configured to transmit product data concerning the product. For instance, second transmitter 156 may transmit product identification according to a product classification system, such as the universal product code ("UPC") system. Second transmitter 156 may identify the product using a stock keeping unit ("SKU") or similar identifier. In some embodiments, second transmitter is a third-party product capable of transmitting to wireless receiver 104; in other words, the receiver may read or receive from a third-party transmitter as described in further detail below. Third-party transmitter may include, for instance, a beacon using any beacon protocol as described above.

Still referring to FIG. 1, second transmitter 156 may be a transmitter in the possession of a particular user. For instance, second transmitter 156 may be a transmitter the user can attach to an object of the user's choice. In some embodiments, the transmitter in the possession of the user is read-only, and transmits a particular identifier; the user may configure wireless receiver 104 or a computing device in communication with wireless receiver 104 to associate the identifier with specific information concerning the object to which it is attached, or to a location in which the transmitter in possession of the user is placed. Thus, the user may attach second transmitter 156 to a household or office item such as a refrigerator or computer that the user would like to be able to locate or use, and enter data in the system 100 concerning the household or office item. Second transmitter 156 may have writable memory, in which case the user may be able to enter information in the memory of the transmitter 156 concerning the object to which second transmitter 156 is attached or location in which second transmitter 156 is placed.

With continued reference to FIG. 1, device 100 includes a portable computing device 160. Portable computing device 160 may be any computing device as described and defined below in reference to FIG. 18. Portable computing device 160 may be any computing device that may be carried on the person of a user. Portable computing device 160 may include, without limitation, a mobile device such as a mobile phone, smartphone, tablet, or personal digital assistant, or may be incorporated in a special-purpose device having features of device 100 as described herein. Portable computing device 160 is coupled to wireless receiver 104. Portable computing device may be electronically coupled to wireless receiver 104, and/or in wireless communication with wireless receiver 104; portable computing device may perform wireless communication with wireless receiver 104 using any suitable protocol, including without limitation BLUETOOTH protocols as described above.

Still referring to FIG. 1, portable computing device 160 may be designed and configured to pars the first signal for at least a textual element. At least a textual element may include any datum or data that may be rendered as text, including without limitation numerical text, as any character or string of characters in any written language, as any punctuation, diacritical symbols, or other markings associated with any form of written text, and the like. Textual data may include the unique identifier.

Continuing to refer to FIG. 1, portable computing device 160 may be configured to identify, in a first data structure linking the unique identifier to a map of navigable space 200, the first location and a second location of a user feature. Map may be an electronic or virtual map. Virtual map may contain the dimensions of the navigable space 200. Virtual map may contain location of at least one first transmitter 128 within the navigable space 200. Virtual map may contain location of a second transmitter 156 within the navigable space 200. Virtual map may contain locations of architectural features 208 within the navigable space. Virtual map may contain locations of user features 212 within the navigable space.

With continued reference to FIG. 1, virtual map may include one or more coordinate systems to aid in orientation and location detection and route calculation. The coordinate system may include a Global Coordinate System (GCS); in some embodiments, the GCS is a coordinate system orienting and locating navigable spaces 200, users, and features to a global set of axes. The global axes may be directional axes used to navigate the surface of the Earth, such as latitude and longitude. For example, a first global axis, which may be labeled the Y axis, may be oriented north-south, with north being the direction of the positive Y axis and south the direction of the negative Y axis. Likewise, a second axis, which may be the X axis, may be oriented east-west, with east in the direction of the positive X axis and west in the direction of the negative X axis. Up and down may correspond to a third axis, which may be the Z axis, with up positive for the Z axis and down negative for the Z axis.

Still referring to FIG. 1, in some embodiments, the coordinates include a User Coordinate System (UCS) for each navigable space 200. The UCS for a given navigable space 200 may have an origin point at a fixed location within the navigable space 200; for instance the origin point may be located at the strike or handle side of the entrance door of a room. The UCS may have three axes that span three dimensions. As a non-limiting example, a first axis, which may be the Y axis of the UCS, may be oriented in a first horizontal direction. In some embodiments, the first horizontal direction is a direction that is relatively simple to determine from location of the origin and the physical characteristics of the surrounding features; for instance, where the origin is located at a door in the navigable space 200 or at a wall of the navigable space 200, the Y axis may be perpendicular to the door or wall. The direction along the Y axis projecting into the navigable space 200 may be positive. Further continuing the example, the UCS may include a second axis, which may be the X axis, in a second horizontal direction such that the Y and X axes together span the horizontal plane; the X axis may be perpendicular to the Y axis. The X axis may be aligned in a direction determinable by the physical characteristics of the features near the origin of the UCS; for instance, where the Y axis is perpendicular to a wall or door, the X axis may be parallel to the wall or door. The UCS may include a third axis, which may be the Z axis, such that the Y, X, and Z axes together span three dimensions; the Z axis may be perpendicular to the Y and X axes, and thus vertical. In some embodiments, up is in the positive direction on the Z axis. Each UCS may have a specific relationship to the GCS that can be transposed when appropriate.

Continuing to refer to FIG. 1, in some embodiments, where one of at least one first transmitter 128 has a fixed location, at least one first transmitter 128 with the fixed location has its own UCS. The transmitter location may be the UCS origin. The UCS axes may be selected as decribed above. For instance, perpendicular to and into the face of the (wall mounted or feature mounted) fixed transmitter may be a positive Y axis communicated to the user as "straight ahead". A positive X axis may be 90 degrees to the right of the Y axis and may be communicated to the user as to the right. The transmitter UCS may have a specific relationship to its parent UCS and thus to the GCS. In some embodiments, the communications to the user are for the user when facing the transmitter (e.g., straight ahead, to the left, to the right turn around and proceed).

Still referring to FIG. 1, in some embodiments, the wayfinding data is stored using Building Information Modeling (BIM). In some embodiments, in a BIM, not only physical attributes such as location and size are stored, but any information about any feature (or space) is stored. BIM is a common term in the CAD world of the construction industry. As a non-limiting example, BIM data for a give user feature 212, architectural feature 208, or navigable space 200 may include the X and Y coordinates in a UCS, as described above. In some embodiments, this allows the calculation of distance to any other features UCS, even if that other feature is not in virtual map. The BIM data may include the X, Y, and Z orientation of the feature, with regard to the UCS, where Z describes the tilt of a feature. The BIM data may include a path tree connecting the feature to one or more other features as described above. The BIM data may include attributes of the feature, including without limitation the name and type of space (or subspace) in which the feature is located, the type of feature (e.g. toilet, sink, dryer, checkout counter, elevator), the operation (e.g. flush valve, nozzle, motion sensor, location of operation (e.g., top of countertop, wall, fixture mounted, free standing), Material covering surfaces (e.g. tile, carpet, stone, wood, or paint), color or distinguishing marks, or floors to which an elevator will travel. Part or all of virtual map may be stored at portable computing device 160 or at a remote device; a relevant portion of virtual map may be downloaded as needed, and as further described below in reference to FIG. 14.

With continued reference to FIG. 1, first data structure may include a table or similar structure linking unique identifier to a location in virtual map. First data structure may include a representation of navigable space. Representation of data in navigable space 200 may itself include a plurality of data elements that define specific spaces; for instance, where the navigable space 200 is a restroom, the data representation of that navigable space 200 may include the data representation of a navigable space corresponding to a toilet stall, another corresponding to its a sink and its accessories, and another corresponding to a diaper changing station, all within the restroom; the navigable space 200 data for the restroom may also include be linked to the navigable space data for a second restroom, an elevator lobby, a front entry, and for the building containing the restroom. This may be accessed by arrangement and traversal of a tree, or other data structure enabling recursive, linked, or serial enumeration of data structures, of navigable spaces, up to including buildings, blocks of buildings, campuses, or cities. In some embodiments, the data representation of each navigable space, whether it is a particular sink or toilet stall, a restroom, a building, or a city block, has a unique origin point corresponding to a specific location within the parent space of the navigable space, where the parent space is a navigable space including the navigable space; for instance, the parent space of a toilet stall may be a restroom, and the parent space of a restroom may be a building. As a result, if portable computing device 160 determines a user's current location in any navigable space within any other parent navigable space, specific information can be communicated to navigate to any other space within the parent navigable space, as all the origin points are connected according to the data representations. The representation of each navigable space may include an exit/entry point corresponding to a physical exit/entry point for the navigable space; for instance the exit/entry point may correspond to a door or to the point in front of a sink, urinal, ATM, or similar feature. Location of a navigable space's origin point or exit/entry point may be stored in the data representation of the parent space, or in a tree structure one node higher in the tree structure. In some embodiments, the exit/entry point of a given space must be traveled through physically to access data corresponding to the space (upon entry) or data corresponding to parent or sibling spaces (upon exit).

Still referring to FIG. 1, in some embodiments, data representation of each navigable space includes path data. Path data may be stored as one or more lists of specific points within a specific space; in some embodiments, the path data for a given point in the space includes a list of points that can be traveled to directly from each point while avoiding all obstacles will also be stored and associated with each point, where each point may correspond to a user feature 212, architectural feature 208, or navigable space within the navigable space 200. Path data may be represented as a path vector that includes the direction of travel to take along that path to get to the corresponding point, as determined from a particular orientation within the navigable space 200. Path data may further include data concerning landmarks that a visually impaired person can identify, such tile, carper, column, smells, sounds, and similar matters, which may be linked to each path point and vector. The combination of all such paths within the navigable space 200 may be organized within a path tree of navigable vectors linking all points within the navigable space 200. Each user and/or architectural feature may have a point or vector associated with it to connect to the path tree and thus all other features within that space; this may be done for user features 212, architectural features 208, or both.

Continuing to refer to FIG. 1, persons skilled in the art will be aware that the elements described above may be organized in other manners than in the object form described, as data may be organized in various ways depending on the programming language, protocols, or storage methods used, and other considerations; for instance, a relational database may arrange the data corresponding to each navigable space 200 in any manner using interrelated tables according to the dictates of efficient information storage and retrieval. Furthermore, information may be transferred from one form to another as convenient to the operation of the system; for instance, a single node in a tree structure corresponding to the navigable space 200 most immediately occupied by the user may be stored in a at least a transmitter 128 within that space, or may be conveyed to the receiver over the network in network packet form. Furthermore, the data may of course be stored according to any registry or other memory storage protocol within particular computing devices. Part or all of first data structure may be stored at portable computing device 160 or at a remote device such as a server or the like; a relevant portion of first data structure may be downloaded as needed, and as further described below in reference to FIG. 14.

With continued reference to FIG. 1, portable computing device 160 may be configured to retrieve, from a second data structure linking the feature to usage data for using the feature, the usage data. Second data structure may include any data structure linking an identifier of a user feature to usage data of the user feature, including without limitation a database table or other link. Part or all of second data structure may be stored at portable computing device 160 or at a remote device; a relevant portion of second data structure may be downloaded as needed, and as further described below in reference to FIG. 14.

In some embodiments, and still referring to FIG. 1, portable computing device 160 and/or a remote device contains data corresponding to a particular user. For instance, portable computing device 160 may have access to data describing the user's specific needs regarding navigation or user feature usage processes. As a non-limiting example, where the user has mobility issues, portable computing device 160 may have access to data describing the user's mobility issues; this data may be used to filter path information or usage sequences, as described in further detail below, for paths and sequences suitable for the user's mobility needs. Further continuing the example, portable computing device 160 may provide the user with accessible paths, for instance avoiding stairs in favor of ramps or elevators; portable computing device may direct the user to accessible features, such as toilets with support bars. In other embodiments, portable computing device has access to data describing the degree of the user's sensory impairment, if any; thus for example if portable computing device has data indicating the user cannot see well enough to read, portable computing device 160 will output information to the user utilizing a non-visual user interface device.

Continuing to refer to FIG. 1, portable computing device may have access, either locally or at a remote device, to a data structure linking user activities to categories of user features. Data structure linking user activities to categories of user features may include, without limitation, one or more database tables, a database, or any other suitable data structure. As a non-limiting example, a user activity may be stored in data structure as "use a urinal;" this may be linked in data structure to the categories "urinal," "bathroom," "sink," "toilet," "hand drier," and/or "paper towel rack," which may be user features and/or navigational features a user would utilize in a usage sequence involving using a urinal. Other activities may be linked in the data structure to other feature categories; as a result, portable computing device 160 may be able to retrieve a list of user features associated with a desired user action, as described in further detail below.

In some embodiments, the device 100 includes data indicating the degree to which a particular navigable space 200 uses the system including transmitters and devices such as device 100. For instance, a Level 0 space may have no transmitters 128, a Level 1 location may only have the transmitters installed in restrooms, a Level 2 location may have restrooms and major passageways such as corridors and elevator lobbies equipped with the system, and a Level 5 location may have every room equipped with the transmitters. In some embodiments, this information is provided to the user by portable computing device 160 using the user interface. The information may also be published generally, for instance in a website or similar format.

Still referring to FIG. 1, device 100 includes a user output component 164. User output component 164 may include a display 168; the display 168 may be any display as described below in reference to FIG. 18. The display 168 may be the display of a mobile device such as a smartphone or tablet. User output component 164 may include an audio output device 172, such as a speaker, headphones, or a wireless headset such as those typically paired to a mobile device. User output component 164 may include a tactile output device 176. In some embodiments, tactile output device 176 is a device that outputs information that is intelligible using the sense of touch. Tactile output device 176 may include a haptic output device such as a vibrator of a mobile device such as a smartphone, cellular phone, or tablet. In some embodiments, tactile output device 176 produces patterns having geometric forms that are intelligible to the user using the sense of touch; for instance, tactile output device 176 may output letters in braille using a set of retractable pins or bumps that can be extended and retracted to form braille characters, similarly to devices used with screen readers. Tactile output device 176 may output other recognizable shapes, such as directional arrows or geometric forms; tactile output device 176 may, as another example, output a map vignette of the immediate area including user features or any user feature data as described above. User output component 164 may be coupled to a mobile device; for instance, where device 100 and/or portable computing device includes a mobile device, user output component 164 may be coupled to the same mobile device. User output component 164 may be incorporated wholly or in part in a mobile device; for instance, user output component 164 may include the display and speakers of the mobile device, as well as a tactile output device coupled to the mobile device. User output component 164 may be coupled directly to wireless receiver 104. User output component 164 is configured to receive data from portable computing device 160; data may be received from portable computing device by any suitable electronic or wireless means. User output component 164 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display 168, such as a mobile phone or tablet screen, or displaying large symbols such as directional arrows on the display 168. Similarly, if the user is visually impaired but able to hear, providing data may involve presenting the data by means of an audio output device 172. Where the user is not able to see or hear, presenting the wayfinding data may include providing data using a tactile device 221. Providing data may also involve a combination of the above-described means; for instance, the wayfinding data may be presented to the user in audio form, combined with large displays of directional arrows or type, or with tactile information. User output component 164 may also be able to output content data. User output component 164 may also be able to output product data.

Device 100 may include additional components. For instance, device 100 may include an inertial measurement unit (IMU) 180. IMU 180 may be an electrical component that detects the motion of the wireless receiver 104. IMU 180 may include, an accelerometer (not shown). IMU 180 may include a plurality of accelerometers disposed to detect acceleration in a plurality of directions; for instance, three accelerometers disposed in three directions spanning three dimensions may be able to detect acceleration in any direction in three dimensions. IMU 180 may include one or more gyroscopes. IMU 180 may include a plurality of gyroscopes disposed to detect rotation about a plurality of axes; for instance, three accelerometers having axes spanning three dimensions may be able to detect acceleration in any direction in three dimensions. IMU 180 may have both accelerometers and gyroscopes. IMU 180 may have any other component or components capable of detecting linear or rotational motion. In some embodiments, IMU 180 can determine substantially precisely the direction and magnitude of motion of the wireless receiver 104 relative to an initial reference frame and location; where the wireless receiver 104 is initially stationary, IMU 180 may enable the wireless receiver 104 to determine substantially accurately any change in orientation or position of the receiver. In other embodiments the receiver is coupled to an IMU 180; for instance, where the receiver is coupled to a computing device 120 such as a smartphone or tablet, the computing device 120 may have an IMU.

Device 100 may include a navigation facility (not shown), defined as any facility coupled to the computing device that enables the device accurately to calculate the device's location on the surface of the Earth. Navigation facilities may include a receiver configured to communicate with the Global Positioning System or with similar satellite networks, as well as any other system that mobile phones or other devices use to ascertain their location, for example by communicating with cell towers. Device 100 may use beacons for navigation, for instance determining its location by direction and strength of one or more beacon signals; directional information may be received as part of beacon signals. Beacons transmitting beacon signals may be calibrated by device 100, or by multiple such devices, as set forth in further detail below.

Figure 13A:
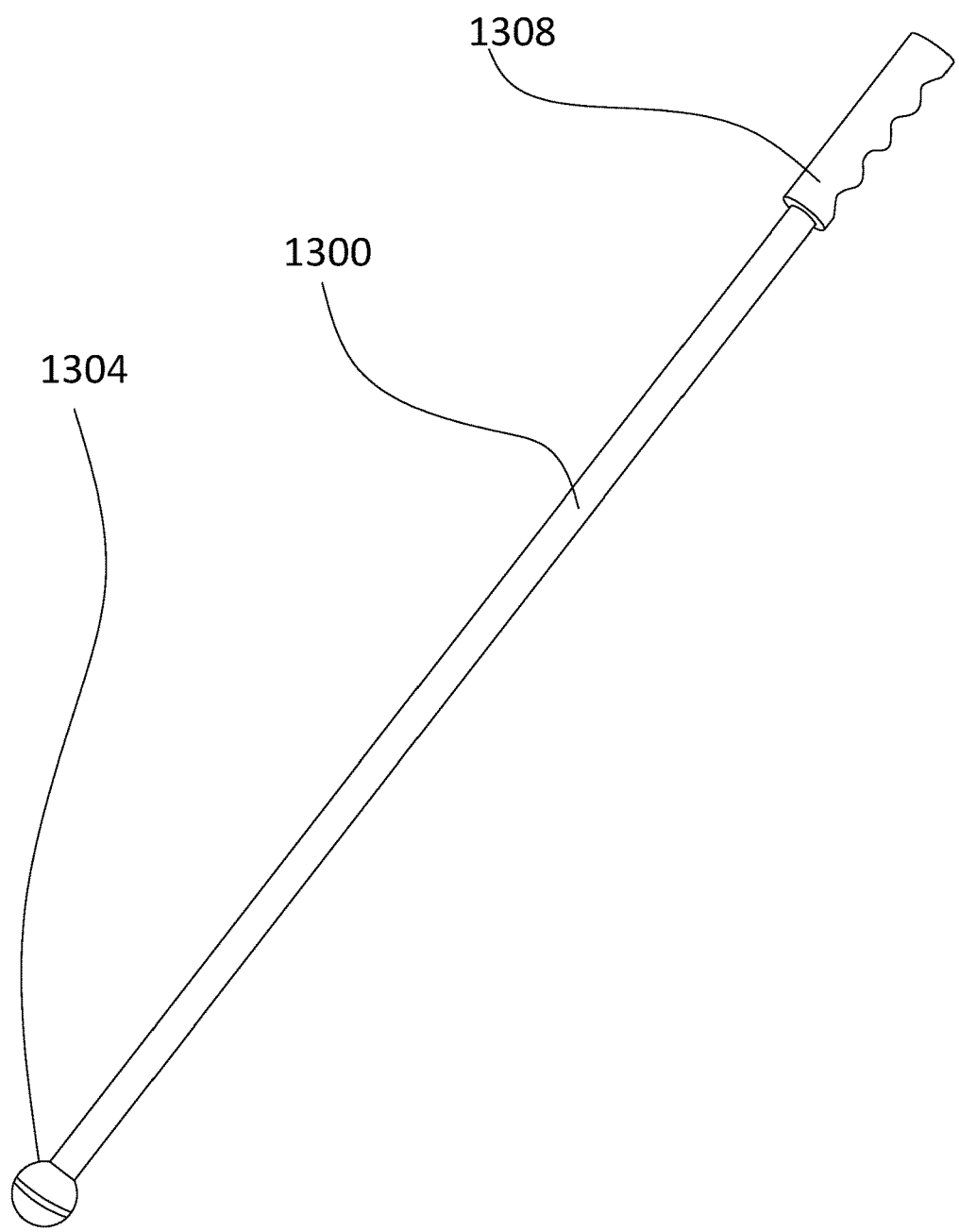
FIGS. 13A-C are schematic depictions of an exemplary embodiment of a wayfinding aid with incorporated receiver.
Figure 13B:
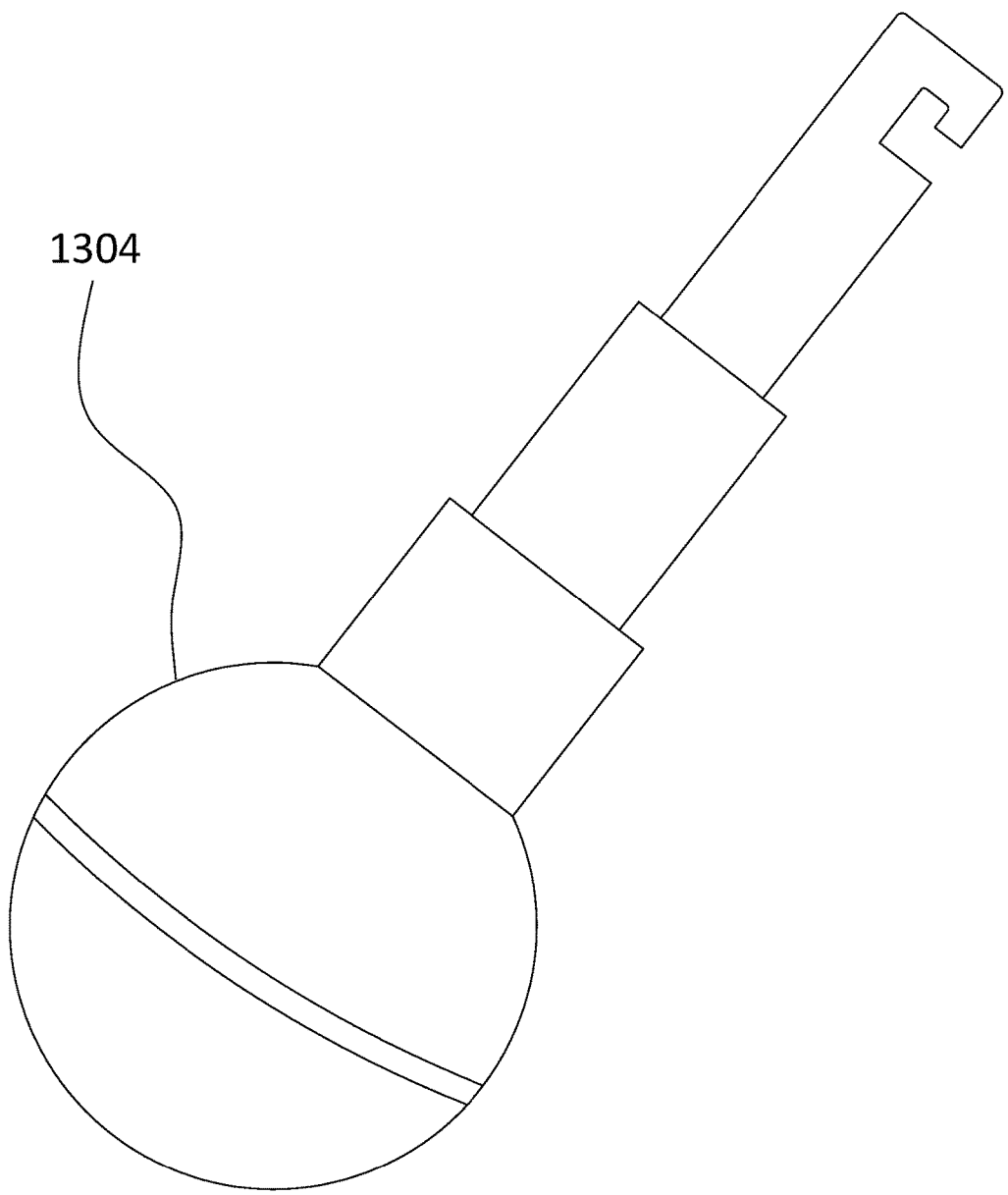
Figure 13C:
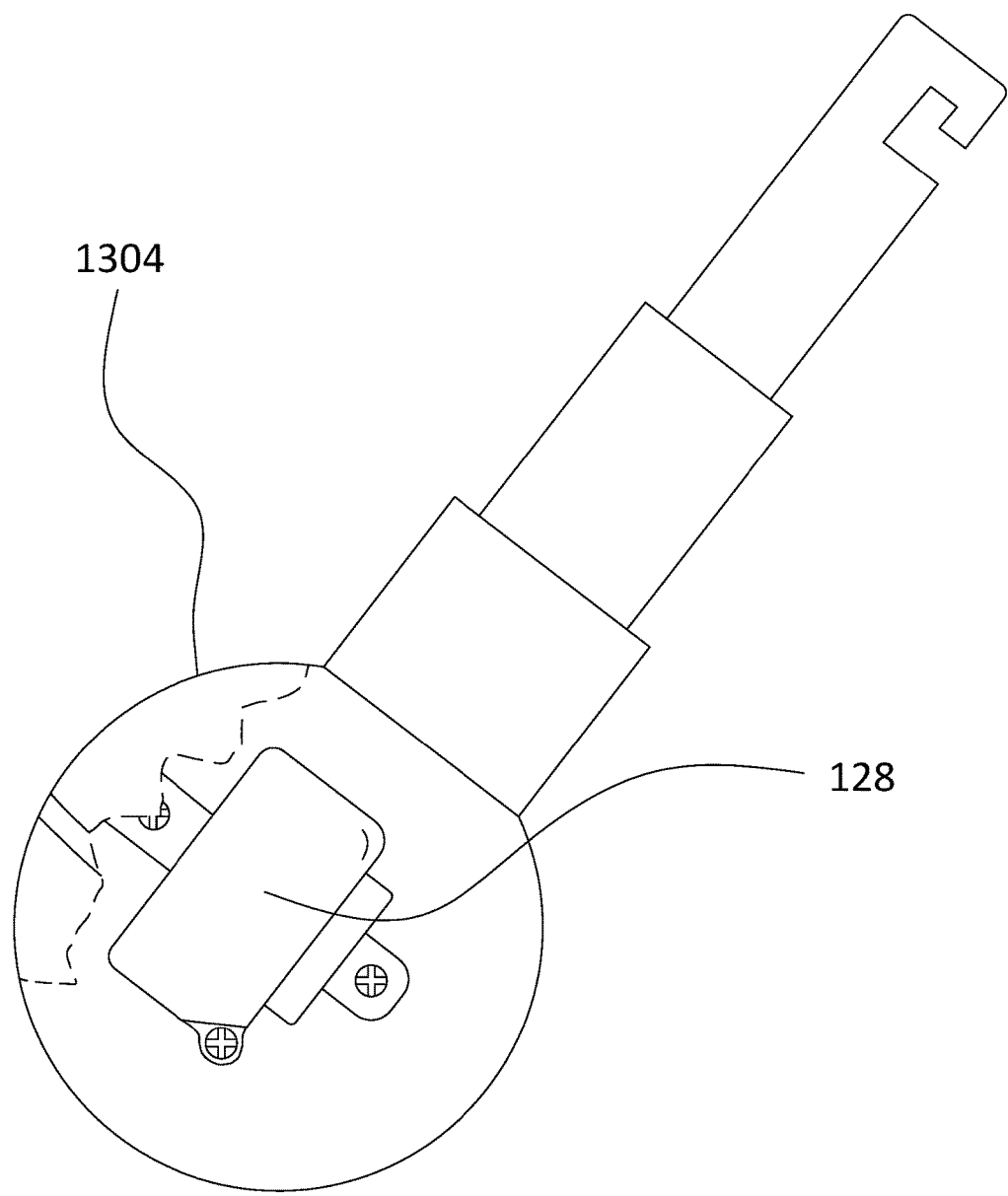

Referring now to FIGS. 13A-C, a non-limiting example of wireless receiver 104 incorporated in a wayfinding aid is illustrated. Wireless receiver 104 may be incorporated in or on a white cane 1300. In some embodiments, a white cane 1300 is an elongate object held in the hand of the user that is used to gather information such as to search out the path in front of the user for obstacles and guides to travel; for instance, white cane 1300 may be used to feel for the wall of a corridor or room along which the user is travelling, to guide the user's path, or to feel for objects on the floor over which the user could trip. Wireless receiver 104 may be housed in the tip 1304 of white cane 1300, as shown for instance in FIG. 13C. The tip 1304 of white cane 1300 may be detachable; many white canes have tips that may be incorporated in the canes using a hook that attaches to an elastic cord within the cane, or a similar mechanism. The tip 1304 may therefore be manufactured with wireless receiver 104 imbedded in the tip, and combined with any white cane 1300 that admits interchangeable tips. Wireless receiver 104 may alternatively be located on a service animal; for instance, a service dog may have wireless receiver 104 on a bracelet near the animal's paw, which the dog can be trained to touch to a baseboard. Wireless receiver 104 may also be stored in an accessory on the person of the user, such as a ring, bracelet, necklace, or a prosthetic limb. Wireless receiver 104 may be stored in or on handle 1308 of white cane 1300. Wireless receiver 104 may also include one or more components to provide non-visual feedback to the user, including but not limited to a vibrator in or on handle 1308 that vibrates to indicate reception of a signal from at least a first transmitter 128 and/or second transmitter 156. Wireless receiver 104 may be holstered to an object such as a cane handle, permitting it to be used separately from the wayfinding aid as well as while attached.

Still viewing FIGS. 13A-C, in some embodiments, wireless receiver 104 in white cane 1300 enables a user to place wireless receiver 104 in close proximity to at least one first transmitter 128 when the user is searching out a path. For example, at least one first transmitter 128 may be located in a feature of the navigable space 200, and a receiver 204 in the tip 1304 of the cane 405 may be brought into close proximity with the feature. In some embodiments, the user searches out a surface feature 216 near to at least one first transmitter 128, feeling for the surface feature 216 with the tip 1304 of white cane 1300. Transmitter 128 may be in a standard location relative to feature 216 such as directly above at a standard height or location such as on an ADA sign or under a countertop; transmitter 128 may be discoverable with a first or second touch-discernable feature as described above. In other embodiments, the user may find location by looking for a recognizable feature of the navigable space 200, such as a corner, door jamb, or similar feature. Wireless receiver 104 in the white cane may be connected to a computing device; for instance, wireless receiver 104 may be wirelessly paired to a mobile device such as a smartphone on the person of the user, to which wireless receiver 104 may relay wayfinding data, or other data such as content data or product data.

Figure 14:
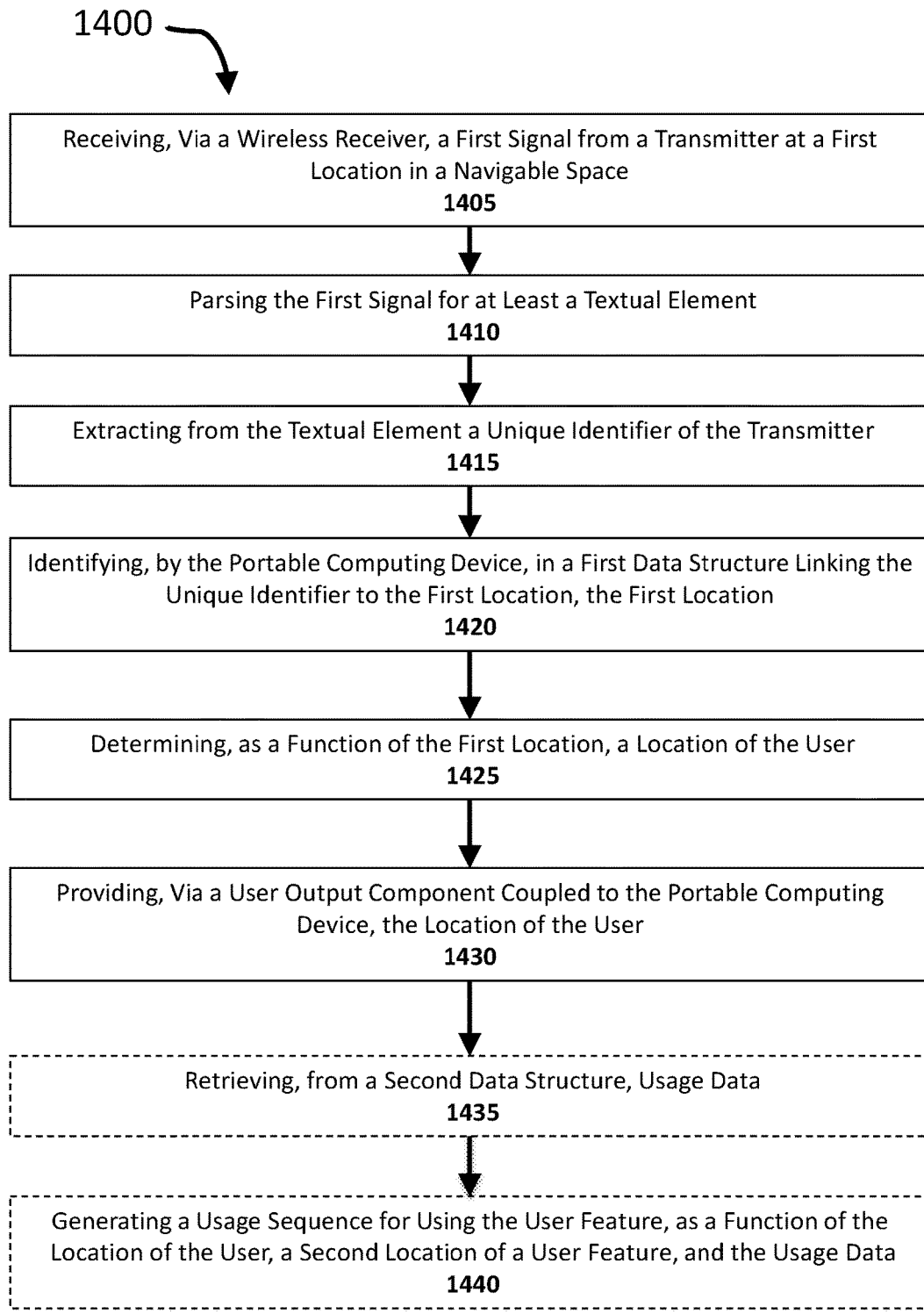
FIG. 14 is a flow diagram illustrated an exemplary method of navigation and usage guidance.

Referring now to FIG. 14, a method 1400 of navigation and usage guidance in a navigable space is illustrated. At step 1405, a portable computing device 160 coupled to a wireless receiver 104 receives a first signal from a transmitter 128 at a first location 204a-c in a navigable space. Wireless receiver 104 may receive the first signal from at least one first transmitter 128 by any means of wireless communication as described above, using the antenna 108. In some embodiments, wireless receiver 104 emits a signal to prompt at least one first transmitter 128 to send the first signal; wireless receiver 104 may send an interrogation signal, using an interrogator. In other words, wireless receiver 104 may receive first signal by wirelessly transmitting, via an antenna of the wireless receiver, an interrogation signal providing electrical power to the transmitter, and wirelessly receiving from the first transmitter, and via the antenna, a return signal. Wireless receiver 104 may send a plurality of queries, and at least one first transmitter 128 may send a series of sets of first signal in response. Wireless receiver 104 or a computing device 218 coupled to wireless receiver 104 may parse the first signal. Wireless receiver 104 or computing device 218 may organize the first signal into data structures, such as trees, lists, arrays, or tables of information, as described above in reference to FIGS. 2A-4D.

In an embodiment, and with continued reference to FIG. 14, device 100 may use one or more navigational facilities to locate at least one first transmitter 128. As a non-limiting example, device 100 may use GPS or other map-based programs to locate a building or other space containing at least one first transmitter 128. Device 100 may receive information on where to find at least a first transmitter from one or more beacons; device 100 may use signals from one or more beacons to determine an approximate position orientation of device relative to at least a first transmitter or to a virtual map indicating a location of at least a first transmitter 128. One or more beacons may be third-party devices; for instance, one or more beacons may be associated with a store, kiosk, or other location that provides beacons to aid in location thereof. Third-party beacons and/or transmitters may incorporated in virtual map during installation or subsequent use or update of system.

Still referring to FIG. 14, wireless receiver 104 may receive any first signal as described above in reference to FIG. 1. For example, wireless receiver 104 may receive a transmitter identity. Wireless receiver 104 may receive the fixed location of at least one first transmitter 128. Wireless receiver 104 may receive a location of at least one feature of the navigable space 200. Wireless receiver 104 may receive use information concerning at least one feature of the navigable space 200, as described above in reference to FIG. 1. Wireless receiver 104 may receive state information concerning at least one feature of the navigable space 200. Wireless receiver 104 may receive path information from at least one first transmitter 128. Wireless receiver 104 may receive a location of a second transmitter 156. Wireless receiver 104 may receive content information from at least one first transmitter 128. Wireless receiver 104 may receive product information from at least one first transmitter 128.

At step 1410, and still referring to FIG. 14, portable computing device 160 parses first signal for at least a textual element. Where first signal is in digital form, portable computing device may interpret a digital sequence contained within first signal by rendering it according to an encoding method for one or more data types; for instance, portable computing device 160 may divide a string of binary digits into fixed-length blocks, such as bytes of data, and map those blocks to a data type encoded by those blocks, according to any suitable protocol. As a non-limiting example, portable computing device 160 may interpret a binary string as character data. First signal may be received in a particular format, such as one or two packets; persons skilled in the art, upon reading the entirety of this disclosure, will be aware of many ways in which first signal may be encoded, transmitted, received, and decoded.

At step 1415, with continuing reference to FIG. 14, portable computing device extracts a unique identifier of the transmitter from the at least a textual element. At least a textual element may implement a protocol whereby one or more fields or elements are labeled, such as, without limitation, XML, or packet-based protocols. At least a textual element may implement a protocol whereby fields in a prescribed order are separated by delimiter characters, which may be otherwise unused, such as commas in comma separated value (CSV) files. At least a textual element may be ordered in a strict character-count order, in which unique identifier is always found a particular number of characters from an endpoint, and has a length of a particular number of characters. Portable computing device 160 may be configured to identify and copy unique identifier according to any protocol in which at least a textual element is encoded.

Still referring to FIG. 14, portable computing device 160 may extract at least an additional datum. At least an additional datum may include any additional data described above in reference to FIGS. 1-13C, including without limitation wayfinding data, feature data, user feature data, or usage data; extraction and presentation of usage data is described in further detail below. At least an additional datum may include user-submitted data, which may have been written to a writeable section 152c of memory as described above. Portable computing device 160 may provide the at least an additional datum to the user via the user output component; at least an additional datum may be provided with a usage sequence as set forward in further detail below, or may be provided separately.

At step 1420, and continuing to refer to FIG. 14, portable computing device 160 identifies first location in a first data structure linking the unique identifier to the first location. Portable computing device 160 may identify first location by querying the first data structure for the unique identifier, for instance where the first data structure has indexing by identifiers. Portable computing device 160 may identify first location by traversing first data structure and comparing entries to unique identifier; for instance, where first data structure includes a tree structure as described above, portable computing device 160 may traverse the tree structure and compare entries at nodes of tree structure to unique identifier. Traversal may commence at a point in first data structure based on previous activities performed by or with device 100. For instance, user may have scanned a previous transmitter at a root node of a navigable space containing navigable space 200; transmitter at root note, may, for instance, be located at an entry way to navigable space. Device 100 may have performed one or more elements of this method to arrive at first transmitter 128; for instance, a set of navigational instructions or a usage sequence may have guided the user to first transmitter 128. Portable computing device 160 may explore child nodes of root node (which, it should be emphasized, may be a root node of a larger tree); alternatively or additionally portable computing device 160 may explore nodes that virtual map indicate are within a distance user may have traversed since the last-scanned node, and may traverse in any direction along first data structure from such nodes. Similarly, portable computing device 160 may obtain an estimated location for user, near which to search for nodes, based on navigational data user may have been following, data from an IMU 180 indicating direction and length of travel from a known location, such as another approximate location or another transmitter, approximate user location obtained from a navigational facility such as GPS, or any combination thereof. Restricting traversal to estimated or known user location information may have the benefit of more rapid retrieval by restricting the space to be searched in first data structure. Data structure may include a data structure linking unique identifier to a map of navigable space as described above in reference to FIGS. 1-13C.

Continuing to refer to FIG. 14, portable computing device 160 may obtain a second location of a user feature. The second location may be obtained in a number of ways. For example, and without limitation, identifying the second location may involve receiving a user instruction, selecting an identification of the user feature from a plurality of identifications of user features as a function of the user instruction, and identifying the second location in the map using the identification of the user feature; identification of user feature may be stored, for instance, in first data structure, such as in another node of the type containing identifiers of transmitters, or in a node of a distinct type within the same tree or other data structure. In one embodiment, the user instruction may contain the identification of the user feature; for instance, a list of features in navigable space may be presented to the user, for instance as a "drop-down menu" or an equivalent provided by audio means. User may select, via an input device of user output component 164 or portable computing device 160, an item from that list; list may correspond to an enumeration of items linked to identifiers.

Still referring to FIG. 14, portable computing device 160 may select the identification of the user feature by determining an identification of a category of user feature as a function of the user instruction, identifying at least an identification of a user feature of the plurality of identifications of user features, the at least an identification matching the category, and selecting the identification of the user feature from the at least an identification. For instance, user instruction may specify the category of user feature. As a non-limiting example, a set or list of categories of features may be presented to the user, from which the user selects a desired category; the set or list may be presented similarly to the set or list of user features in navigable space 200. The set or list may be restricted to categories available in navigable space. Alternatively or additionally, user may say or enter a word or phrase that is linked to a user category in a data structure such as lookup table. The user instruction may indicate a desired action, and the portable computing device 160 may identify the category using the desired action; in an embodiment, this may be performed by matching the desired action to one or more categories of features based on a data structure linking actions to features as described above in reference to FIGS. 1-13C.

With continued reference to FIG. 14, portable computing device 160 may select the identification of the user feature from the plurality of identifications of user features further by computing a distance from the user location to each user feature identified by the plurality of identifications of user features and determining that the distance to the user feature is the smallest distance. Computing the distance may be performed by obtaining the location of the user feature corresponding to each identification of the plurality of identifications from virtual map, and obtaining or computing path information from first location to each such location; the traversal distance of each such path information may be calculated and compared, and the identification corresponding to the minimal traversal distance may be selected by numerical comparison. Alternatively or additionally, portable computing device 160 may select the identification of the user feature from the plurality of identifications of user features by determining that the user feature is unoccupied. For instance, where wireless receiver 104 communicates with a transmitter at a user feature possessing a user presence sensor 148, portable computing device 160 may select an identification corresponding to a user feature having a user presence sensor indicating the user feature is currently unoccupied; portable computing device 160 may select from a plurality of such unoccupied features by minimal path distance, as described above. In some embodiments, a device having a user presence sensor may be able to detect that a user is present, but not when a user has vacated the device; for instance, a toilet stall may detect when a user gets to his or her feet, but not when the user leaves the stall. Detection that the user feature is unoccupied may include cessation of detection of occupancy. Detection may further include association of cessation of detection of occupancy with information concerning the probability of subsequent vacation by a user, such as a typical time after cessation that a user would leave the user feature; this information may be entered by one or more users. As a non-limiting example, cessation of detection of a user may trigger a countdown of a certain number of seconds after which device 100 may conclude the user likely vacated; where device 100 is providing navigational directions to user device, likely time of navigation may be taken into account, for instance by determining that the countdown is likely to be complete when the device 100 arrives at the user feature, and thus that the user feature may be treated as currently unoccupied for the purposes of usage sequence generation.

Continuing to refer to FIG. 14, all or virtual map and/or first data structure may be stored on portable computing device 160 alternatively one or both may be downloaded from a remote device, such as a server on demand. For instance, when wireless receiver 104 arrives at a location corresponding to one or more navigable spaces 200, such as the entrance to a particular building, wireless receiver 104 may send a query to the remote device requesting first data structure portions and/or virtual map data corresponding to that location. Wireless receiver 104 may detect location using navigation services such as GPS. Wireless receiver 104 may detect location by receiving a signal from at least one first transmitter 128. The user may enter location information into the receiver using any input means described below in reference to FIG. 18. In some embodiments, wireless receiver 104 downloads the information for a set of navigable spaces 200 where there is a strong network connection; the connection may be over a cellular data network, a wireless connection to a network, or other means. In some embodiments, a user enters an instruction on wireless receiver 104 describing a location that the user plans to visit at a future point, and wireless receiver 104 downloads first data structure and/or virtual map information corresponding to that location.

At step 1425, with continued reference to FIG. 14, portable computing device 160 determines a location of the user as a function of the first location. Portable computing device 160 may determine location of at least one first transmitter 128 relative to portable computing device 160. Portable computing device 160 may determine that at least one first transmitter 128 is closer than a certain distance from portable computing device 160 based on the signal range of at least one first transmitter 128; for instance, where at least one first transmitter 128 includes a passive transmitter, the range at which magnetic coupling is capable of powering at least one first transmitter 128 may be only a few inches at most. In other embodiments, portable computing device 160 may determine distance from the at least one at least a transmitter 128 using signal strength, with a stronger signal indicating closer proximity to at least one first transmitter 128.

Still viewing FIG. 14, portable computing device 160 may also determine the user's orientation relative to at least one first transmitter 128. For instance, determining the location of the user may involve determining that the user is located at the first location, because of the small effective distance of a passive transmitter and receiver pair. In an embodiment, orientation may be determined by determining that a user holding a receiver reading a passive transmitter is facing a vertical surface where the passive transmitter is located. Alternatively or additionally, user motion prior to or after receipt of first signal may be used to determine user orientation; an IMU or element thereof may be used to detect user motion. For instance, where device 100, using IMU, for example, determines that user has followed a path approaching at least a first transmitter 128 from a particular direction, device 100 may determine that user is facing in that direction; where IMU detects that user has turned, for instance, by turning toward at least a first transmitter 128, device 100 may update user's probable position. Detecting user's direction of motion may enable device 100 to determine user orientation with respect to a transmitter that is on a horizontal surface, such as on or under a counter, or otherwise mounted to an object that is not a vertical object such as a wall or sign; likewise, orientation relative to a non-fixed object such as a trashcan that has transmitter on it may be determined by detection of user motion through devices including but not limited to components of IMU 180.

Continuing to view FIG. 14, in some embodiments, instructions regarding orientation are given using the UCS of at least a transmitter 128 at which the user is currently located, as a sequence of turns and paces. As a non-limiting example, instructions to follow a given path may start with the assumption that the user is currently facing at least a transmitter 128, and instruct the user to (a) turn around, (b) proceed 5 feet (along the Y axis), (c) go to the right (along the X axis) for 8 feet, then (d) proceed for 3 feet at a 45-degree angle from the Y axis, as measured from the positive X axis (to the right of the Y axis in this example). In some embodiments, this sequence is provided to the user by way of user output component 164. Portable computing device 160 may produce or receive further instructions to provide to the user upon arriving at a subsequent at least a transmitter 128; the additional instructions may us orientation relative to the new at least a transmitter 128.

Still referring to FIG. 14, where there is a surface feature 216 located at the first location 204A, portable computing device 160 may use the surface feature 216 as a reference point to navigate the navigable space 200. In other words, portable computing device 160 may give directions to the user using the surface feature 216 as a starting point. In some embodiments, this gives the user a straightforward approach to use in entering any navigable space 200 in which the system 100 is deployed, where the user seeks out the surface feature 216, placing wireless receiver 104 in contact with at least one first transmitter 128, and portable computing device 160 uses path or wayfinding data to give the user navigation instructions 200 from the surface feature 216; the surface feature 216 may be in a predictable location within the navigable space 200. Alternatively, portable computing device 160 may maintain instructions for finding the surface feature 216 in memory accessible to portable computing device 160. Portable computing device 160 may determine the position of portable computing device 160 within the navigable space using the determined position of portable computing device 160 relative to at least one first transmitter 128. Portable computing device 160 may determine the position of portable computing device 160 within the navigable space using the determined position of portable computing device 160 relative to the second at least a transmitter 128. Portable computing device 160 may determine the position of portable computing device 160 within the navigable space 200 using IMU 180; for instance, portable computing device 160 may use IMU 180 to determine the direction and speed of motion of portable computing device 160 from an initial position; portable computing device 160 may use this to determine where the user is within the navigable space 200 and to determine whether the user is following a path within the navigable space 200 corresponding to a usage sequence as described above.

At step 1430, with continued reference to FIG. 14, the portable computing device 160 provides the location of the user via a user output component 164 coupled to the portable computing device 160. Portable computing device may present the location of the user using the display 168. For instance, portable computing device may cause the display 168 to display information in large type. Portable computing device may cause the display 168 to display one or more shapes, such as directional arrows; for instance, a direction arrow may indicate the user location as in "you are here" note on a map. The direction indicated by the directional arrow may adjust its orientation relative to the user using data from an IMU 180. Other shapes, including stars, asterisks, and the like may alternatively or additionally be used. Portable computing device may present the location of the user using audio output device 172; for instance, portable computing device may cause a speaker, headphones, or a headset to output a verbal description of the location. The verbal description may be generated using text-to-speech software. The verbal description may be pre-recorded.

Portable computing device may present location of user using a tactile output device 176. Portable computing device may cause tactile output device 176 to output description of location of user in braille or in other texture-readable forms; tactile output may include, without limitation, a tactile map of the immediate area and/or tactile representations of features or operation thereof. Portable computing device may cause tactile output device 176 to output shapes, such as directional arrows, as described above.

At optional step 1435, and still referring to FIG. 14, portable computing device 160 retrieves usage data from a second data structure linking the feature to usage data for using the feature. In an embodiment, portable computing device 160 may retrieve the usage data using identification of the user feature as described above from the data structure described in reference to FIGS. 1-13C.

At optional step 1440, and continuing to refer to FIG. 14, portable computing device 160 may generate a usage sequence for using a user feature, such as user feature at second location, as a function of the location of the user, the second location, and the usage data. Portable computing device 160 may determine usage sequence by receiving a user instruction indicating a desired course of action. User instruction may be entered using any data entry device as described below in reference to FIG. 18. For instance, user instruction may be entered verbally, using speech recognition software. User instruction may be entered manually using a touchscreen, a keyboard, buttons, or other controls. In some embodiments, portable computing device 160 presents the user with a set of options, and receives a user instruction selecting an option from the set; this may be accomplished using the display 168 or a tactile output device 176 to list the options, or using an audio output device 172 to present the options similarly to an automated phone service. The options may correspond to a set of default usage sequences likely to be useful for the use of the navigable space 200. For example, likely usage sequences to be performed in a bathroom may involve using a toilet stall, using a urinal, washing at a sink, locating paper towels, or locating a trash can.

Still viewing FIG. 14, in some embodiments, portable computing device uses the instruction entered by the user to retrieve a usage sequence. A usage sequence may be a series of steps the user may take to accomplish a given task in the navigable space 200. As a non-limiting example, where the task is to use a bathroom stall, the sequence may involve (A) instructing the user to move in a direction toward a particular stall, (B) instructing the user how to enter the stall, (C) informing the user how to locate a toilet within stall, (D) informing the user how to locate toilet paper within stall, (E) and instructing the user how to flush using retrieved usage info. Further continuing the example, some portions of the usage sequence may be instructions to be performed by portable computing device or a computing device 218 coupled to the receiver, and not directly presented to the user; such steps may include (a) finding location of at least one bathroom stall, (b) determining which of the at least one stall is unoccupied, (c) determining which of the at least one stall is functioning, and (d) determining a path to the at least one stall from (1) location of the transmitter or (2) location of the receiver. Each of these steps may be determined using wayfinding data obtained from at least one first transmitter 128, a second transmitter 156, or from memory as described above. Where the user location differs from the second location, generating the usage sequence may involve generating at least an instruction for navigating from the user location to the second location; alternatively, portable computing device 160 may determine that first location and second location are substantially the same, indicating user is already at user feature, and may not generate navigation instructions. Where user is at user feature, portable computing device 160 may generate orientation instructions, for instance informing user by reference to a tactile indicator near or on user feature, or a transmitter near or at user feature, how to orient him or herself relative to user feature.

As a further example, and continuing to view FIG. 14, portable computing device may perform a sequence of steps to use a toilet in a restaurant or similar venue, including: a) storing the current table and seat location where the user is located; (b) retrieving information regarding a path to a restroom foyer or lobby; (c) once in the foyer or lobby, retrieving the path to the men's restroom; (d) once in the men's restroom, retrieving the path to the handicap toilet stall that contains a shelf and a paper toilet seat cover dispenser; (e) once at the toilet, retrieving the path to a handicap accessible sink and the relative locations of a nearby soap dispenser and a paper towel dispenser; (f) once at the sink, retrieving the path to the trash receptacle and restroom exit; and (g) once at the exit, retrieving the path back to the stored initial table and seat in the dining area. The arrival at each location may be detected by receiving, from at least a transmitter 128 at that location, the transmitter's wayfinding data. The retrieval of the path information in each step may be performed by receiving the path information from at least a transmitter 128 located at that step, by receiving the path information over the network using the identity of at least a transmitter 128 located at that step, or a combination of the two methods.

Still referring to FIG. 14, in an embodiment, usage instructions may be generated using data describing user's physical parameters. Physical parameters, as used herein, may include height, weight, reach, category of impairment, degree of impairment, accommodations, and the like. For instance, user data entered in the system may describe a height range the user can comfortably reach above the floor, a distance to the front or side the user can reach, whether the user uses a wheelchair, or other information that may affect how user may approach user feature. This information may be entered by user. In an embodiment, portable computing device may be used to aid in detecting user physical parameters. For instance, portable computing device 160 may be used to track user motion taken to place portable computing device 160 and/or receiver in proximity with at least a transmitter 128. As a non-limiting example, where receiver is located in a handle of an aid such as a white cane, portable computing device 160 may track a level at which user operates the handle, and use an IMU or similar sensor or sensors to detect a distance up or down user must move handle to reach at least a transmitter 128. Similarly, where receiver and/or portable computing device 160 is typically carried in user's pocket, sensors may detect a typical height above ground occupied by portable computing device 160 and measure or detect a distance from that height that receiver and/or portable computing device is moved to encounter at least a transmitter 128. Portable computing device 160 may provide user an instruction to move portable computing device and/or receiver to a reference point on user such as the user's nose, chin, waist, or the like, and then track movement from that reference point to at least a transmitter 128. This information may be compared to information provided concerning one or more other users to determine how to instruct user regarding height of user feature or of one or more controls to operate user feature; for instance, where it is determined that user is unusually tall, either by sensor processes as described above or from recorded information, user may be directed to taller user features or user features with controls higher off the ground, whereas a shorter user or a user in a wheelchair may be directed to user features having controls that are lower down.

Continuing to view FIG. 14, an additional example illustrates the ability of portable computing device to use features within the navigable space to aid in navigation. In one embodiment, portable computing device performs a usage sequence that aids a user in finding and utilizing a urinal. Portable computing device may (a) find the closest men's restroom; (b) upon entry to the restroom, signal an automatically flushing urinal to flush when nobody is there. The signal may be performed using a wireless transceiver link as described above. The user may then walk toward the sound of the flushing urinal, with no need for further information indicating the urinal's location. The user may select a sequence using one or more spaces as described above prior to engaging in the sequence. The sequence may use path information from virtual map to guide the user through the navigational steps in the sequence. In an embodiment, a plurality of usage sequences may be configured; a user may configure usage sequences by requesting a list of desired usage sequences. Alternatively, list of usage sequences may be created by tracking past user interaction with device 100 or system; list may be ranked in order of probability that user will utilize a give usage sequence, where probability may be based on past usage by user. Device 100 may generate each usage sequence from the list that is possible in navigable space upon reception of the signal; alternatively device 100 may proffer a list of possible sequences from user list to user and generate a selected sequence upon receiving a user selection. As a non-limiting example, the user may create or request generation of a sequence to wash hands, instructing to user to proceed to the nearest restroom where the user is permitted, find the closest sink (or closest unoccupied sink), describe how to operate the sink and/or soap dispenser, indicate hand-drier location and operation if available and/or paper towel location and operation, indicate the location of a trash receptacle, and direct the user to the restroom exit; directions back to user's previous location may also be included. Persons skilled in the art, upon reading the entirety of this disclosure, will be aware of many other possible usage sequences, including without limitation sequences for using toilets, including particular categories of toilets, sequences for changing babies' diapers, sequences for locating and using ATMs, and the like.

Still viewing FIG. 14, in an embodiment, user feature has at least a user control. At least a user control may be a button, lever, sensor, switch, doorknob, door latch, keyboard, keypad, or other item that allows a user to switch on or off, open, move, or otherwise manipulate part or all of user feature. Retrieving usage data may involve retrieving data describing the at least a user control. Portable computing device may generate usage sequence in part by generating at least a user instruction for use of the user control; this may be accomplished, for instance, by adding a step in the sequence outputting the data describing the at least a user control. Data describing at least a user control may include, for instance data indicating a category of user control, such as motion sensor, door knob, door handle, lever, push-button, switch, and the like. Data describing at least a user control may include, as another example, data indicating a location on user feature of the user control, such as whether the user control is on the right or left side of the user feature when the user is facing it, whether the user control is on top of or under a counter, a height at which user control may be found, any object user may have to reach around to access the user control, and the like.

With continued reference to FIG. 14, portable computing device 160 may provide the usage sequence via a user output component 164 coupled to the portable computing device 160. Portable computing device may present the usage sequence using the display 168. For instance, portable computing device may cause the display 168 to display information in large type. Portable computing device may cause the display 168 to display one or more shapes, such as directional arrows; for instance, where the user has requested to proceed to a particular feature, as described in further detail below, portable computing device may cause the display 168 to display a directional arrow indicating the direction in which to proceed to arrive at the feature. The direction indicated by the directional arrow may adjust its orientation relative to the user using data from an IMU 180. Portable computing device may present the data using audio output device 172; for instance, portable computing device may cause a speaker, headphones, or a headset to output verbal instructions. The verbal instructions may be generated using text-to-speech software. The verbal instructions may be pre-recorded.

Portable computing device may present the usage sequence using a tactile output device 176; for instance, portable computing device may produce vibration to signal when the user is near to or facing a feature to which the user intends to proceed, as set forth in further detail below. Portable computing device may cause tactile output device 176 to output instructions in braille or in other texture-readable forms; tactile output may include, without limitation, a tactile map of the immediate area and/or tactile representations of features or operation thereof. Portable computing device may cause tactile output device 176 to output shapes, such as directional arrows; for instance, where the user has requested to proceed to a particular feature, as described in further detail below, portable computing device may cause tactile output device 220 to output a directional arrow indicating the direction in which to proceed to arrive at the feature. The direction indicated by the directional arrow may adjust its orientation relative to the user using data from an IMU 180.

In some embodiments, presenting the usage sequence to the user also involves looking up additional data, such as wayfinding data, using signal received from at least one first transmitter 128. Portable computing device may use one or more items of data from the signal as a key to retrieve additional data from memory. For instance, portable computing device may use an identifier that identifies at least one first transmitter 128 to retrieve data associated with that transmitter from memory; multiple data items may be used to form narrower selections of data. The data in memory may be stored on portable computing device or in a remote device (not shown) such as a server as described below in reference to FIG. 18, or other computing device. The data may be stored in a database as described below in reference to FIG. 18. The data may be stored in a data structure such as a tree, linked list, hash table, array, or any other suitable data structure.

In some embodiments, portable computing device causes user output component 164 to provide a single item of information to the user. The single item of information may be the current location of portable computing device, and hence the user. For instance, where at least one first transmitter 128 has a small range of communication, portable computing device may determine from the fact of communication with at least one first transmitter 128 that portable computing device is immediately adjacent to at least one first transmitter 128. Location information of at least one first transmitter 128 may therefore enable portable computing device to determine where in the navigable space 200 portable computing device is located. Likewise, portable computing device may cause user output component 164 to inform the user of data about an immediately user feature 212, such as a sink or stall; user output component 164 may identify the feature. User output component 164 may provide use information about the feature. User output component 164 may provide state information about the feature. Thus, as a non-limiting example, the user may place portable computing device close to at least one first transmitter 128; using data from at least one first transmitter 128 (either directly or as a key for data retrieval), portable computing device may determine that a toilet stall is immediately next to the user, that the toilet stall contains a toilet that automatically flushes, and that the toilet stall is not currently occupied. Further continuing the example, the user may know as a result how to proceed with using the toilet stall with relatively little trial and error; portable computing device may use orientation information concerning portable computing device or a coupled device to determine in which direction the user must likely turn to access the stall, and provide that information to the user as well.

Still referring to FIG. 14, one or more usage sequences may be presented to the user in response to scans of additional transmitters. For instance, where second transmitter 156 is located at the second location, providing the usage sequence to the user may include providing at least an instruction for navigating to the second location to the user, receiving a second signal from the second transmitter, and providing at least one additional instruction of the usage sequence to the user. Thus, for instance, portable computing device 160 may provide only navigation data for getting to the user feature until the user arrives at the user feature; portable computing device 160 may provide an instruction to the user instructing the user to place wireless receiver 104 near second transmitter 156 to obtain a signal from second transmitter 156. The at least one additional instruction produced after reception of second signal may include an instruction for using the user feature. The at least one additional instruction may include at least an instruction for navigating to a second user feature; for instance, usage sequence may involve navigating to a first feature, such as a toilet or urinal, using the first feature, navigating to a second feature, and using the second feature. This set of steps may be repeated one or more times: for instance, arriving at the sink, user may scan a third transmitter, obtaining instructions for using the sink and/or instructions to get to a third user feature, such as a hand drier or paper towel rack; another scan of a fourth transmitter at the third user feature may indicate how to find an exit from the bathroom. In an embodiment, portable computing device 160 receives an indication that user has completed the usage sequence; user may enter the indication through an input device, or wireless receiver 104 may receive a signal from a transmitter indicating that user has completed sequence. Portable computing device 160 may then use user output component 164 to ask user whether user wishes to perform another action, look for another feature, or receive further navigation instructions; one or more steps of method 1400 may then be repeated.

Alternatively or additionally, and still referring to FIG. 14, usage sequence may be generated and/or output upon user navigating to a specific location. For instance, user may receive a first usage sequence directing user to navigate to a center of navigable space, a particular architectural feature or user feature, or a second transmitter; usage sequence may be provided to user upon arrival at specific location. User may enter an instruction indicating arrival at specific location, or device 100 may detect user arrival; detection may include receiving a signal from a second transmitter, which may be a return signal where second transmitter is a transponder. Detection may include detection of user motion, position, and/or orientation using an IMU to determine direction and/or distance of user travel. Detection may include detection of user motion, position, and/or orientation using one or more navigational facilities. Detection may include detection of user motion, position, and/or orientation using signals received at receiver 104 from one or more active transmitters including without limitation beacons. Usage sequence may be generated automatedly upon detection; for instance, user may have entered data used to identify second location, according to any means or method described above, prior to arrival at specific location. User may enter data used to identify second location, according to any means or method described above, upon arrival at specific location. Usage sequence may be generated previously, but provided to user only upon arrival at specific location.

Continuing to refer to FIG. 14, device 100 may cause user feature to signal its location to user. For instance, where user feature has an electronically controlled component that produces noise, such as an automated flusher in a toilet, device 100 may transmit a signal, directly or indirectly, to user feature that causes user feature to activate the electronically controlled component; as a non-limiting example, device 100 may cause an electronically flushing toilet to flush itself, alerting user to the direction in which to travel to arrive at the electronically flushing toilet. User feature may have a speaker, claxon, or other audio output device that may similarly be activated to orient user. Device 100 may similarly activate or detect an active transmitter located at user feature, including without limitation a beacon, to indicate a distance user must travel to arrive at user feature, using relative strength of signal, for instance. Strength of signal may be coupled with IMU data or other data tracking position, direction of motion, and/or orientation of user to determine whether user is proceeding toward user feature; corrective notifications may be provided to user to indicate whether user is proceeding toward user feature or not. User may trigger any one of these actions by entry of an instruction, for instance by activation of a button; alternatively or additionally, any one of these actions may occur automatedly when device 100 determines second location and/or user feature user has indicated desire to use as described above. This process may be performed in addition to or instead of generation of usage sequence as described herein.

With continued reference to FIG. 14, device 100 may detect whether user is following steps of usage sequence. Detection may be performed using an IMU, navigational facility, reference to signals from one or more active transmitters, including without limitation beacons, and/or reception of a signal from a second transmitter. In an embodiment, device 100 detects that user has deviated from usage sequence, for instance by proceeding to a different location from second location; device 100 may output an alert to user indicating that user has deviated. Device 100 may generate an updated usage sequence as a function of user's new current location; generation may be performed as described above. Where user is at or near a different user feature than that originally used for usage sequence, device 100 may generate a new usage sequence using the different user feature in place of the original user feature; this may be implemented as described above.

In some of the embodiments of method 1400, and continuing to refer to FIG. 14, device 100 may receive information from the user. The information may include feedback about the functioning of device 100 in the navigable space 200 in question; for example, the user may find that a set of instructions failed to account for an obstacle, led the user to the wrong user feature 212, were out of date, or were difficult to follow, or that one or more user features did not function according to the use data provided. The information may include feedback about the navigable space 200, such as the discovery that a particular toilet did not function properly, or was closed for repair, or that the user has discovered a particularly helpful way to deal with a particular user feature. The information may be temporary in nature, as for a toilet that is out of order, or may indicate a more permanent situation, such as a particular location of a doorknob or particular way of using a given user feature when functioning correctly.

Continuing to refer to FIG. 14, in some embodiments, where at least a transmitter 128 includes writable memory 152b,c, the user may provide the information directly to the transmitter by writing to the transmitter memory. In some embodiments user-provided data in the writable memory is flagged as coming from a user, so that portable computing device 160 of a subsequent user is able to distinguish user-provided information from information provided by the administrator of device 100; in this way, a user may be able to assess the reliability of the data received from at least a transmitter 128. In some embodiments, the user instructs portable computing device 160 to write one or more items of data to a user-possessed transmitter, as described above; the data may indicate any information the user wishes to convey concerning an object attached to the user-possessed transmitter.

Still referring to FIG. 14, in other embodiments, the user enters the information on portable computing device 160, and the receiver provides the information to a computing device such as a remote server or data center. Portable computing device 160 may provide the information to the remote device when the network connection to the remote device is of sufficient quality to transmit information; if not, portable computing device 160 may store the information locally and upload the information to the remote device when the connection is sufficiently strong. In other embodiments, the user may enter the information on the system via a website or other application besides portable computing device 160. In some embodiments, the user enters the information on portable computing device 160 or website as text written or spoken by the user, as photographs, as videos, or in any other suitable form. In other embodiments, the user enters the information on portable computing device 160 or website in a pre-selected form; for instance, portable computing device 160 or website may present the user with one or more statements to which the user can indicate agreement. The one or more statements may be presented in the form of a checkbox, drop-down menu, the option to select one or more buttons, or the like. As a non-limiting example the statements to which the user may assent or not include the statement that a at least a transmitter 128 is not working, that at least a transmitter 128 or system 100 provided incorrect information, that more information is needed, or similar statements. Those comments along with the unique identification of the signs encountered or space encountered may be transmitted to an Internet connected storage location such as a remote device immediately or at a later time if Internet accessibility is not immediately available, as noted above.

With continued reference to FIG. 14, user-entered data may be stored by portable computing device 160 in a data structure a user identifier to transmitter 128 as described above in reference to FIGS. 1-13C; as a non-limiting example, linking to user identifier may indicate to other users or users of other devices similar to device 100 that data was entered by a particular user, or by the particular user of device 100. User-entered data may be provided to all users or only to the user that entered it; for instance, user may enter an instruction that an item of information concerning first transmitter 128 be shared with other users, or may enter an instruction that the item be available only to user. In the latter case, item may be provided to user along with usage sequence in a subsequent interaction with first transmitter 128. User-entered data may alternatively be linked to user feature, an architectural feature, or to another transmitter.

Still referring to FIG. 14, information entered by the user may be evaluated for its accuracy. Unevaluated information may be presented to users via portable computing device 160 or a website with an indication that it is user-entered data. In some embodiments, the evaluation is programmatic. In other embodiments, the evaluation is manual; for example, a person authorized to evaluation the information may check the accuracy of the submitted information and then enter an instruction indicating that the information is accurate. In some embodiments, wireless receiver 104 of a subsequent user encountering the same transmitter receives the information, and the user is asked to determine whether the user-entered information is correct; a plurality of subsequent users may be asked, with a threshold number or proportion of affirmative answers causing the information to be verified. In some embodiments, once the information is verified, device 100 transmits the information to portable computing device of a user who is in contact with at least a transmitter 128, and wireless receiver 104 writes the information to the transmitter; this may be performed automatically, without the user necessarily being aware of it.

In some embodiments, updated or modified data is entered on the at least a first transmitter 128 by an authorized user. Where the data corresponds to a given at least a transmitter 128, the updated information may be conveyed to a receiver 104 being used by a user that is in contact with the transmitter, and written to at least a transmitter 128 by that receiver 104; in some embodiments, the updated data is transmitted to all receivers 104 that are within a certain range of at least a transmitter 128 according to virtual map, such as all receivers 104 in the building or on the floor of the building where at least a transmitter 128 is located. Alternatively, and as discussed elsewhere herein, user-entered information may be made available in one or more data structures, and may be accessible to user, a group of which user is a member, to all users, to users having certain authentication credentials, or any other suitable access protocol.

User-entered information may include group information. Group information may be information concerning a group of users related by a particular interest or other commonality. As a non-limiting example, where at least a first transmitter 128 is installed at a street sign on behalf of a municipal government, a user representing the municipal government may enter user-entered information containing the information displayed on the sign, such as a street name, intersection, or the like. Continuing the example, a user who works with a public transportation system within the municipality may add user-entered information indicating one or more locations of bus stops, train stations, or similar items, relative to the sign. Further continuing the example, one or more owners or employees of local retail or service establishments may enter user-entered information directing users to their establishment. Each of these forms of information may be accessible to a user; in some embodiments, user instructions indicating a desired activity or sequence may cause the information to be filtered, for instance by providing, for a user interested in dining out, only information concerning nearby restaurants.

In some embodiments, wireless receiver 104 receives data from a third-party transmitter, such as a transmitter associated with a product or service in the navigable space 200. For instance, the third-party transmitter may be an RFID tag that contains product information. As a non-limiting example, the product information may include locations, ingredients, allergen, or nutritional data of food products on a menu or on a shelf in a grocery store. The product information may include menu item descriptions and prices at a restaurant. In other embodiments, the data from the third-party transmitter is content data; for instance, a restaurant may provide near-field communication tags on its salt and pepper shakers or condiment dispensers indicating the contents thereof. In other embodiments, wireless receiver 104 receives identifying information from the third-party transmitter, and uses the identifying information to retrieve product data or content data; the identifying information may identify the transmitter, a product, a container, or another item such as a sign, menu, or the like. Wireless receiver 104 may present this information to the user by way of user output component 164.

In an alternative or additional embodiment, wireless receiver 104 reads, using a code reader, a code. The code may be a UPC code or QR code attached to a product or feature. The code may be a third-party code. The code may contain product data. The code may contain content data. The code may include an identifier that wireless receiver 104 uses to retrieve product data or content data.

Figure 15:
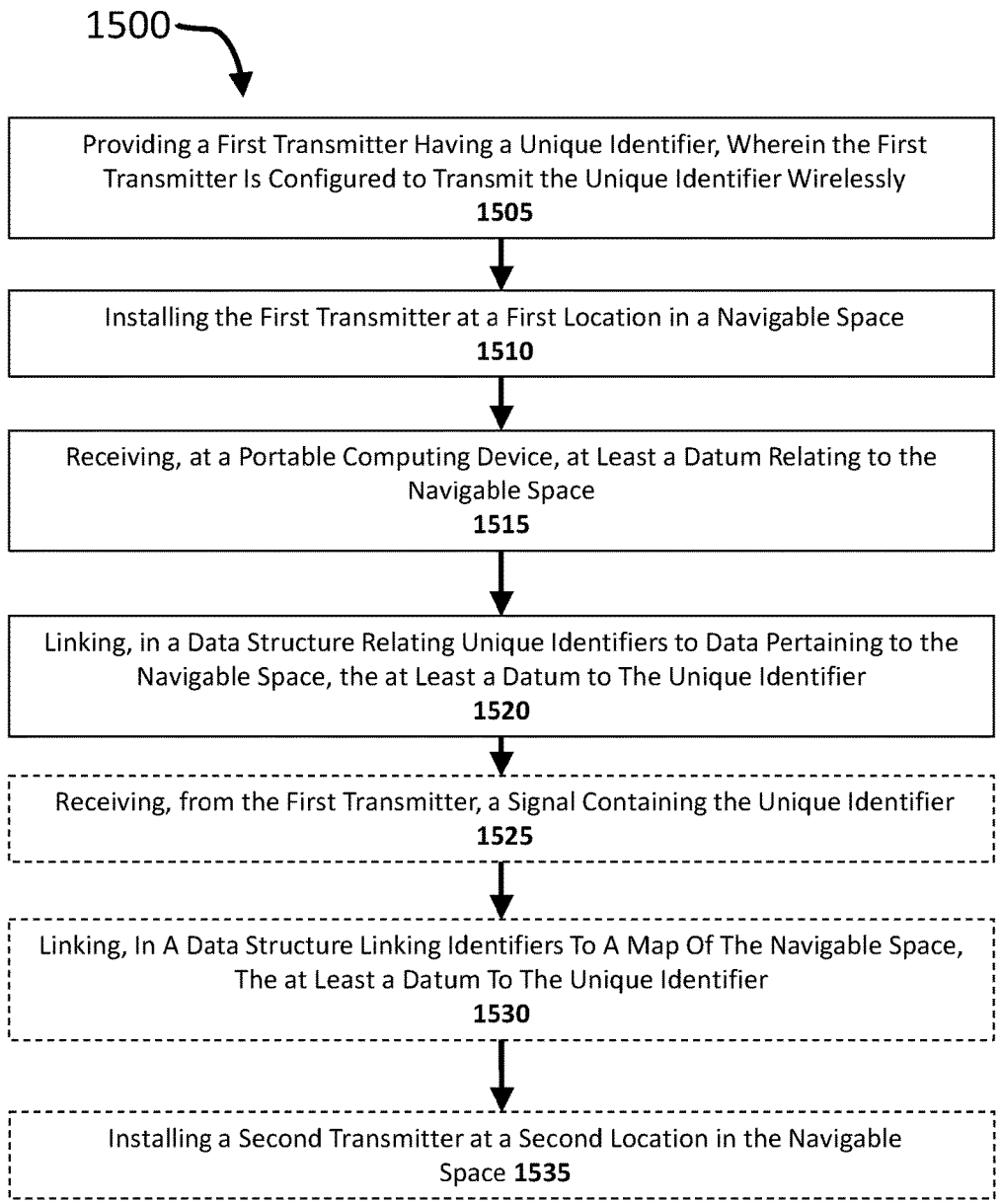
FIG. 15 is a flow diagram illustrated an exemplary method of installing a system for navigation and usage guidance in a navigable space.

Referring now to FIG. 15, an exemplary embodiment of a method 1500 of installing a system for navigation and usage guidance in a navigable space is illustrated. At step 1505, a first transmitter having a unique identifier is provided. First transmitter may be any transmitter suitable for use as at least a first transmitter 128 as described above. Unique identifier may be any unique identifier as described above. First transmitter may be configured to transmit the unique identifier; this may be implemented according to any means or methods described above in reference to FIG. 14.

At step 1510, and still referring to FIG. 15, first transmitter is installed at a first location in a navigable space. Navigable space may be any navigable space 200 as described above. Installation may be performed by any means for installation consistent with FIGS. 1-5, including adhesion or other attachment to a sign such as an ADA sign, informational object, an architectural feature or user feature, incorporation in a sign, informational object, an architectural feature or user feature, or the like. First and/or second touch-discernable features may be installed in relation to first transmitter.

Continuing to view FIG. 15, at step 1515, at least a datum relating to navigable space is received at a portable computing device. At least a datum may include any information in any form described above as pertaining to navigable spaces, user features, architectural features, transmitters, beacons, or any other items. At least a datum may include an indication of the first location is received at a portable computing device. Indication of first location may be received via user input; for instance, a user may identify the first location on a map such as described above, and enter an instruction identifying the first location, for instance by selecting the first location on a display indicating the first location within the map. User may enter an instruction indicating an architectural feature or user feature at which the first location is located; for instance, user may enter an instruction indicating that the first transmitter is located on a door frame of an exit from the navigable space 200, which can be identified on the map by computing device. User may alternatively or additionally be following instructions; for instance, computing device 100 may prompt user to install at a particular first location as part of an overall installation process. Received indication may include information usable to map first location to coordinates in a coordinate system as described above; for instance, coordinates may be entered directly, or inferred from a location of a locator, such as a mouse cursor or the like, that the user utilizes to indicate a displayed location.

Still viewing FIG. 15, received indication may include information identifying first location relative to a second location in navigable space. Second location may include a location of a second transmitter. Second location may include a location of a feature that a user may readily identify, with or without a transmitter. For instance, second location may include a location of an architectural feature, including without limitation a column, door, wall, change of flooring (e.g., change from one tile size to another, from carpet to tile, and the like), counter, corner, shelving, or any other architectural feature described above. Second location may include a user feature, including without limitation fixed features, such as sinks, stalls, ATMs, condiment stations, paper towel dispensers, coat hooks, toilet seat covers, and the like, and non-fixed features such as trash cans and the like. Second location may include a location of any element of an assembly 300 as described above, including first and/or second touch-discernable features, informational objects, and the like.

With continued reference to FIG. 15, information identifying first location relative to second location may include numerical instructions, such as distance and direction of travel from second location to first location. Information identifying first location relative to second location may include one or more instructions, such as instructions to turn toward second location and proceed a certain number of steps in that direction. Information identifying first location relative to second location may include information usable to identify second location, such as information describing an architectural feature, user feature, and/or element of an assembly 300 at second location. Received information may, as a non-limiting example, instruct a user to proceed to second location and then continue from second location to one or more additional locations within navigable space; the second location may be a central location within navigable space, from which travel to other locations is relatively straightforward, such as a door to a restroom, or just inside a door to a restroom.

Continuing to refer to FIG. 15, receiving indication of first location may include receiving information entered by a user. For instance, a user that is installing first transmitter may physically measure distances between first location and second location, and enter the physically measured distances using any input devices described herein. User may enter additional instructions for navigation to or use of second location; additional instructions may include any feature data as described above, relating to any feature at second location or at additional locations. Additional instructions may include usage sequences or portions thereof as described above. Additional instructions may include an identity of a venue at which navigable space is located; venue may be, for instance, a restaurant, hotel, or other building. Additional instructions may include a name of navigable space or some portion thereof; as a non-limiting example, name may identify navigable space as a Men's restroom, a food court, or the like. Instructions may be entered during the process in which first transmitter is installed, or at an earlier or later time; for instance, a user may enter any indication of first location and/or additional instructions prior to installation of first transmitter, immediately after installation, or at any point subsequent to installation.

In an embodiment, and still referring to FIG. 15, a user entering information including any indication of first location and/or additional instructions by following one or more prompts provided to user via user output component 164. As a non-limiting example, device 100 may prompt user to install first transmitter at one or more pre-selected locations. For instance, device 100 may previously receive an instruction or otherwise be configured to identify a first location where first transmitter is to be installed, such as an entryway, ADA-compliant sign, or the like; user may be provided an instruction to install first transmitter one of the one or more pre-selected locations, and then prompted to select the location at which installation occurred, or where there is only a single pre-selected location, to indicate that installation occurred at that location. A user may similarly be prompted to enter locations of additional transmitters as described below, measured distances between first location and second location and/or additional locations, and the like. A user may be prompted to enter a sequence of directions for navigation to and/or use of a user feature, exit door, or the like. As a non-limiting illustration, a user may be prompted to enter, and enter a first instruction indicating a direction in which to proceed from a known orientation, such as the orientation of a user currently located at first location; user may select from a set of prompts including "left," "right," "diagonally right," and so forth. User may be prompted to enter a distance in which to proceed in the chosen direction, and may be provided a field to enter a distance in some unit or units of measurement, or to select from a list of preset distances in a dropdown list. User may alternatively or additionally be prompted to enter a distance to travel in terms of an architectural feature, user feature, or other landmark, such as an instruction to proceed to the end of a wall, to a door frame, into a vestibule, or the like. These prompts may continue to request additional instructions until user has indicated that a person following the instructions would arrive at the feature in question; user may have a "sequence completed" button or the like to select to indicate that a navigation sequence, usage sequence, or both may have been completed. Sequences may be entered and/or stored relating two or more associated features, such as a sequence or instruction describing location of a soap dispenser relative to a sink, as well as usage instructions for the soap dispenser, a sequence or instruction describing a location of a coat hook within a stall, relative to a stall door, a sequence or instruction indicating how to locate a seat cover relative to a stall door, and the like.

Still viewing FIG. 15, receiving the indication of the first location may include receiving, from a second transmitter, a signal and identifying the first location as a function of the signal. Second transmitter may have a first location that has already been recorded by reference to map. In an embodiment, computing device may receive signal from second transmitter, determine first location of computing device as a result of the signal as described above, detect that it is being carried to first location, and identify first location as a function of the detection; detection may include, for instance, receiving unique identifier from first transmitter. Thus, for example, user may "tap" second transmitter at its known first location, walk to first transmitter, and then "tap" first transmitter; elements coupled to computing device, including without limitation an IMU or any element thereof, navigational facilities, and/or signals from one or more beacons, may be used to determine the path the user has taken while carrying computing device, so that upon reception of unique identifier from first transmitter, computing device is able to determine its current first location, and thus the first location of first transmitter. Alternatively or additionally, second transmitter may include one or more beacons, which computing device may use to determine its first location when contacting first transmitter. The above-described methods for receiving an indication of the first location may be combined; for instance where second transmitter is used to determine first location, determined first location may be presented to user for correction or approval, and user may enter an instruction verifying that the first location is correct or correcting the first location.

At step 1520, and still referring to FIG. 15, the computing device links unique identifier to at least a datum in a data structure relating unique identifiers to data pertaining to navigable space. Data structure may be any data structure as described herein. Computing device may link first location to unique identifier in a data structure relating the first location to at least a second location in the navigable space. Data structure may include any data structure as described above, including without limitation data structure in list form, such as a vector, linked list, or array, a recursive structure such as a tree, or a database; data structure may or may not be related to a map as described above. Computing device may link unique identifier with one or more additional items of information in data structure or an additional data structure, including without limitation any additional instructions, navigation sequences, usage sequences, identification of venue, or name of navigable space and/or portion of navigable space. Information may be linked using any data structures described above, including without limitation data structures containing usage data and/or usage sequences or components thereof, as described above.

At optional step 1525, and with continued reference to FIG. 15, computing device may receive, from first transmitter, a signal containing the unique identifier. Receiving may be implemented in any manner described above for reception of a signal from at least a transmitter. By way of illustration, and as a non-limiting example, user may install first transmitter, select from a set of prompts the name "Men's Restroom," and receive signal from the first transmitter; signal may be parsed as described above to obtain unique identifier, which then may be linked to the name "Men's Restroom" as well as a location received or detected as described above.

At optional step 1530, and still referring to FIG. 15, the computing device links the first location to the unique identifier in a data structure linking identifiers to a map of the navigable space. Data structure and map may be implemented in any manner described above. User may enter any additional information concerning first location, including user information, group information, usage data, and the like. Each of steps 1505-1530 may be repeated for multiple transmitters, for instance to install transmitters throughout navigable space or a building or other area containing navigable spaces. A transmitter at an exterior to building or area may be established as a "root" of data structure; data structure may be incorporated or a part of a larger data structure, including without limitation maps used for navigation facilities, additional data structures of larger areas, or data structures of other navigable spaces, buildings, or areas that may be joined to data structure to link information together.

At optional step 1535, and continuing to refer to FIG. 15, a second transmitter may be installed at a second location in navigable space. Second transmitter may be installed at any suitable location for installation of first transmitter, including without limitation at a user feature. In an embodiment, a user installing second transmitter, who may or may not be the user installing first transmitter, may enter an instruction specifying a user feature, such as an accessible toilet; user may then install second transmitter at user feature, such as without limitation on a back of a stall door to the accessible toilet. An indication of second location at which second transmitter has been or is going to be installed may also be received as described above, along with any additional instructions, usage sequences, navigation sequences, venue identifiers, or names as described above. Information may be linked to a second unique identifier stored on second transmitter; linking may be implemented as described above; linking may include receiving a signal from second transmitter and parsing the signal to obtain the second unique identifier as described above. Method 11400 may include installation of additional transmitters as described herein; each transmitter may be related to other installed transmitters using any data structure and/or map as described above.

Still referring to FIG. 15, the following exemplary embodiment is presented to illustrate a possible implementation of method 1500; the presentation of this example is for the purposes of illustration only, and should not be construed as limiting in any way the scope of method 1500 or of any other method or system disclosed herein. In an exemplary embodiment, a user may identify or name in a data structure, which may include a database, first location; user may enter this information via a mobile computing device such as a smartphone by way of a mobile application and/or web application. Data structure may be located on a cloud service or other remote data service. First location may, in this example, be placed on a map as described above; alternatively or initially, no map may be used. User may enter one or more further instructions describing or referring to a venue (e.g., a particular restaurant brand at a particular address) via the computing device. User may enter one or more instructions describing or referring to a name for navigable space, such as "Men's Restroom"; name may be selected from a list of names for specific locations at the venue. Further continuing the example, user may install first transmitter at a particular location, such as an ADA sign next to the Men's restroom. User may enter information linking name to unique identifier of first transmitter; this may be performed, for example, by scanning or otherwise receiving a signal from first transmitter after selection of name as described above. Computing device may obtain the unique identifier according to any process described above; as a non-limiting example, computing device may receive a signal from first transmitter, parse the signal, extract the unique identifier from the signal, and link the name to the unique identifier.

Continuing to refer to FIG. 15, and further continuing the example, user may create or select a description of a feature via computing device, for instance by creating or selecting the description of the feature using a mobile or web application; as an illustrative example, user may select a feature description corresponding to an accessible toilet. User may install a second transmitter at a location corresponding to the feature description; as an illustrative example, where the feature description corresponds to an accessible toilet, user may install the second transmitter on the back of a stall door to the accessible toilet. Still continuing the example, computing device may link the feature name with a unique identifier of the second transmitter; this may be implemented using any procedure for linking as described above.

Alternatively or additionally, and still referring to FIG. 15, user may create or select a description of a particular location within navigable space, where the particular location may or may not be a location of a feature. Particular location may, for instance, be an easily identifiable location within navigable space; particular location may be a location adjacent to an architectural feature, such as a location just inside a door to a restroom. Particular location may be a location adjacent to a user feature, such as adjacent to a stall or bank of stalls. Particular location may be a location of a tactile sign, baseboard guide, or other informational object as described above. Particular location may be a central location within navigable space, such as a central location within a room. Second transmitter may be located at particular location; alternatively or additionally, mobile computing device may track user's progress toward particular location using navigational means, beacons, IMU, or any combination thereof. In an embodiment, mobile computing device, as configured by a mobile application, web application, or the like, and/or as triggered or instructed by a signal from first transmitter, may instruct user to proceed to particular location. Alternatively or additionally, an informational object such as a tactile sign or the like may direct user to proceed to particular location.

With continued reference to FIG. 15, and further continuing the example, upon arrival at particular location, user may proceed to a feature, such as an architectural feature or a user feature; feature may have been entered, created, or selected by user via computing device. Feature may be selected or identified by user upon arrival at particular location; selection of feature may be performed according to any means or method as described herein for selection of a feature, such as without limitation any means or method for selection of a feature in any step of method 1400 above. User receive instructions to proceed to feature; instructions may be presented to user by any user output component 164 as described above. Instructions may be generated according to any means or method described herein, including any means or method for producing navigational instructions in any step of method 1400 as described above. Alternatively or additionally, user may manually enter directions from first transmitter and/or particular location to particular location and/or feature, or vice-versa. User may enter directions by typing, speaking, selection from pre-created options presented to user, or any other suitable means or method. Directions so entered may be inserted in a data structure such as second data structure described in reference to FIG. 14; directions may be linked to additional directions such as directions for navigating to first transmitter and/or particular location, directions for using feature, or any other usage, operational, or other data. As a non-limiting example, directions may instruct a later user to proceed in a particular direction, such as straight in front of the user, to the left, to the right, at a diagonal to the right, or the like, to travel a distance, such as 8 feet, in the given direction, and/or proceed to an intermediate destination such as the end of the wall or inside the door to a vestibule; similar steps may be repeated until the user arrives at particular location, user feature, or any other intended destination. Directions may include a first set of directions to a primary feature and a second set of directions to an associated feature; for instance, directions may first instruct a user to proceed to and/or use a sink, and subsequently to proceed to and/or use a soap dispenser. Directions may instruct a user to a stall door and subsequently to a coat hook within or at a corresponding stall. Directions may instruct a user to a stall door and subsequently to a seat cover within a corresponding stall. Feature usage data of each primary and/or secondary feature may be included and/or linked to directions, and may be added to one or more data structures such as without limitation second data structure as described above in reference to FIG. 14. In an embodiment, a subsequent user, who may or may not be the user that performed steps of method 1500 as described above may modify or replace directions. Any step or steps of the above-described process or processes may be repeated for additional locations with or without additional transmitters, additional features, and the like.

Figure 16:
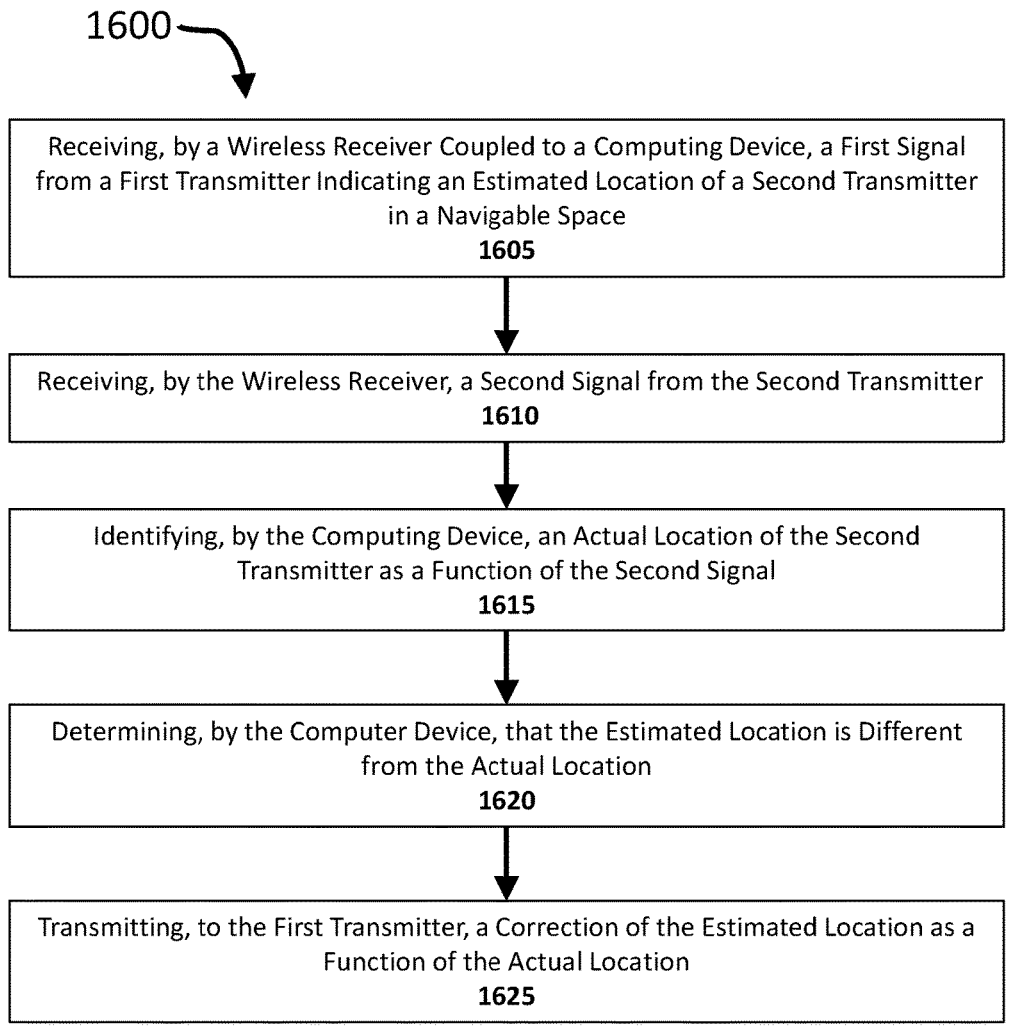
FIG. 16 is a flow diagram illustrated an exemplary method of calibration of transmitter-provided location.

Turning now to FIG. 16, an exemplary embodiment of a method 1600 of calibration of transmitter-provided location data is illustrated. At step 1605, a first signal from a first transmitter indicating an estimated location of a second transmitter in a navigable space is received by a wireless receiver coupled to a computing device. Wireless receiver may be any wireless receiver 104 as described above; computing device may be, without limitation, any portable computing device 160 as described above. First transmitter and/or may be any transmitter suitable for use as at least a first transmitter 128 or a second transmitter 156; for instance, first transmitter may include one or more beacons, and first transmitter may estimate and/or detect location of wireless receiver 104 according to any protocol for such detection by beacons.

At step 1610, and still referring to FIG. 16, wireless receiver receives a second signal from second transmitter; where second transmitter is a passive transmitter, receiving may include interrogating second transmitter and receiving a return signal as above. At step 1615, computing device identifies an actual location of the second transmitter as a function of the second signal. Determining actual location may be performed according to any means or method described above, including without limitation determination based on proximity to a passive second transmitter. Location may be determined by reference to a data structure and/or map as described above in reference to FIG. 14. At step 1620, computing device determines that estimated location is different from actual location; for instance, estimated location and actual location may indicate different locations within a coordinate system as described above; determining that they are different may involve determining that the difference between their points in the coordinate system under a norm used to measure distance in the coordinate system, is greater than some threshold amount or tolerance. Threshold amount or tolerance may be any virtual, relative, or absolute distance. For instance, threshold amount may a half-meter in any horizontal direction, a meter in any direction, or any desired threshold set by a user. Threshold may correspond to a minimum resolution of accuracy for estimating locations according to methods used by first transmitter; for instance, if first transmitter is a beacon, and is unable typically to detect a user location more accurately than within a foot of the user location, threshold may be equal to or greater than one foot.

At step 1620, with continued reference to FIG. 16, computing device may transmit, via the wireless receiver and to the first transmitter, a correction of the estimated location as a function of the actual location. Correction may include the actual location, for instance the coordinates thereof. Correction may include a degree and direction of inaccuracy. In some embodiments, this method enables beacons to correct for environmental distortion of location methods, such as distortion created by unexpectedly reflecting signals, noise, overcrowding, and the like.

Figure 17:
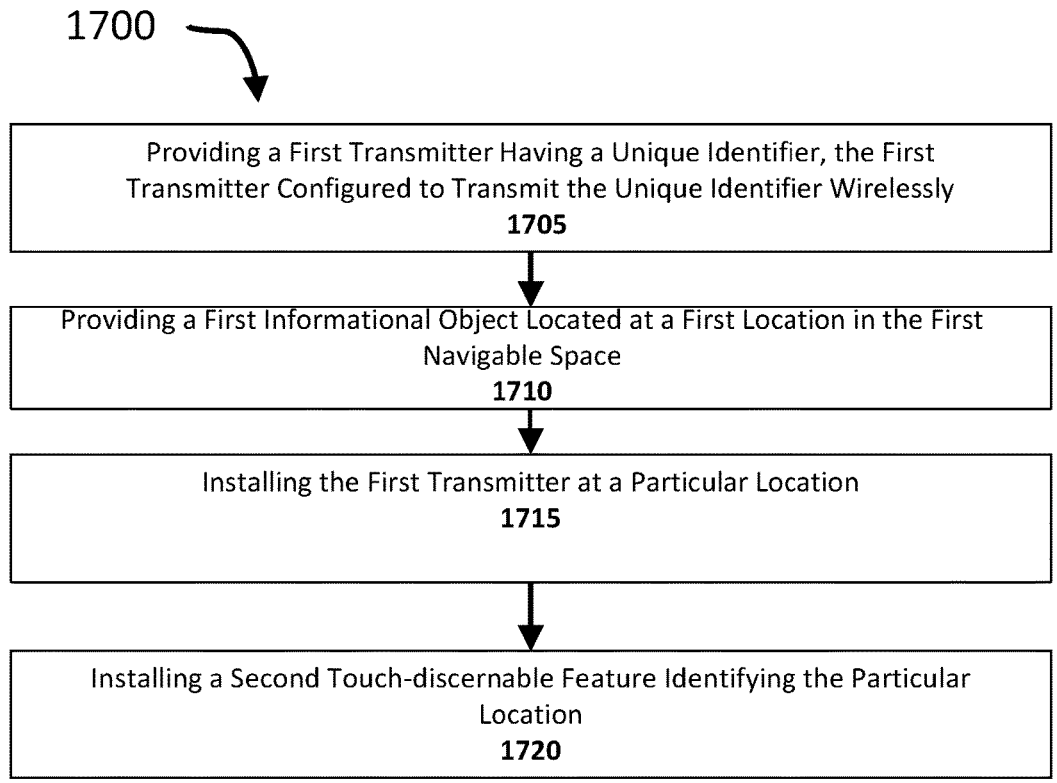
FIG. 17 is a flow diagram illustrating an exemplary embodiment of a method of installing an assembly for navigation and usage guidance in a first navigable space using hybrid tactile and electronic guidance means.

Turning now to FIG. 17, an exemplary embodiment of a method 1700 of installing an assembly for navigation and usage guidance in a first navigable space using hybrid tactile and electronic guidance means is illustrated. At step 1705, a first transmitter having a unique identifier is provided. This may be implemented as described above in reference to FIGS. 1-16. First transmitter may be configured to transmit the unique identifier wirelessly. At step 1710, a first informational object located at a first location in the first navigable space is provided; first information object includes an obverse and a first touch-discernable feature identifying the first informational object. This may be implemented as described above in reference to FIGS. 1-16. At step 1715, first transmitter is installed at a particular location on the obverse; this may be implemented as described above in reference to FIGS. 1-16. At step 1720, a second touch-discernable feature identifying a particular location on the obverse is installed on first informational object; this may be implemented as described above in reference to FIGS. 1-16.

In an embodiment, as described above in reference to FIGS. 3A-B, first informational object may include fewer features, or different features, than those described above. For instance, and without limitation, first informational object may include only first touch-discernable feature or second touch-discernable feature; first informational object may, for instance, include a single touch-discernable feature in a housing containing first transmitter as described above in reference to FIGS. 3A-B.

In an embodiment, providing first informational object may include manufacturing first informational object. In an embodiment, manufacturing first informational object may include any manufacturing steps as described above in reference to FIGS. 1-16. For instance, and without limitation, one or more of feature information symbol and/or path information symbol may be cut out of first informational object 304 and/or a blank; blank may have an exterior form substantially matching that of first informational object 304, or may be cut or otherwise modified to create one or more exterior perimeter features of first informational object 304, including without limitation first or second touch-discernable features. In another embodiment, a partially constructed first informational object may include, for instance, one or more recesses or holes having a general shape of one or more objects such as without limitation three-dimensional feature symbol, three-dimensional path information symbol, first touch-discernable feature, second touch-discernable feature and/or tactile map; each or any such objects may be, for instance, pre-created with adhesive backing or other attachment means. A user installing first informational object may attach any such object in recesses or on obverse (for instance if there is no recess) using attachment means, in any configuration indicating possible locations of first transmitter and/or one or more user features. In an embodiment, one object may be further processed to contain or include another object. For instance, a three-dimensional feature symbol may have a three-dimensional path information symbol cut into it using milling, laser cutting, or other material removal processes; distance markers or the like may be manufactured with attachment means including without limitation adhesive backing, and attached or inserted in or on three-dimensional path information symbol by a user aware of distance to an indicated user feature. In another embodiment, distance markers may be cut out of path information symbol. As a non-limiting example, path information symbols lacking distance markers may indicate a distance below some minimum, such as without limitation 10 feet (3 meters) while for greater distances distance markers may be incorporated as described above.

It should be noted that any other manufacturing method may be substituted for any of these steps, including molding, such as injection molding, additive manufacturing or "three-dimensional printing" processes, or the like. Any object that may be cut out of obverse or another object may alternatively be adhered to obverse or other object, formed thereon by deposition of material, or formed together with obverse or other object in a combined process such as a molding process or the like.

Installation of one or more objects by adhesion on obverse may be accomplished using a template in an embodiment. Template may, for instance, have a shape identical to or fitting against obverse, and may have one or more holes therein that are shaped like objects and/or footprint forms of objects; for example, and without limitation, objects to be inserted through holes may have uniform exterior outlines permitting interchangeability. A user may place template against obverse, insert objects through holes, fasten objects using, for instance, adhesive backing, and then remove template, leaving obvers with objects placed thereon; objects may be placed as dictated or informed by any design or compositional characteristics or considerations as described above in reference to FIGS. 1-16. Template may be formed using any manufacturing process suitable for formation of first informational object, any portion thereof, or any other object as described above. Still referring to FIG. 17, method 1700 may include any other installation methods described above, including without limitation any steps as described above in reference to FIG. 15. For instance, method 1700 may include receiving, at a computing device, at least a datum relating to the navigable space and linking, in a data structure relating unique identifiers to data relating to the navigable space, the at least a datum to the at least a unique identifier. Method 1700 may include receiving, at the computing device and from the first transmitter, a signal containing the unique identifier. Method 1700 may include linking, in a data structure linking identifiers to a map of the navigable space, the at least a datum to the unique identifier. Method 1700 may include installing a second transmitter at a second location in the navigable space; second transmitter may be installed in, at, or near any informational object suitable for use as first informational object, including without limitation a single touch-discernable feature on a housing incorporating second transmitter, and/or first, second, and/or third touch-discernable features as described above in reference to FIGS. 1-16. First and second transmitters may be installed in any relationship consistent with or described above for first and second transmitters; for instance, first transmitter may be installed, including in or at first informational object, at an entranceway of navigable space or the like, and second transmitter may be installed at a user feature, with regard to which navigational and/or usage instructions may be provided to user as described in further detail above. One or more additional transmitters may be installed in other locations, including at other features, in other navigable spaces, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 18:
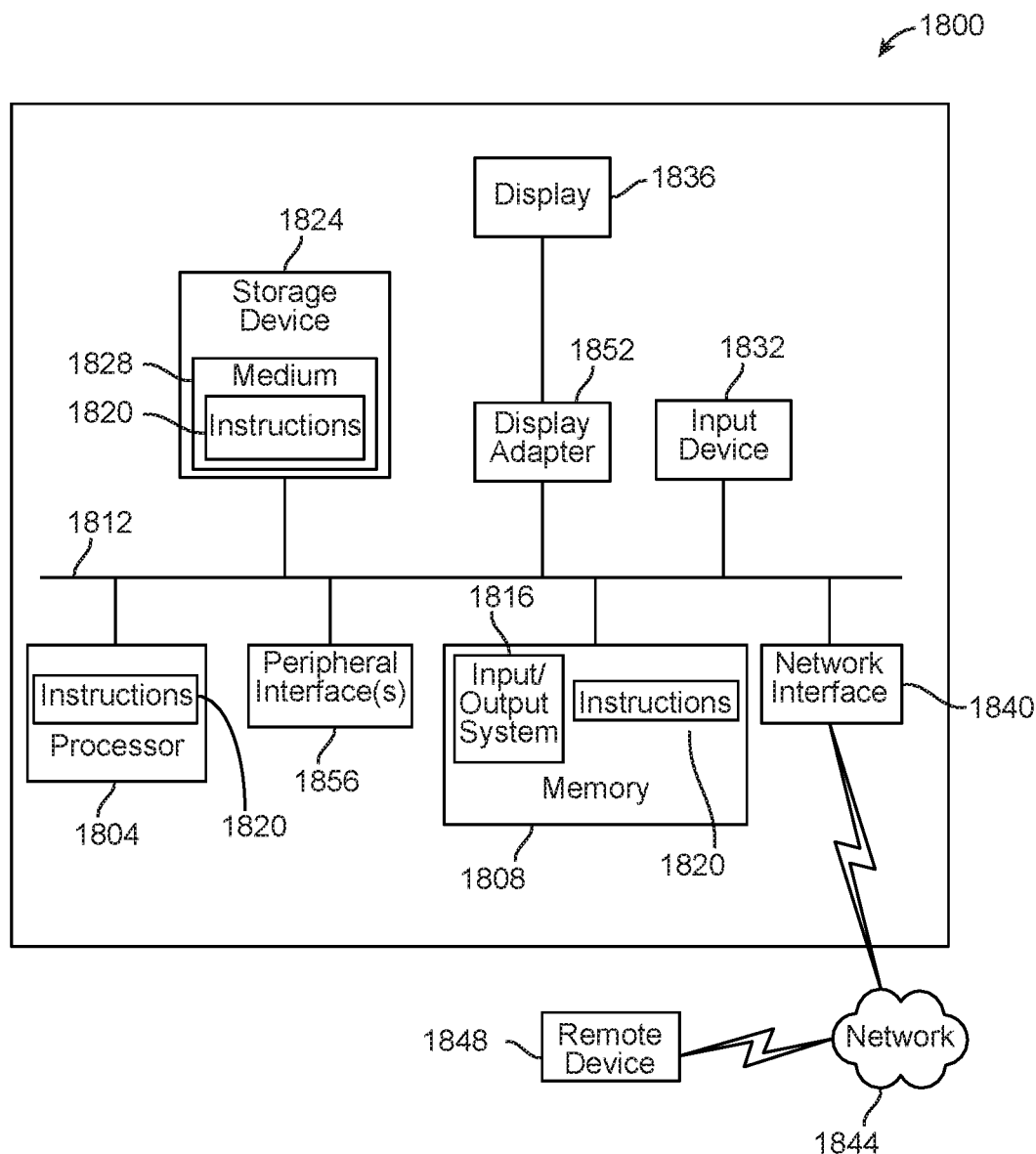
FIG. 18 is a block diagram of a computing system that can be used to implement any one or more of the methodologies disclosed herein and any one or more portions thereof.

FIG. 18 shows a diagrammatic representation of one embodiment of a computing device in the exemplary form of a computer system 1800 within which a set of instructions for causing a control system, such as the above-described systems and methods, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1800 includes a processor 1804 and a memory 1808 that communicate with each other, and with other components, via a bus 1812. Bus 1812 may include any of several types of bus structures including, but not limited to, a memory bus, a memory controller, a peripheral bus, a local bus, and any combinations thereof, using any of a variety of bus architectures.

Memory 1808 may include various components (e.g., machine-readable media) including, but not limited to, a random access memory component, a read only component, and any combinations thereof. In one example, a basic input/output system 1818 (BIOS), including basic routines that help to transfer information between elements within computer system 1800, such as during start-up, may be stored in memory 1808. Memory 1808 may also include (e.g., stored on one or more machine-readable media) instructions (e.g., software) 1820 embodying any one or more of the aspects and/or methodologies of the present disclosure. In another example, memory 1808 may further include any number of program modules including, but not limited to, an operating system 180, one or more application programs, other program modules, program data, and any combinations thereof.

Computer system 1800 may also include a storage device 1824. Examples of a storage device (e.g., storage device 1824) include, but are not limited to, a hard disk drive, a magnetic disk drive, an optical disc drive in combination with an optical medium, a solid-state memory device, and any combinations thereof. Storage device 1824 may be connected to bus 1812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1824 (or one or more components thereof) may be removably interfaced with computer system 1800 (e.g., via an external port connector (not shown)). Particularly, storage device 1824 and an associated machine-readable medium 1828 may provide nonvolatile and/or volatile storage of machine-readable instructions, data structures, program modules, and/or other data for computer system 1800. In one example, software 1820 may reside, completely or partially, within machine-readable medium 1828. In another example, software 1820 may reside, completely or partially, within processor 1804.

Computer system 1800 may also include an input device 1832. In one example, a user of computer system 1800 may enter commands and/or other information into computer system 1800 via input device 1832. Examples of an input device 1832 include, but are not limited to, an alpha-numeric input device (e.g., a keyboard), a pointing device, a joystick, a gamepad, an audio input device (e.g., a microphone, a voice response system 180, etc.), a cursor control device (e.g., a mouse), a touchpad, an optical scanner, a video capture device (e.g., a still camera, a video camera), a touchscreen, and any combinations thereof. Input device 1832 may be interfaced to bus 1812 via any of a variety of interfaces (not shown) including, but not limited to, a serial interface, a parallel interface, a game port, a USB interface, a FIREWIRE interface, a direct interface to bus 1812, and any combinations thereof. Input device 1832 may include a touch screen interface that may be a part of or separate from display 1838, discussed further below. Input device 1832 may be utilized as a user selection device for selecting one or more graphical representations in a graphical interface as described above.

A user may also input commands and/or other information to computer system 1800 via storage device 1824 (e.g., a removable disk drive, a flash drive, etc.) and/or network interface device 1840. A network interface device, such as network interface device 1840, may be utilized for connecting computer system 1800 to one or more of a variety of networks, such as network 1844, and one or more remote devices 1848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1844, may employ a wired and/or a wireless mode of communication. In general, any network topology may be used.

Information (e.g., data, software 1820, etc.) may be communicated to and/or from computer system 1800 via network interface device 1840.

Computer system 1800 may further include a video display adapter 1852 for communicating a displayable image to a display device, such as display device 1838. Examples of a display device include, but are not limited to, a liquid crystal display (LCD), a cathode ray tube (CRT), a plasma display, a light emitting diode (LED) display, and any combinations thereof. Display adapter 1852 and display device 1838 may be utilized in combination with processor 1804 to provide graphical representations of aspects of the present disclosure. In addition to a display device, computer system 1800 may include one or more other peripheral output devices including, but not limited to, an audio speaker, a printer, and any combinations thereof. Such peripheral output devices may be connected to bus 1812 via a peripheral interface 1858. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An assembly for navigation and usage guidance in a first navigable space using hybrid tactile and electronic guidance, the assembly comprising:
a first informational object installed at a fixed location in a first navigable space, wherein
the first informational object includes:
an obverse;
a first touch-discernable feature identifying the first informational object, wherein the first touch-discernable feature further comprises a probe-redirection feature installed at floor level in the first navigable space, the probe-redirection feature installed in a location vertically aligned beneath a particular location, on the obverse, the particular location located at ambulatory reach range; and
a second touch-discernable feature identifying the particular location; and
a first transmitter embedded in the first informational object at the particular location, wherein the first transmitter is configured to transmit, to a receiver, data indicating a location of at least a user feature in the first navigable space.

2. The assembly of claim 1, wherein the first informational object is mounted to a vertical surface of an architectural fixture.

3. The assembly of claim 1, wherein the first informational object further includes at least a third touch-discernable feature.

4. The assembly of claim 3, wherein the at least a third touch-discernable feature identifies the first navigable space.

5. The assembly of claim 4 further comprising a second informational object located in a second navigable space, wherein the second informational object further comprises:
a fourth touch-discernable feature identifying the second informational object;
a fifth touch-discernable feature identifying the second navigable space.

6. The assembly of claim 3, wherein the at least a third touch-discernable feature further includes a shape identifying the at least a user feature.

7. The assembly of claim 3, wherein the at least a third touch-discernable feature further includes a directional indicator indicating a direction in which to travel to find user feature.

8. The assembly of claim 3, wherein the at least a third-touch discernable feature further includes a distance indicator indicating a distance for a user to travel to find user feature.

9. The assembly of claim 3, wherein the at least a third touch-discernable feature further includes a tactile usage instruction.

10. The assembly of claim 3, wherein the first informational object has an exterior edge, and the at least a third touch-discernable feature further comprises a touch-discernable feature of the exterior edge.

11. The assembly of claim 1, wherein the first informational object has an exterior edge, and the first touch-discernable feature further comprises a touch-discernable feature of the exterior edge.

12. The assembly of claim 1, wherein the first touch-discernable feature further includes a three-dimensional form located on the obverse.

13. The assembly of claim 1, wherein:
the first informational object has an exterior edge;
the particular location is adjacent to a particular point along the exterior edge; and
the second touch-discernable feature further comprises a touch-discernable feature of the exterior edge at the particular point along the exterior edge.

14. The assembly of claim 1, wherein the second touch-discernable feature includes a three-dimensional form attached to the obverse at the particular location.

15. The assembly of claim 1, wherein the first transmitter is a passive transmitter.

16. The assembly of claim 1, wherein the first transmitter is further configured to transmit data indicating an instruction for use of the at least a user feature.

17. A method of installing an assembly for navigation and usage guidance in a first navigable space using hybrid tactile and electronic guidance, the method comprising:
providing a first transmitter having a unique identifier, wherein the first transmitter is configured to transmit the unique identifier wirelessly;
providing a first informational object located at a first location in the first navigable space, wherein the first information object further comprises an obverse;

installing a first touch-discernable feature identifying the first informational object, wherein the first touch-discernable feature further comprises a probe-redirection feature, and installing the first touch-discernable feature further comprises:
   selecting an installation location at floor level, the location vertically aligned with the first location; and
   installing the probe-redirection feature at the installation location;

installing the first transmitter at a particular location on the obverse, the particular location at the first location; and installing a second touch-discernable feature identifying a particular location on the obverse.

18. The method of claim 17, further comprising:
receiving, at a computing device, at least a datum relating to the navigable space; and
linking, in a data structure relating unique identifiers to data relating to the navigable space, the at least a datum to the at least a unique identifier.

19. The method of claim 17, further comprising receiving, at the computing device and from the first transmitter, a signal containing the unique identifier.

20. The method of claim 17, further comprising linking, in a data structure linking identifiers to a map of the navigable space, the at least a datum to the unique identifier.

21. The method of claim 17, further comprising installing a second transmitter at a second location in the navigable space.

* * * * *